(12) United States Patent
Chui

(10) Patent No.: US 8,405,899 B2
(45) Date of Patent: Mar. 26, 2013

(54) PHOTONIC MEMS AND STRUCTURES

(75) Inventor: Clarence Chui, San Jose, CA (US)

(73) Assignee: Qualcomm Mems Technologies, Inc, San Diego, CA (US)

( * ) Notice: Subject to any disclaimer, the term of this patent is extended or adjusted under 35 U.S.C. 154(b) by 0 days.

(21) Appl. No.: 12/506,089

(22) Filed: Jul. 20, 2009

(65) Prior Publication Data

US 2009/0279162 A1    Nov. 12, 2009

Related U.S. Application Data

(63) Continuation of application No. 11/208,420, filed on Aug. 19, 2005, now Pat. No. 7,564,612.

(60) Provisional application No. 60/613,566, filed on Sep. 27, 2004.

(51) Int. Cl.
*G02B 26/00* (2006.01)

(52) U.S. Cl. .................. 359/290; 359/223.1; 359/224.1; 359/224.2; 359/291; 359/292; 359/295; 359/298; 359/315

(58) Field of Classification Search .................. 359/223, 359/224, 290–295, 298, 315
See application file for complete search history.

(56) References Cited

U.S. PATENT DOCUMENTS

| | | |
|---|---|---|
| 2,590,906 A | 4/1952 | Tripp |
| 2,677,714 A | 5/1954 | Auwarter |
| 3,037,189 A | 5/1962 | Barrett et al. |
| 3,210,757 A | 10/1965 | Jacob |
| 3,247,392 A | 4/1966 | Thelen |
| 3,679,313 A | 7/1972 | Rosenberg |
| 3,728,030 A | 4/1973 | Hawes |
| 3,886,310 A | 5/1975 | Guldberg |
| 3,955,190 A | 5/1976 | Teraishi |
| 4,403,248 A | 9/1983 | Te Velde |
| 4,421,381 A | 12/1983 | Ueda et al. |
| 4,441,789 A | 4/1984 | Pohlack |
| 4,441,791 A | 4/1984 | Hornbeck |
| 4,497,974 A | 2/1985 | Deckman et al. |
| 4,498,953 A | 2/1985 | Cook et al. |
| 4,560,435 A | 12/1985 | Brown et al. |
| 4,655,554 A | 4/1987 | Armitage |

(Continued)

FOREIGN PATENT DOCUMENTS

| | | |
|---|---|---|
| EP | 0 035 299 | 9/1983 |
| EP | 0 361 981 | 4/1990 |

(Continued)

OTHER PUBLICATIONS

Decision of Rejection dated Sep. 11, 2009 in Chinese App. No. 200510105061.5.

(Continued)

*Primary Examiner* — Evelyn A. Lester
(74) *Attorney, Agent, or Firm* — Knobbe, Martens, Olson & Bear, LLP

(57) ABSTRACT

An optical device includes a non-transparent substrate. The optical device further includes a first optical layer which is at least partially transmissive and at least partially reflective to incident light. The optical device further includes a second optical layer which is at least partially reflective to incident light. The second optical layer is spaced from the first optical layer. At least one of the first optical layer and the second optical layer is movable between a first position at a first distance from the first optical layer and a second position at a second distance from the first optical layer. Movement of the at least one of the first optical layer and the second optical layer between the first and second positions modulates the reflectivity of the device.

34 Claims, 24 Drawing Sheets

U.S. PATENT DOCUMENTS

| | | |
|---|---|---|
| 4,666,254 A | 5/1987 | Itoh et al. |
| 4,705,361 A | 11/1987 | Frazier et al. |
| 4,779,959 A | 10/1988 | Saunders |
| 4,786,128 A | 11/1988 | Birnbach |
| 4,822,993 A | 4/1989 | Dillon et al. |
| 4,859,060 A | 8/1989 | Katagiri et al. |
| 4,925,259 A | 5/1990 | Emmett |
| 4,954,789 A | 9/1990 | Sampsell |
| 4,956,619 A | 9/1990 | Hornbeck |
| 4,973,131 A | 11/1990 | Carnes |
| 4,982,184 A | 1/1991 | Kirkwood |
| 5,022,745 A | 6/1991 | Zayhowski et al. |
| 5,028,939 A | 7/1991 | Hornbeck et al. |
| 5,062,689 A | 11/1991 | Koehler |
| 5,091,983 A | 2/1992 | Lukosz |
| 5,096,279 A | 3/1992 | Hornbeck et al. |
| 5,170,283 A | 12/1992 | O'Brien et al. |
| 5,315,370 A | 5/1994 | Bulow |
| 5,381,232 A | 1/1995 | van Wijk |
| 5,452,138 A | 9/1995 | Mignardi et al. |
| 5,471,341 A | 11/1995 | Warde et al. |
| 5,499,037 A | 3/1996 | Nakagawa et al. |
| 5,526,172 A | 6/1996 | Kanack |
| 5,550,373 A | 8/1996 | Cole et al. |
| 5,559,358 A | 9/1996 | Burns et al. |
| 5,561,523 A | 10/1996 | Blomberg et al. |
| 5,597,736 A | 1/1997 | Sampsell |
| 5,600,383 A | 2/1997 | Hornbeck |
| 5,636,052 A | 6/1997 | Arney et al. |
| 5,646,729 A | 7/1997 | Koskinen et al. |
| 5,646,768 A | 7/1997 | Kaeriyama |
| 5,661,592 A | 8/1997 | Bornstein et al. |
| 5,665,997 A | 9/1997 | Weaver et al. |
| 5,686,979 A | 11/1997 | Weber et al. |
| 5,699,181 A | 12/1997 | Choi |
| 5,710,656 A | 1/1998 | Goossen |
| 5,719,068 A | 2/1998 | Suzawa et al. |
| 5,734,177 A | 3/1998 | Sakamoto |
| 5,771,116 A | 6/1998 | Miller et al. |
| 5,786,927 A | 7/1998 | Greywall |
| 5,808,781 A | 9/1998 | Arney et al. |
| 5,815,141 A | 9/1998 | Phares |
| 5,818,095 A | 10/1998 | Sampsell |
| 5,825,528 A | 10/1998 | Goossen |
| 5,838,484 A | 11/1998 | Goossen et al. |
| 5,867,302 A | 2/1999 | Fleming |
| 5,870,221 A | 2/1999 | Goossen |
| 5,905,482 A | 5/1999 | Hughes et al. |
| 5,914,804 A | 6/1999 | Goossen |
| 5,920,418 A | 7/1999 | Shiono et al. |
| 5,933,183 A | 8/1999 | Enomoto et al. |
| 5,939,795 A | 8/1999 | Yu |
| 5,961,848 A | 10/1999 | Jacquet et al. |
| 5,986,796 A | 11/1999 | Miles |
| 5,994,174 A | 11/1999 | Carey et al. |
| 6,028,689 A | 2/2000 | Michalicek et al. |
| 6,028,690 A | 2/2000 | Carter et al. |
| 6,031,653 A | 2/2000 | Wang |
| 6,040,937 A | 3/2000 | Miles |
| 6,046,659 A | 4/2000 | Loo et al. |
| 6,055,090 A | 4/2000 | Miles |
| 6,065,424 A | 5/2000 | Shacham-Diamand et al. |
| 6,100,861 A | 8/2000 | Cohen et al. |
| 6,124,851 A | 9/2000 | Jacobsen |
| 6,242,932 B1 | 6/2001 | Hembree |
| 6,262,697 B1 | 7/2001 | Stephenson |
| 6,285,424 B1 | 9/2001 | Yoshida |
| 6,301,000 B1 | 10/2001 | Johnson |
| 6,323,987 B1 | 11/2001 | Rinaudo et al. |
| 6,327,071 B1 | 12/2001 | Kimura |
| 6,335,235 B1 | 1/2002 | Bhakta et al. |
| 6,339,417 B1 | 1/2002 | Quanrud |
| 6,351,329 B1 | 2/2002 | Greywall |
| 6,356,378 B1 | 3/2002 | Huibers |
| 6,377,233 B2 | 4/2002 | Colgan et al. |
| 6,381,022 B1 | 4/2002 | Zavracky |
| 6,384,952 B1 | 5/2002 | Clark et al. |
| 6,400,738 B1 | 6/2002 | Tucker et al. |
| 6,417,868 B1 | 7/2002 | Bock et al. |
| 6,433,917 B1 | 8/2002 | Mei et al. |
| 6,437,583 B1 | 8/2002 | Tartagni et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,519,073 B1 | 2/2003 | Goossen |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,738,194 B1 | 5/2004 | Ramirez et al. |
| 6,768,555 B2 | 7/2004 | Lin et al. |
| 6,794,119 B2 | 9/2004 | Miles |
| 6,813,059 B2 | 11/2004 | Hunter et al. |
| 6,822,780 B1 | 11/2004 | Long, Jr. |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,862,127 B1 | 3/2005 | Ishii |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,960,305 B2 | 11/2005 | Doan et al. |
| 6,980,350 B2 | 12/2005 | Hung et al. |
| 6,982,820 B2 | 1/2006 | Tsai |
| 7,002,726 B2 | 2/2006 | Patel et al. |
| 7,006,272 B2 | 2/2006 | Tsai |
| 7,009,754 B2 | 3/2006 | Huibers |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,072,093 B2 | 7/2006 | Piehl et al. |
| 7,113,339 B2 | 9/2006 | Taguchi et al. |
| 7,119,945 B2 | 10/2006 | Kothari et al. |
| 7,123,216 B1 | 10/2006 | Miles |
| 7,126,738 B2 | 10/2006 | Miles |
| 7,161,728 B2 | 1/2007 | Sampsell et al. |
| 7,184,195 B2 | 2/2007 | Yang |
| 7,198,973 B2 | 4/2007 | Lin et al. |
| 7,205,722 B2 | 4/2007 | Koshio et al. |
| 7,221,495 B2 | 5/2007 | Miles et al. |
| 7,236,284 B2 | 6/2007 | Miles |
| 7,245,285 B2 | 7/2007 | Yeh et al. |
| 7,250,930 B2 | 7/2007 | Hoffman et al. |
| 7,372,619 B2 | 5/2008 | Miles |
| 7,459,402 B2 | 12/2008 | Doan et al. |
| 7,460,291 B2 | 12/2008 | Sampsell et al. |
| 7,476,327 B2 | 1/2009 | Tung et al. |
| 7,508,566 B2 | 3/2009 | Feenstra et al. |
| 7,532,377 B2 | 5/2009 | Miles |
| 7,532,381 B2 | 5/2009 | Miles et al. |
| 7,554,711 B2 | 6/2009 | Miles |
| 7,564,612 B2 * | 7/2009 | Chui ............................ 359/290 |
| 7,852,544 B2 | 12/2010 | Sampsell et al. |
| RE42,119 E | 2/2011 | Chui et al. |
| 7,898,722 B2 | 3/2011 | Miles |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2001/0055208 A1 | 12/2001 | Kimura |
| 2002/0024711 A1 | 2/2002 | Miles |
| 2002/0051281 A1 | 5/2002 | Ueda et al. |

| | | |
|---|---|---|
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0139981 A1 | 10/2002 | Young |
| 2002/0146200 A1 | 10/2002 | Kudrle et al. |
| 2002/0149828 A1 | 10/2002 | Miles |
| 2002/0149834 A1 | 10/2002 | Mei et al. |
| 2002/0154422 A1 | 10/2002 | Sniegowski et al. |
| 2002/0186209 A1 | 12/2002 | Cok |
| 2002/0197761 A1 | 12/2002 | Patel et al. |
| 2003/0011864 A1 | 1/2003 | Flanders |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0173504 A1 | 9/2003 | Cole et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0058532 A1 | 3/2004 | Miles et al. |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0135947 A1 | 7/2004 | Jang et al. |
| 2004/0140557 A1 | 7/2004 | Sun et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0184766 A1 | 9/2004 | Kim et al. |
| 2004/0188599 A1 | 9/2004 | Viktorovitch et al. |
| 2004/0207897 A1 | 10/2004 | Lin |
| 2004/0209195 A1 | 10/2004 | Lin |
| 2004/0217264 A1 | 11/2004 | Wood et al. |
| 2004/0217919 A1 | 11/2004 | Piehl et al. |
| 2004/0218251 A1 | 11/2004 | Piehl et al. |
| 2004/0240032 A1 | 12/2004 | Miles |
| 2004/0259010 A1 | 12/2004 | Kanbe |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0069209 A1 | 3/2005 | Damera-Venkata et al. |
| 2005/0078348 A1 | 4/2005 | Lin |
| 2005/0117190 A1 | 6/2005 | Iwauchi et al. |
| 2005/0117623 A1 | 6/2005 | Shchukin et al. |
| 2005/0122294 A1 | 6/2005 | Ben-David et al. |
| 2005/0128543 A1 | 6/2005 | Phillips et al. |
| 2005/0133761 A1 | 6/2005 | Thielemans |
| 2005/0168849 A1 | 8/2005 | Lin |
| 2005/0179378 A1 | 8/2005 | Oooka et al. |
| 2005/0195462 A1 | 9/2005 | Lin |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0038643 A1 | 2/2006 | Xu et al. |
| 2006/0066936 A1 | 3/2006 | Chui et al. |
| 2006/0082863 A1 | 4/2006 | Piehl et al. |
| 2006/0220160 A1 | 10/2006 | Miles |
| 2006/0262126 A1 | 11/2006 | Miles |
| 2007/0020948 A1 | 1/2007 | Piehl et al. |
| 2007/0153860 A1 | 7/2007 | Chang-Hasnain et al. |
| 2007/0177247 A1 | 8/2007 | Miles |
| 2007/0253054 A1 | 11/2007 | Miles |
| 2007/0268211 A1 | 11/2007 | Whitehead et al. |
| 2008/0037093 A1 | 2/2008 | Miles |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0106782 A1 | 5/2008 | Miles |
| 2008/0297880 A1 | 12/2008 | Steckl et al. |
| 2009/0068781 A1 | 3/2009 | Tung et al. |
| 2009/0080060 A1 | 3/2009 | Sampsell et al. |
| 2010/0039370 A1 | 2/2010 | Miles |
| 2011/0019380 A1 | 1/2011 | Miles |
| 2011/0026096 A1 | 2/2011 | Miles |
| 2011/0038027 A1 | 2/2011 | Miles |
| 2011/0080632 A1 | 4/2011 | Miles |
| 2011/0170166 A1 | 7/2011 | Miles |
| 2011/0170167 A1 | 7/2011 | Miles |
| 2011/0188110 A1 | 8/2011 | Miles |

FOREIGN PATENT DOCUMENTS

| | | |
|---|---|---|
| EP | 0 668 490 | 8/1995 |
| EP | 0 695 959 | 2/1996 |
| EP | 0 879 991 | 11/1998 |
| EP | 0 969 306 | 1/2000 |
| EP | 0 986 077 | 3/2000 |
| EP | 1 122 577 | 8/2001 |
| EP | 1 205 782 | 5/2002 |
| EP | 1 227 346 | 7/2002 |
| EP | 1 275 997 | 1/2003 |
| EP | 1 403 212 | 3/2004 |
| EP | 1 439 515 | 7/2004 |
| EP | 1 473 581 | 11/2004 |
| JP | 56-088111 | 7/1981 |
| JP | 62 082454 | 4/1987 |
| JP | 5-49238 | 2/1993 |
| JP | 5-281479 | 10/1993 |
| JP | 08-051230 | 2/1996 |
| JP | 11211999 | 8/1999 |
| JP | 2002-062490 | 2/2000 |
| JP | 2000 147262 | 5/2000 |
| JP | 2001-221913 | 8/2001 |
| JP | 2001 249283 | 9/2001 |
| JP | 2002-221678 | 8/2002 |
| JP | 2003-340795 | 2/2003 |
| JP | 2003 177336 | 6/2003 |
| JP | 2003-315732 | 11/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| JP | 2007 027150 | 2/2007 |
| KR | 2002-010322 | 2/2002 |
| WO | WO 98/14804 | 4/1998 |
| WO | WO 98/43129 | 10/1998 |
| WO | WO 01/53113 | 7/2001 |
| WO | WO 02/024570 | 3/2002 |
| WO | WO 02/063602 | 8/2002 |
| WO | WO 02/071132 | 9/2002 |
| WO | WO 02/086582 | 10/2002 |
| WO | WO 03/105198 | 12/2003 |
| WO | WO 2004/042687 | 5/2004 |
| WO | WO 2005/010566 | 2/2005 |

OTHER PUBLICATIONS

Official Action dated Aug. 10, 2009 in Russian App. No. 2005129850.

Butler et al., "An Embedded Overlay Concept for Microsystems Packaging," IEEE Transactions on Advanced Packaging IEEE USA, vol. 23, No. 4, pp. 617-622, XP002379648 (2000).

Conner, "Hybrid Color Display Using Optical Interference Filter Array," SID Digest, pp. 577-580 (1993).

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.

Kowarz et al., Conformal grating electromechanical system (GEMS) for high-speed digital light modulation, Proceedings of the IEEEE 15th. Annual International Conference on Micro Electro Mechanical Systems, MEMS 2002, pp. 568-573.

Miles, A New Reflective FPD Technology Using Interferometric Modulation, Journal of the SID, 5/4, 1997.

Miles, Interferometric modulation: MOEMS as an enabling technology for high performance reflective displays, Proceedings of SPIE, vol. 4985, pp. 131-139, 2003.

Pape et al., Characteristics of the deformable mirror device for optical information processing, Optical Engineering, 22(6):676-681, Nov.-Dec. 1983.

Wang et al., "Flexible Circuit-Based RF MEMS Switches," Proceedings of 2001 ASME International Mechanical Engineering Congress and Exposition, pp. 757-762, Nov. 11-16, 2001.

Extended European Search Report for App. No. 05255693.6-2217, dated May 24, 2006.

Official Communication for European App. No. 05255693.6-2217, dated Feb. 15, 2008.

Office Action dated May 23, 2008 in Chinese App. No. 200510105061.5.

Notice of Reasons for Rejection in Japanese App. No. 2005-275187, dated Oct. 28, 2008.

Longhurst, 1963, Chapter IX: Multiple Beam Interferometry, in Geometrical and Physical Optics, pp. 153-157.

Tolansky, 1948, Chapter II: Multiple-Beam Interference, in Multiple-bean Interferometry of Surfaces and Films, Oxford at the Clarendon Press, pp. 8-11.

Office Action dated Oct. 9, 2007 in U.S. App. No. 11/208,420.

Office Action dated Jun. 17, 2009 in U.S. App. No. 11/208,420.

Office Action dated Feb. 6, 2009 in Chinese App. No. 200510105061.5.

Notice of Reasons for Rejection in Japanese App. No. 2005-275187, dated Feb. 10, 2009.

Notice of Reasons for Rejection in Japanese App. No. 2005-275187, dated May 19, 2009.

Summons to Oral Proceedings dated Dec. 9, 2009 in European App. No. 05255693.3.

Official Action dated Jan. 5, 2010 in Russian App. No. 2005129850.

Billard, Tunable Capacitor, 5th Annual Review of LETI, Jun. 24, 2003, p. 7.

Hohlfeld et al., Jun. 2003, Micro-machined tunable optical filters with optimized band-pass spectrum, 12th International Conference on Transducers, Solid-State Sensors, Actuators and Microsystems, 2:1494-1497.

Mehregany et al., 1996, MEMS applications in optical systems, IEEE/LEOS 1996 Summer Topical Meetings, pp. 75-76.

Miles et al, Oct. 21, 1997, A MEMS based interferometric modulator (IMOD) for display applications, Proceedings of Sensors Expo, pp. 281-284.

Nakagawa et al., Feb. 1, 2002, Wide-field-of-view narrow-band spectral filters based on photonic crystal nanocavities, Optics Letters, 27(3):191-193.

Nieminen et al., 2004, Design of a temperature-stable RF MEM capacitor, IEEE Journal of Microelectromechanical Systems, 13(5):705-714.

Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.

Brosnihan et al., Jun. 2003, Optical IMEMS—a fabrication process for MEMS optical switches with integrated on-chip electronic, Transducers, Solid-State Sensors, Actuators and Microsystems, 12th International Conference 2003, 2(8-12):1638-1642.

Cacharelis et al., 1997, A Reflective-mode PDLC Light Valve Display Technology, Proceedings of European Solid State Device Research Conference (ESSDERC), pp. 596-599.

Maier et al., 1996, 1.3" active matrix liquid crystal spatial light modulator with 508 dpi resolution, SPIE vol. 2754, pp. 171-179.

Reexamination Notification dated Aug. 29, 2011 in Chinese App. No. 200510105061.5.

Examiner's Report dated Feb. 13, 2012 in Canadian App. No. 2,520,384.

Reexamination Decision dated Jun. 26, 2012 in Chinese App. No. 200510105061.5.

Official Action dated Oct. 27, 2012 in Korean App. No. 10-2012-0008288.

Official Action dated Nov. 21, 2012 in Tiawanese App. No. 094132191.

* cited by examiner

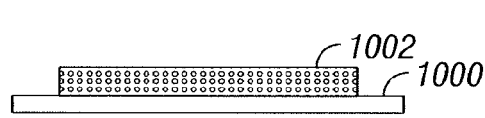
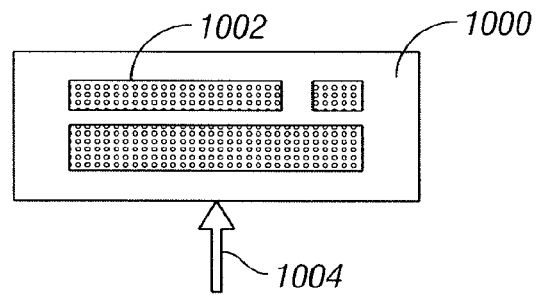
FIG. 10A    FIG. 10B
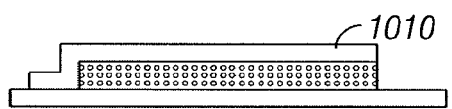
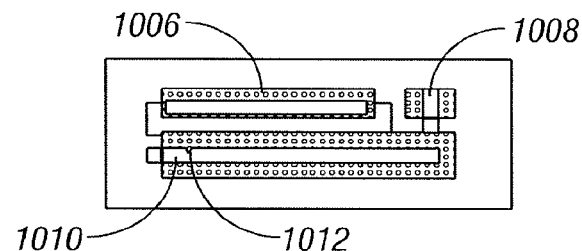
FIG. 10C    FIG. 10D
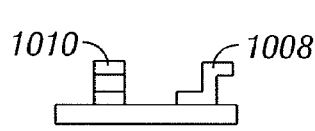
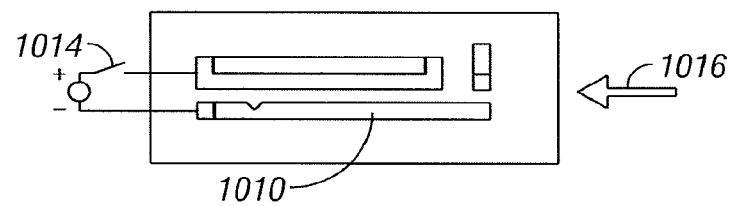
FIG. 10E    FIG. 10F
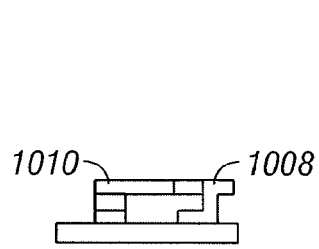
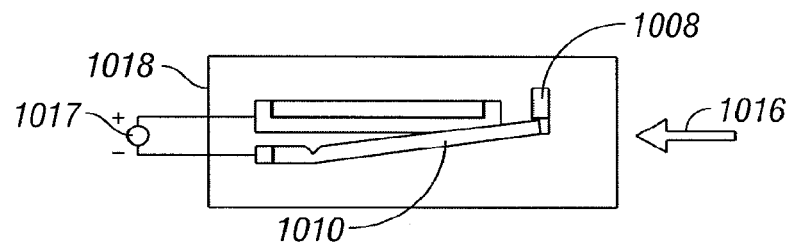
FIG. 10G    FIG. 10H SIDE VIEW          BOTTOM VIEW
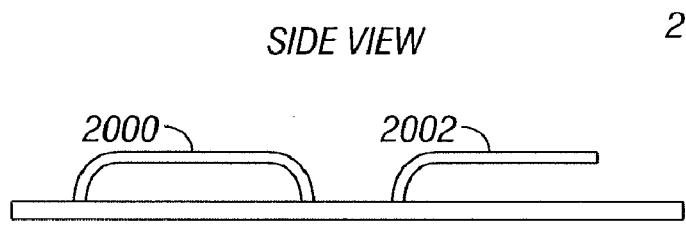   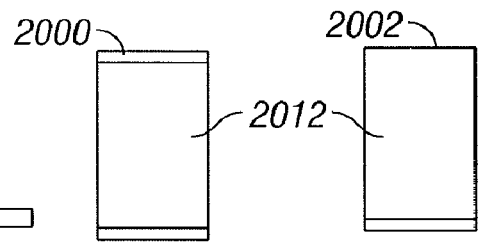
FIG. 20A           FIG. 20B
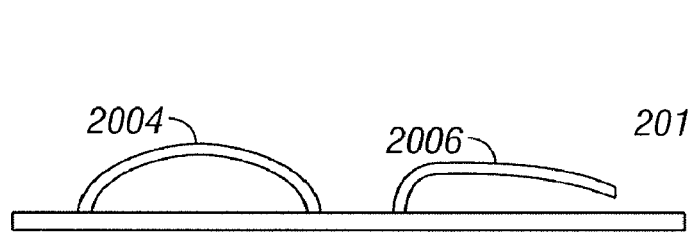   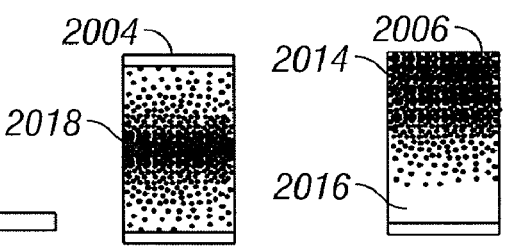
FIG. 20C           FIG. 20D
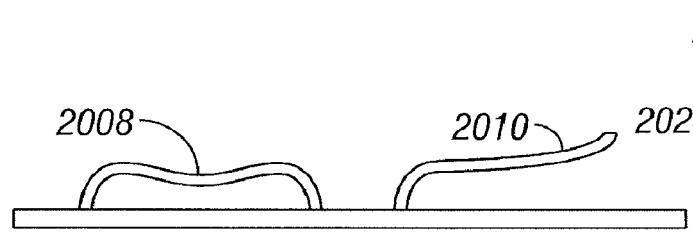   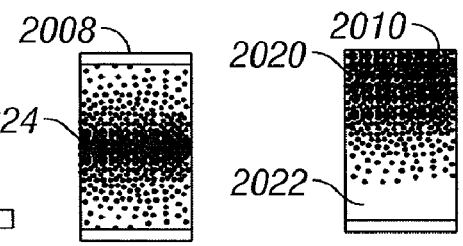
FIG. 20E           FIG. 20F
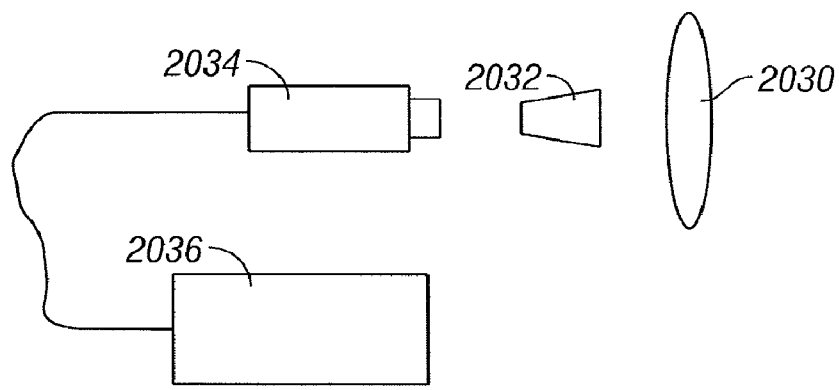
FIG. 20G

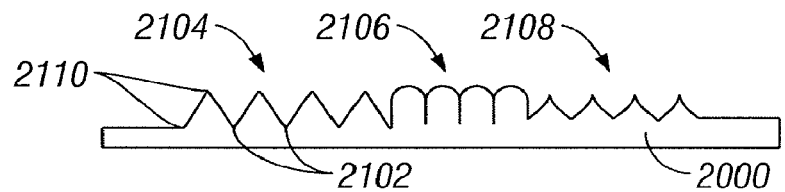
*FIG. 21A*
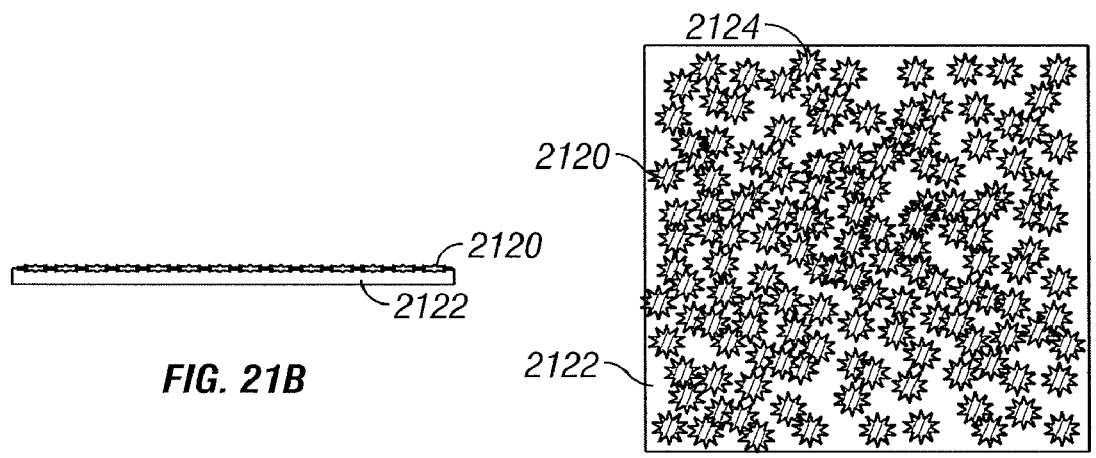
*FIG. 21B*
*FIG. 21C*
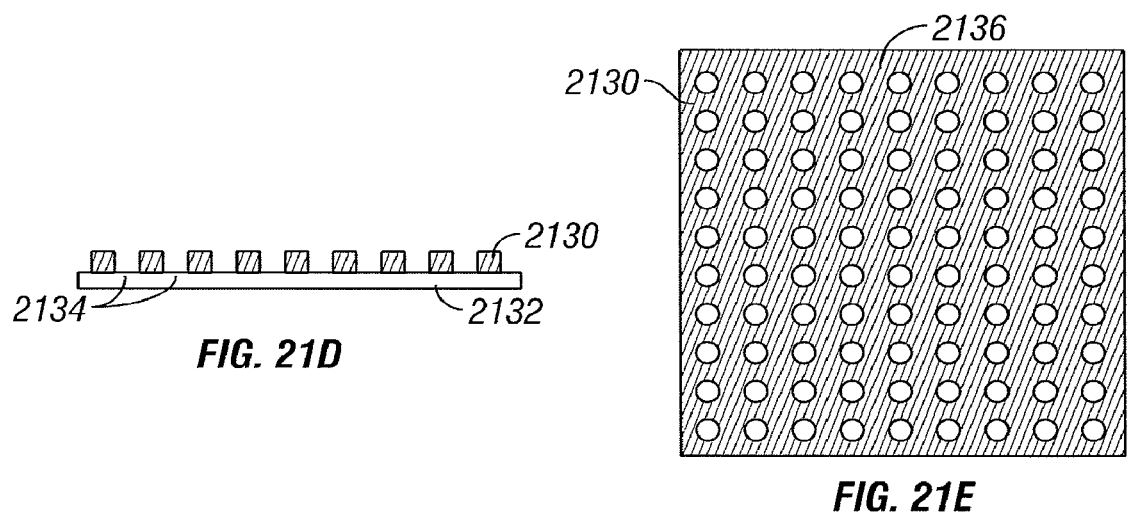
*FIG. 21D*
*FIG. 21E*

PHOTONIC MEMS AND STRUCTURES

RELATED APPLICATIONS

This application is a continuation of U.S. patent application Ser. No. 11/208,420, filed Aug. 19, 2005, now U.S. Pat. No. 7,564,612 issued Jul. 21, 2009, which claims the benefit of U.S. Provisional Patent No. 60/613,566 filed Sep. 27, 2004, both of which are incorporated in their entirety by reference herein.

BACKGROUND

This invention relates to microelectromechanical systems (MEMS).

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In certain embodiments, an optical device comprises a non-transparent substrate. The optical device further comprises a first optical layer which is at least partially transmissive and at least partially reflective to incident light. The optical device further comprises a second optical layer which is at least partially reflective to incident light. The second optical layer is spaced from the first optical layer. At least one of the first optical layer and the second optical layer is movable between a first position with a first distance between the first and second optical layers and a second position with a second distance between the first and second optical layers. Movement of the at least one of the first optical layer and the second optical layer between the first and second positions modulates the reflectivity of the device.

In certain embodiments, an optical device comprises means for supporting an interferometric modulator. The supporting means is non-transparent. The optical device further comprises first means for reflecting light. The first reflecting means is at least partially transmissive and at least partially reflective to incident light. The optical device further comprises second means for reflecting light. The second reflecting means is at least partially reflective to incident light. The second reflecting means is spaced from the first reflecting means. At least one of the first reflecting means and the second reflecting means is movable between a first position with a first distance between the first reflecting means and the second reflecting means and a second position with a second distance between the first reflecting means and the second reflecting means. Movement of the at least one of the first reflecting means and the second reflecting means between the first and second positions modulates the reflectivity of the device.

In certain embodiments, a method manufactures an optical device. The method comprises providing a non-transparent substrate. The method further comprises forming one or more layers on the non-transparent substrate. The one or more layers includes a first optical layer which is at least partially transmissive and at least partially reflective to incident light. The one or more layers further includes a second optical layer which is at least partially reflective to incident light. The second optical layer is spaced from the first optical layer. At least one of the first optical layer and the second optical layer is movable between a first position with a first distance between the first and second optical layers and a second position with a second distance between the first and second optical layers. Movement of the at least one of the first optical layer and the second optical layer between the first and second positions modulates the reflectivity of the device.

In certain embodiments, a method modulates light. The method comprises providing an optical device. The optical device comprises a non-transparent substrate. The optical device further comprises a first optical layer which is at least partially transmissive and at least partially reflective to incident light. The optical device further comprises a second optical layer which is at least partially reflective to incident light. The second optical layer is spaced from the first optical layer. At least one of the first optical layer and the second optical layer is movable between a first position with a first distance between the first and second optical layers and a second position with a second distance between the first and second optical layers. The method further comprises moving the at least one of the first optical layer and the second optical layer while irradiating the device with light.

DESCRIPTION

FIG. 1A is a schematic cross-section of an exemplary display substrate incorporating an anti-reflection coating and integrated supplemental lighting.

FIG. 1B schematically illustrates another scheme for supplemental lighting.

FIG. 2 schematically illustrates details of an exemplary fabrication process of a micromachined arc lamp source.

Figure 4A:
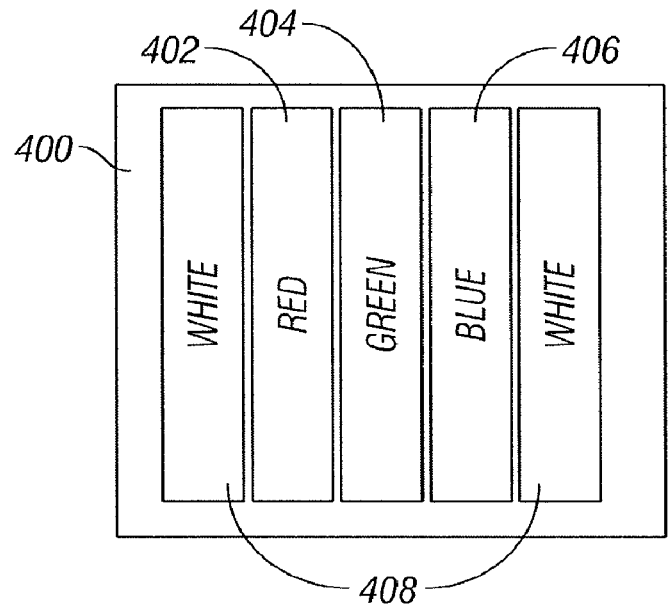
FIG. 4A is a diagram which illustrates an exemplary color display scheme based on the concept of "base+pigment."
Figure 4B:
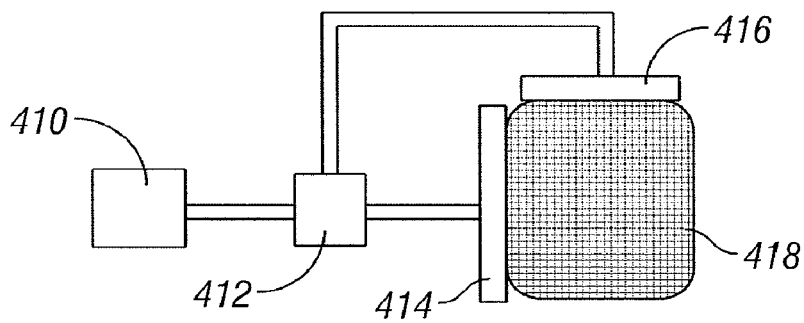
FIG. 4B is a block diagram of an exemplary system that provides for field reconfigurable display-centric products.
Figure 4C:
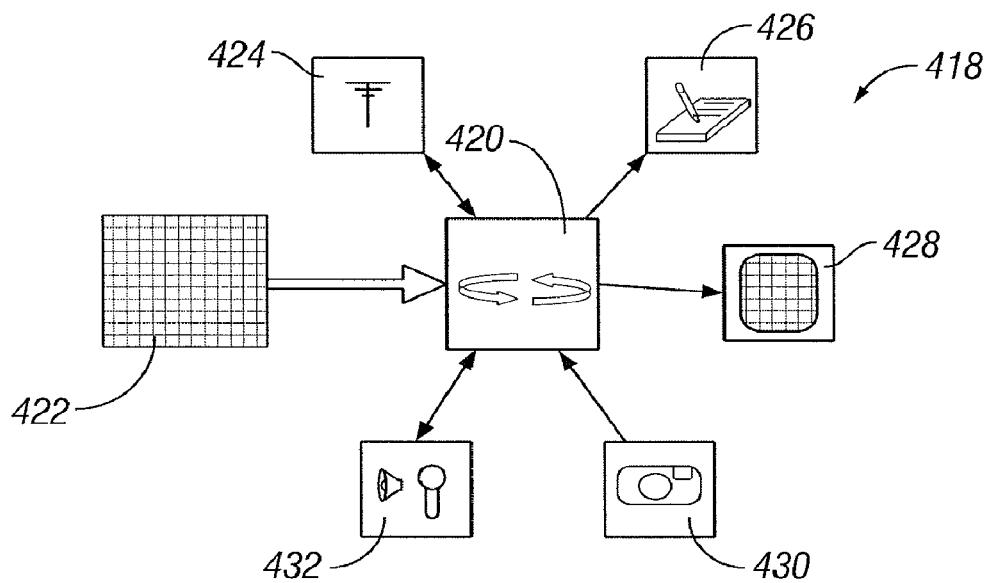

FIG. 4C schematically illustrates an exemplary general-purpose display-centric product.

Figure 5A:
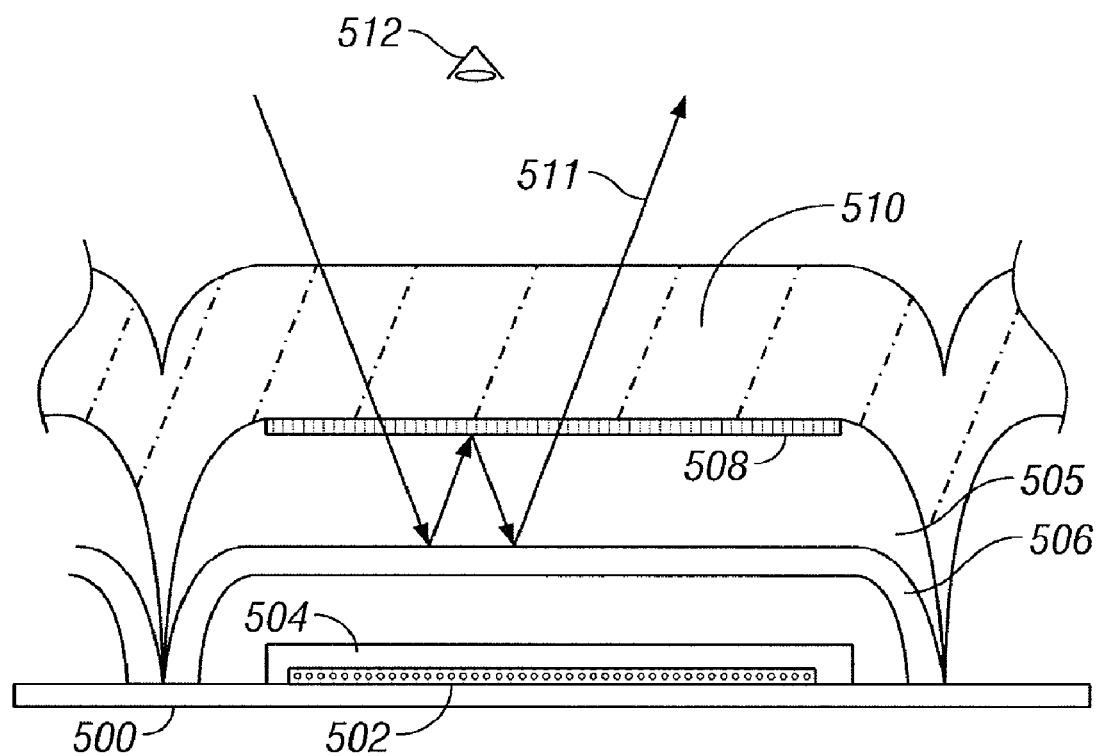

FIG. 5A schematically illustrates an exemplary interferometric modulator geometry that decouples the optical behavior from the electromechanical behavior, shown in the un-actuated state.

Figure 5B:
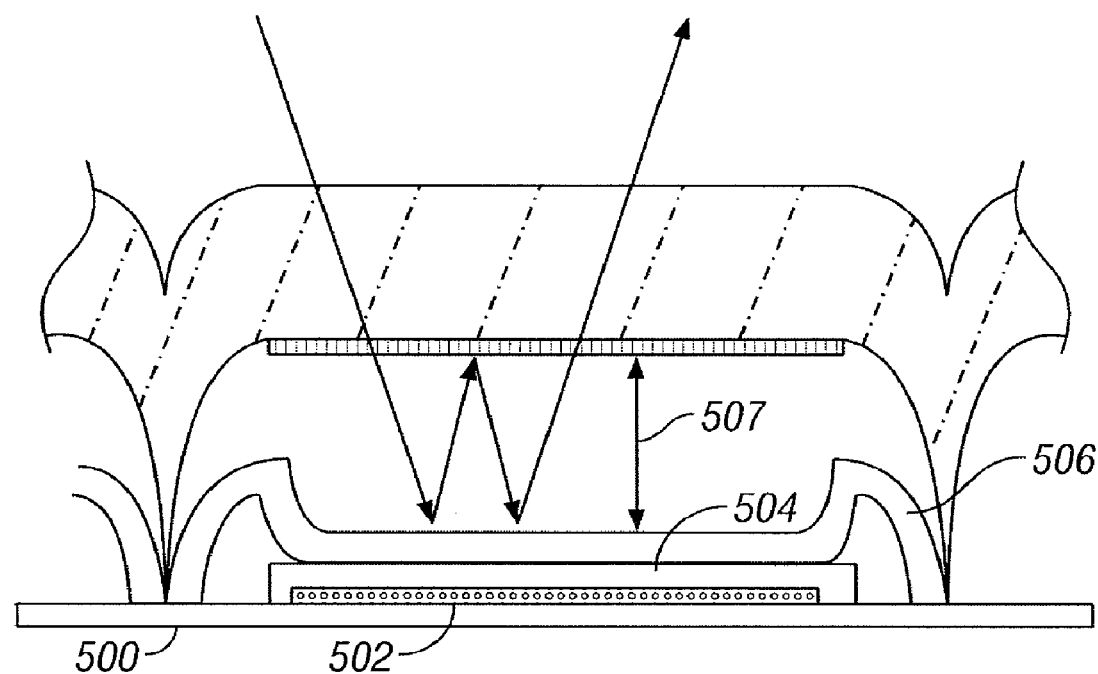

FIG. 5B schematically illustrates the interferometric modulator of FIG. 5A in the actuated state.

Figure 5C:
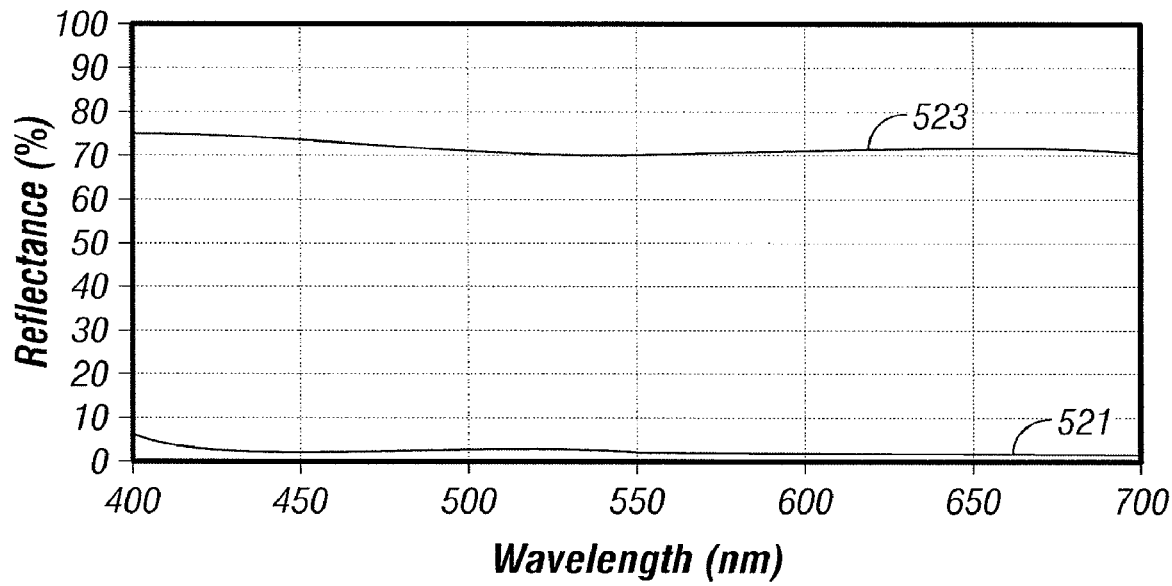

FIG. 5C is a plot showing the performance of the interferometric modulator design of FIGS. 5A and 5B in the black and white state.

Figure 5D:
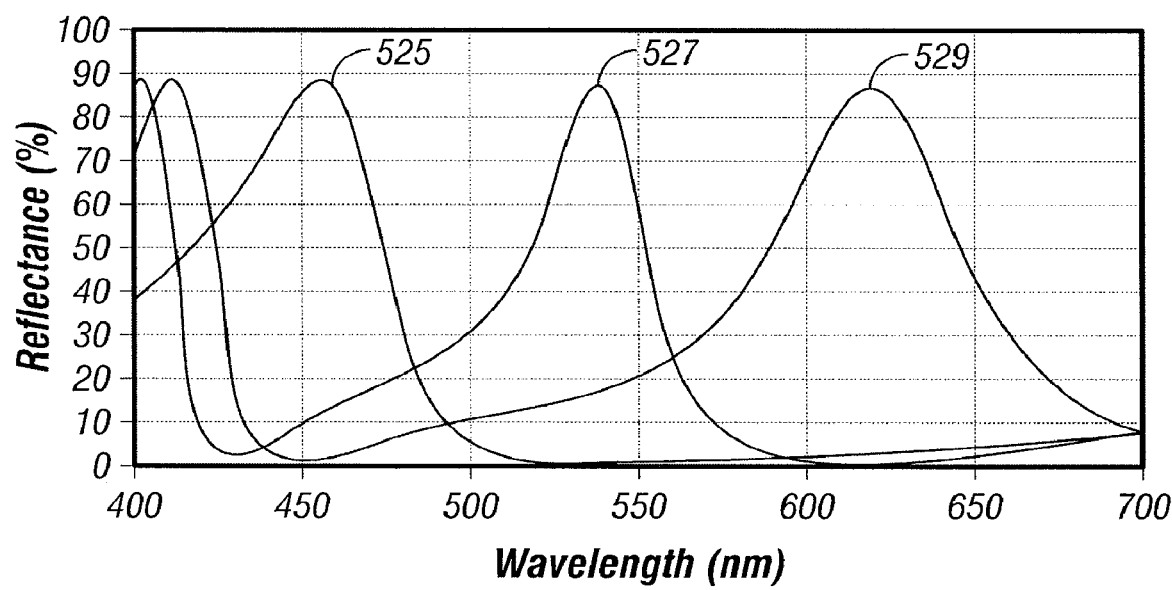

FIG. 5D is a plot showing the performance of the interferometric modulator design of FIGS. 5A and 5B in several color states.

Figure 6A:
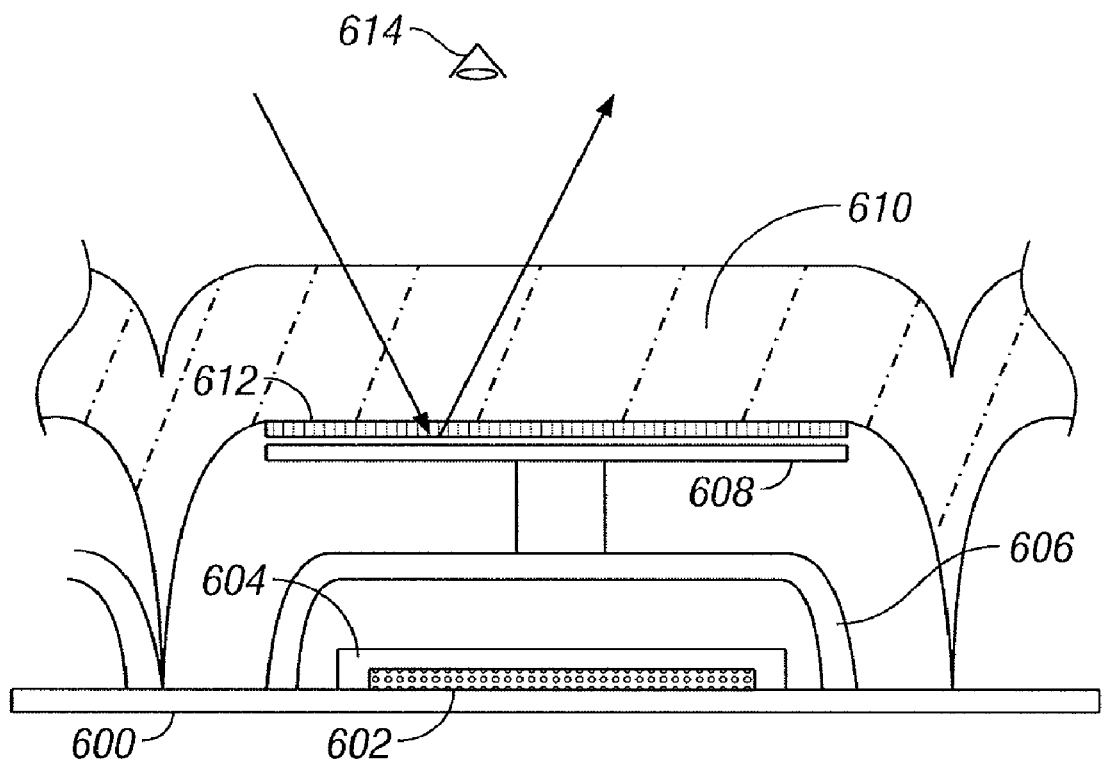

FIG. 6A schematically illustrates another exemplary interferometric modulator that decouples the optical behavior from the electromechanical behavior and which hides the support structure, the interferometric modulator shown in the un-actuated state.

Figure 6B:
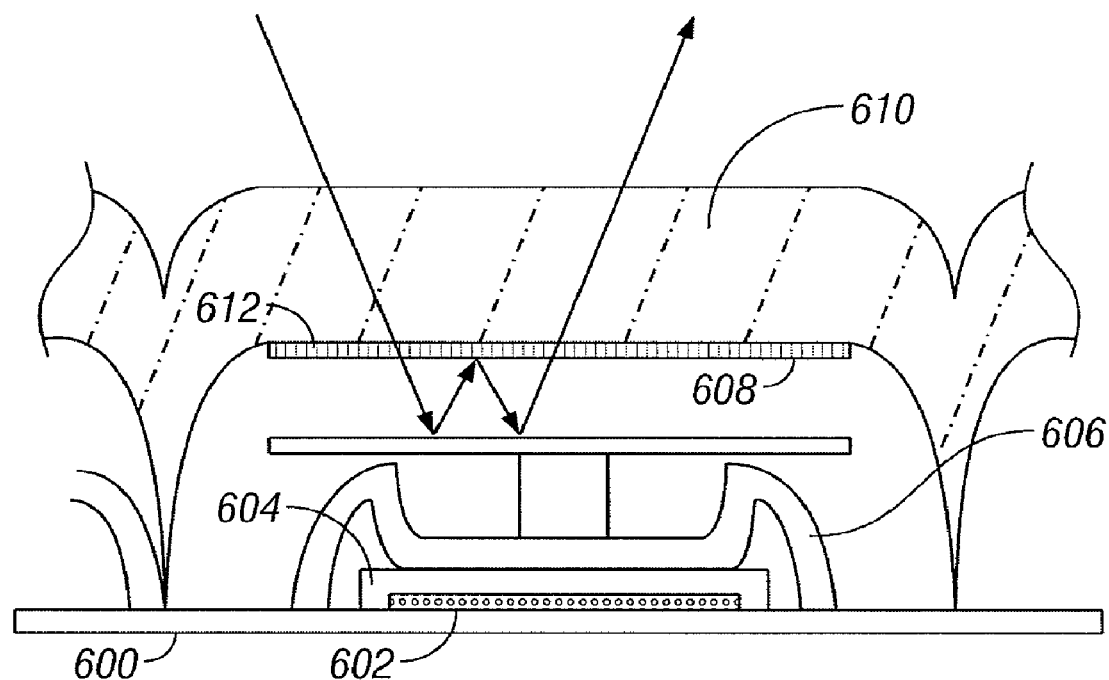

FIG. 6B schematically illustrates the interferometric modulator of FIG. 6A in the actuated state.

Figure 7A:
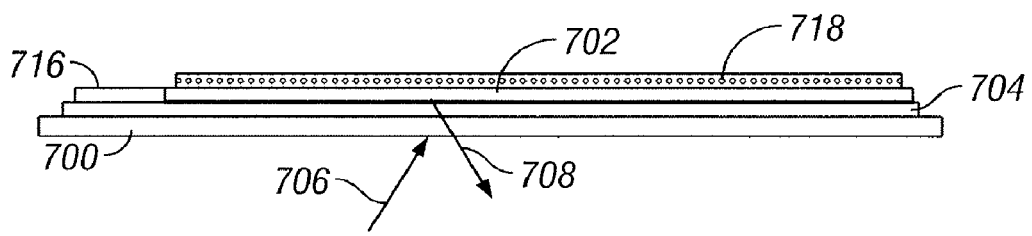

FIG. 7A schematically illustrates an exemplary interferometric modulator design that utilizes anisotropically stressed membranes, in one state.

Figure 7B:
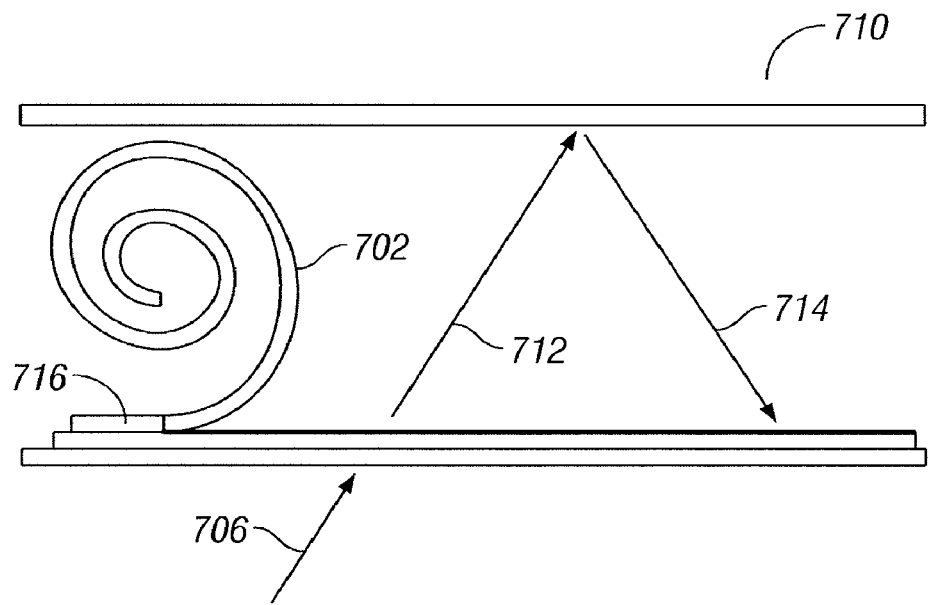

FIG. 7B schematically illustrates the interferometric modulator of FIG. 7A in another state.

Figure 8A:
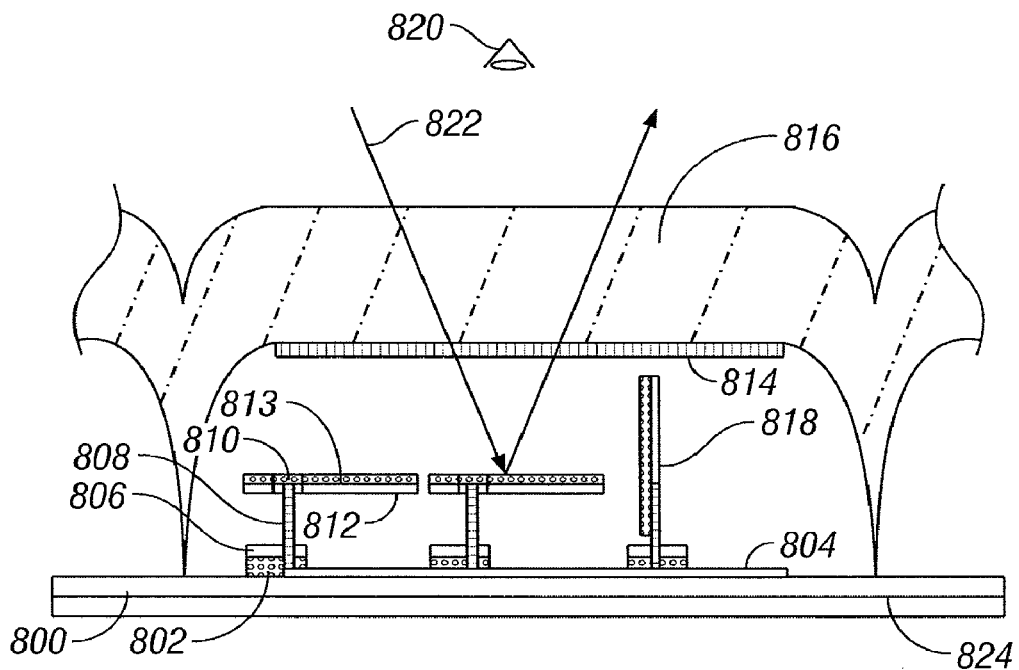

FIG. 8A schematically illustrates an exemplary interferometric modulator that utilizes rotational actuation.

Figure 8B:
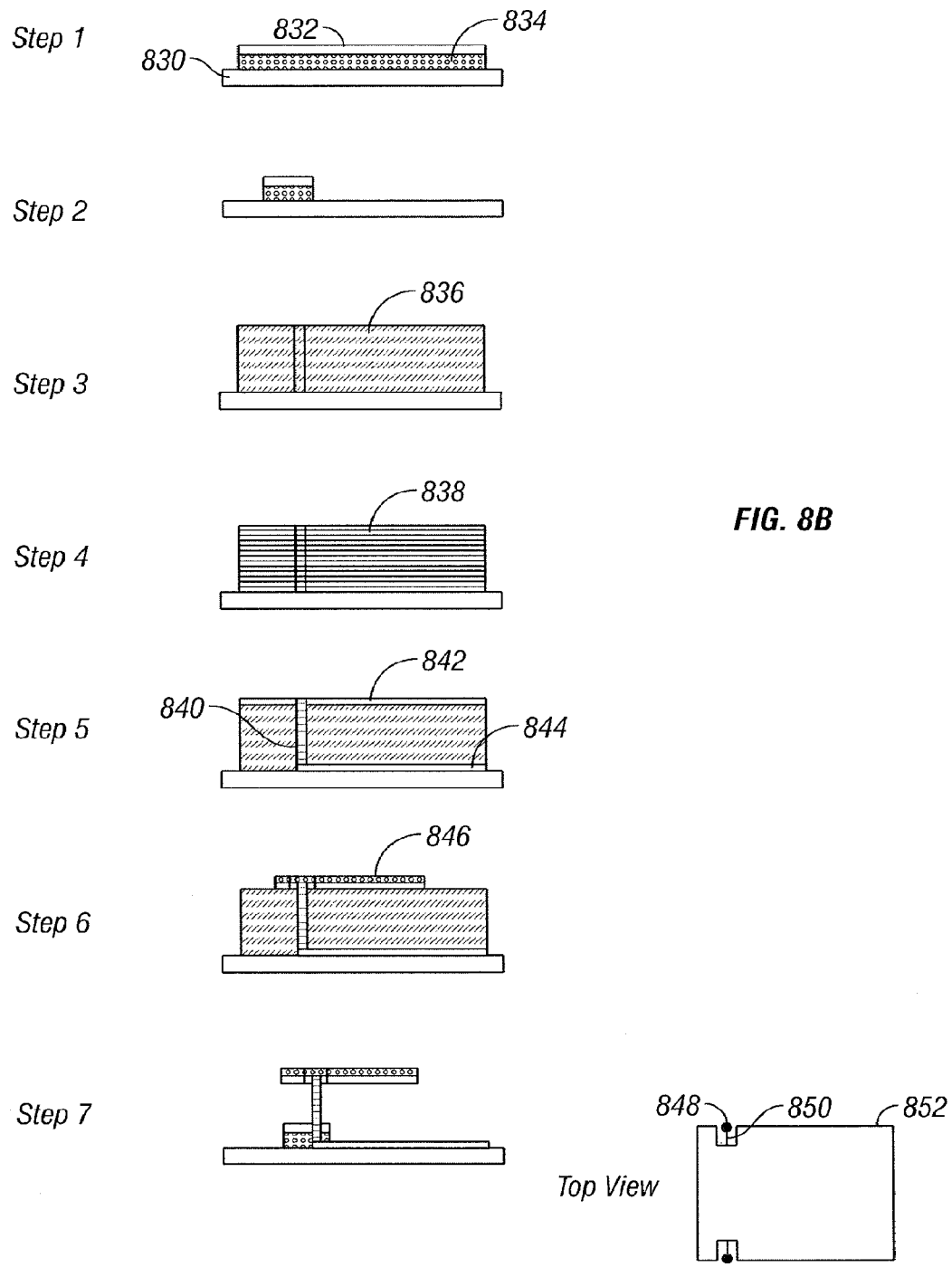

FIG. 8B schematically illustrates an exemplary fabrication sequence of the interferometric modulator of FIG. 8A.

Figure 9A:
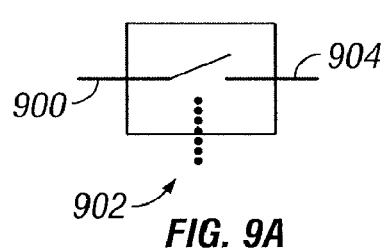

FIG. 9A is a block diagram of an exemplary MEMS switch.

Figure 9B:
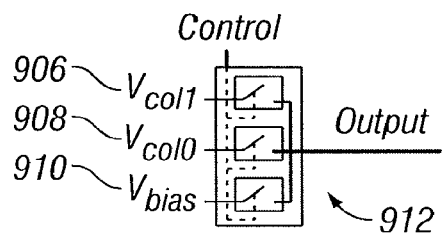

FIG. 9B is a block diagram of an exemplary row driver based on MEMS switches.

Figure 9C:
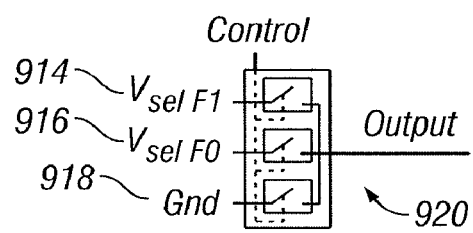

FIG. 9C is a block diagram of an exemplary column driver based on MEMS switches.

Figure 9D:
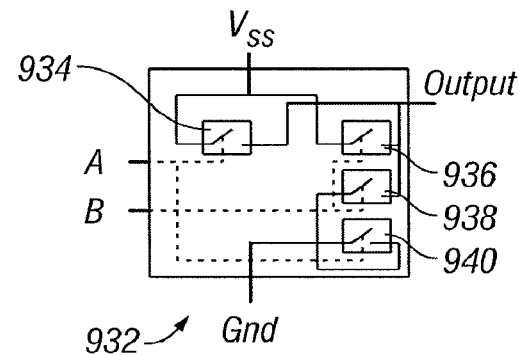

FIG. 9D is a block diagram of an exemplary NAND gate based on MEMS switches.

Figure 9E:
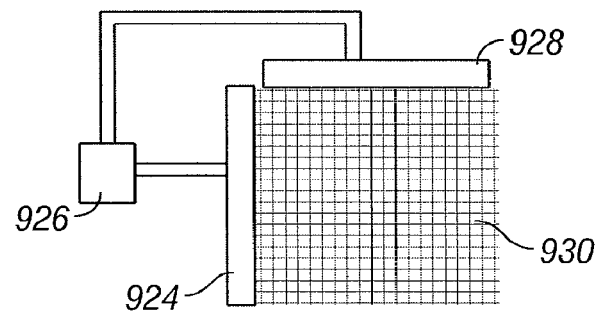

FIG. 9E is a block diagram of an exemplary display system incorporating MEMS based logic and driver components.

FIGS. 10A-10H schematically illustrate the structure, fabrication, and operation of an exemplary MEMS switch.

Figure 10I:
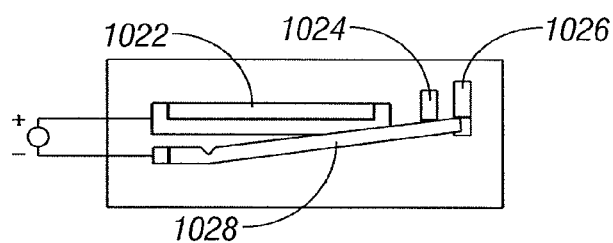
Figure 10J:
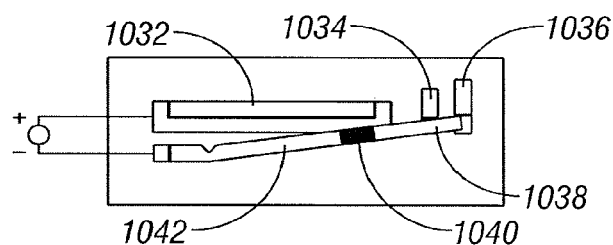

FIGS. 10I and 10J illustrate two alternative exemplary switch designs.

Figure 11A:
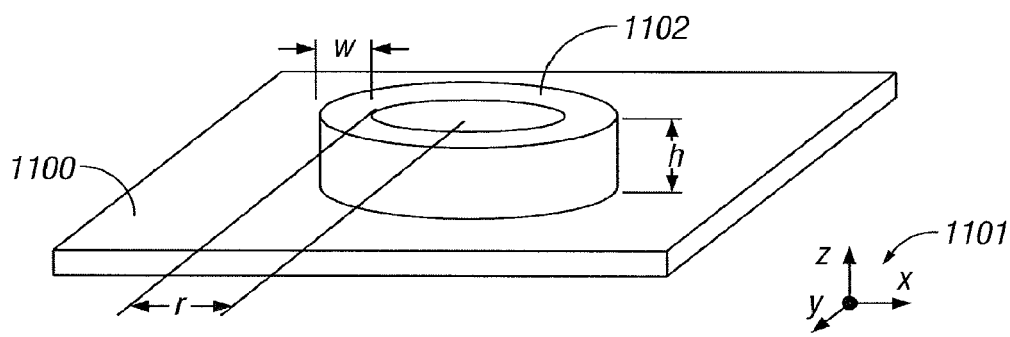

FIG. 11A schematically illustrates an exemplary microring based 2-D photonic structure.

Figure 11B:
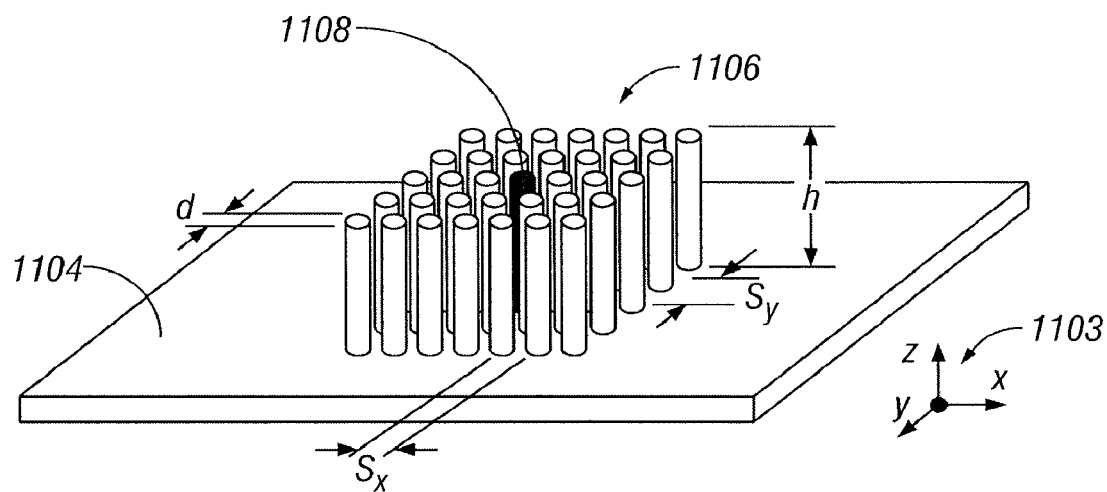

FIG. 11B schematically illustrates an exemplary periodic 2-D photonic structure.

Figure 12:
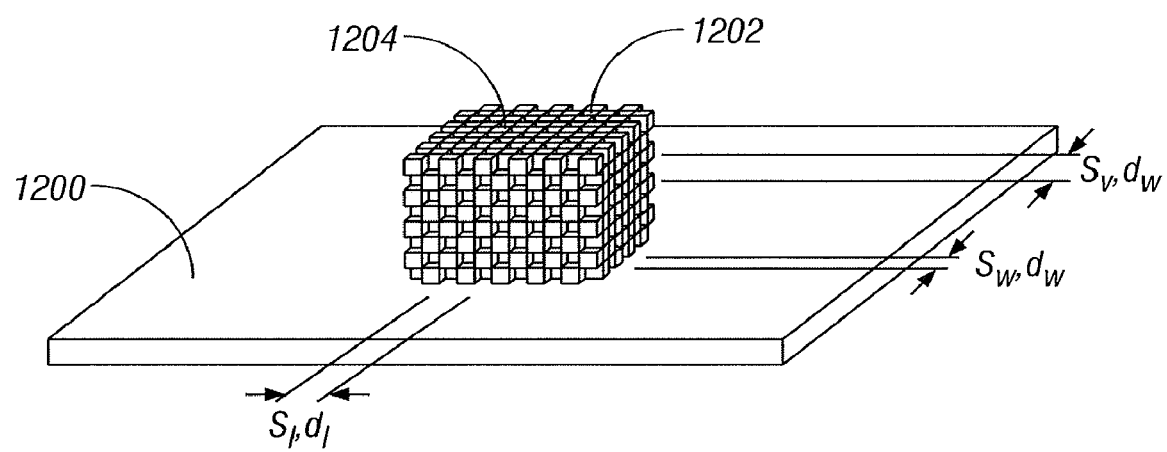

FIG. 12 schematically illustrates an exemplary 3-D photonic structure.

Figure 13A:
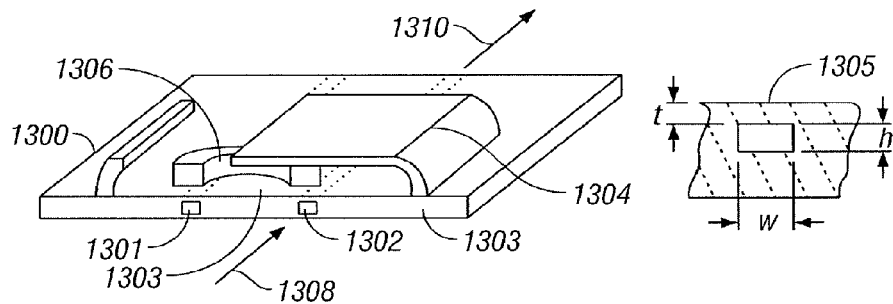

FIG. 13A schematically illustrates an exemplary interferometric modulator incorporating a microring structure in the un-actuated state.

Figure 13B:
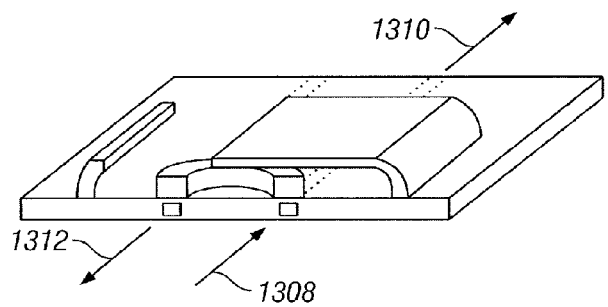

FIG. 13B schematically illustrates the interferometric modulator of FIG. 13A in the actuated state.

Figure 13C:
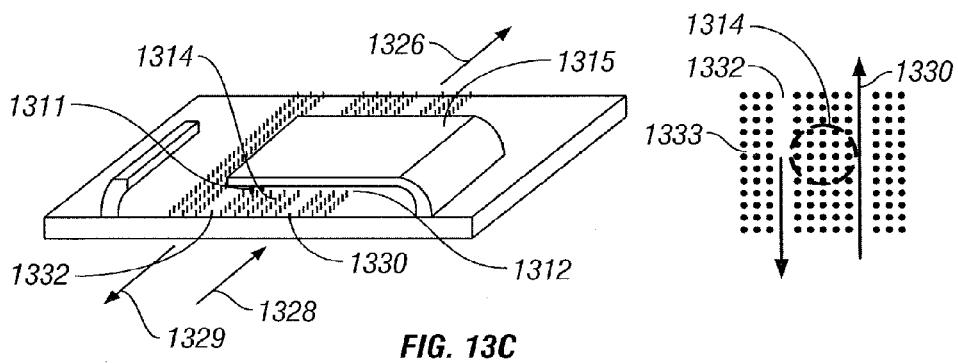

FIG. 13C schematically illustrates an exemplary interferometric modulator incorporating a periodic 2-D photonic structure.

Figure 14A:
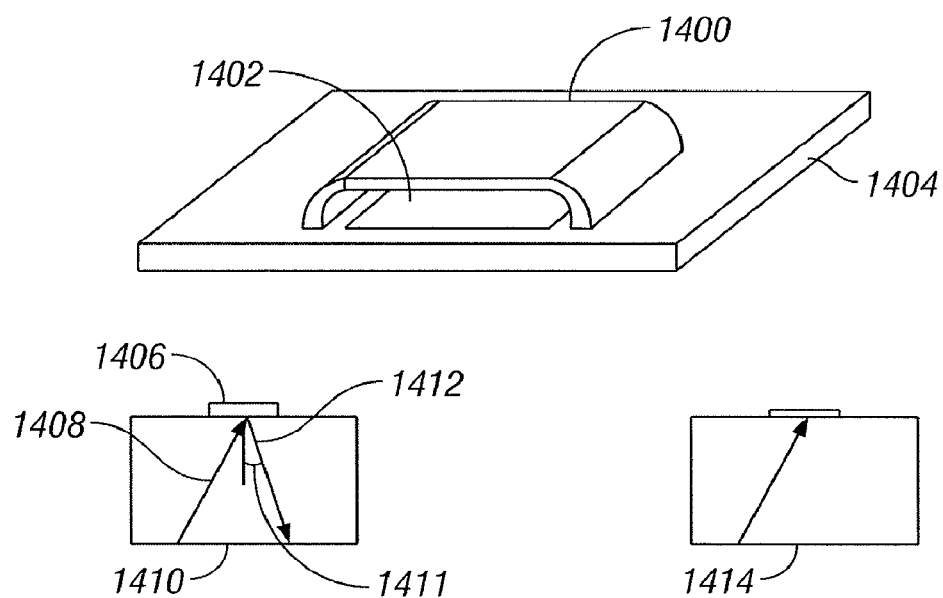

FIG. 14A schematically illustrates an exemplary interferometric modulator which acts as an optical switch.

Figure 14B:
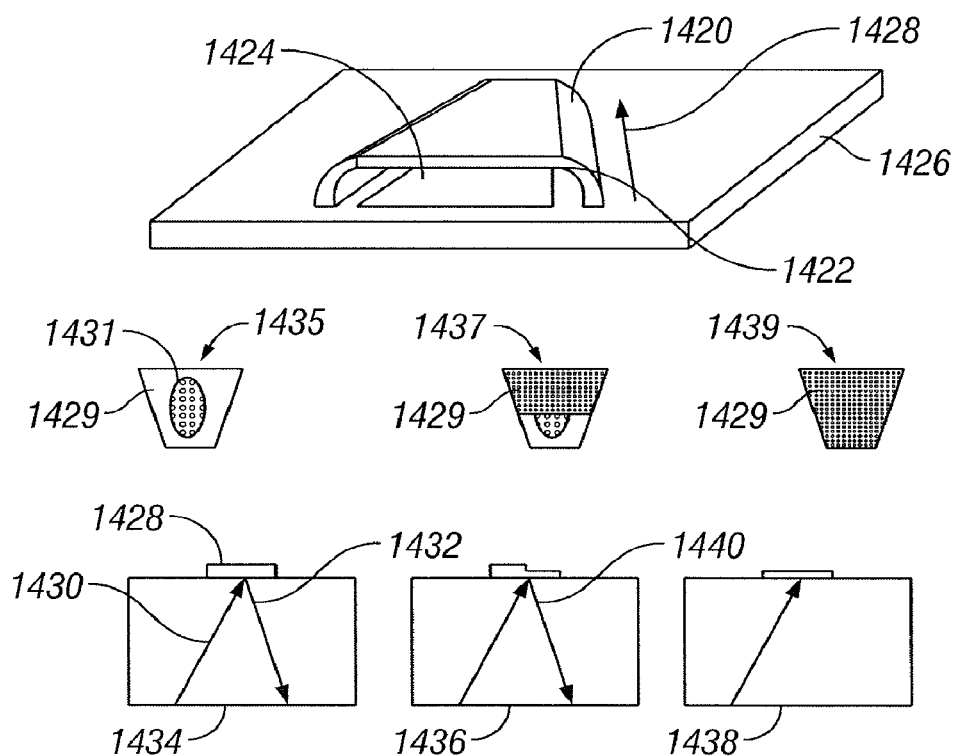

FIG. 14B schematically illustrates an exemplary variation of interferometric modulator of FIG. 14A that acts as an optical attenuator.

FIG. 15A schematically illustrates an exemplary interferometric modulator that functions as an optical switch or optical decoupler.

Figure 15B:
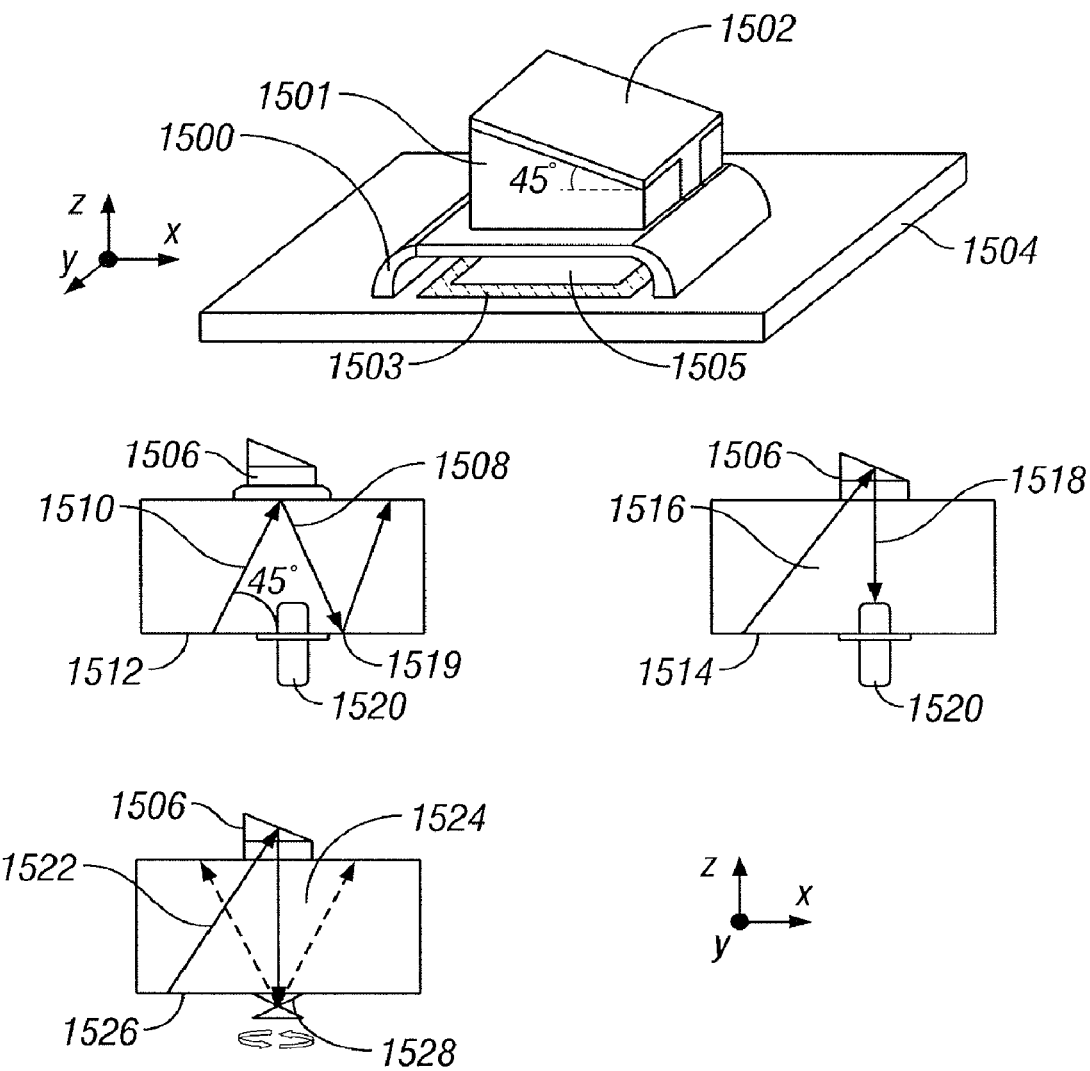
Figure 15B:
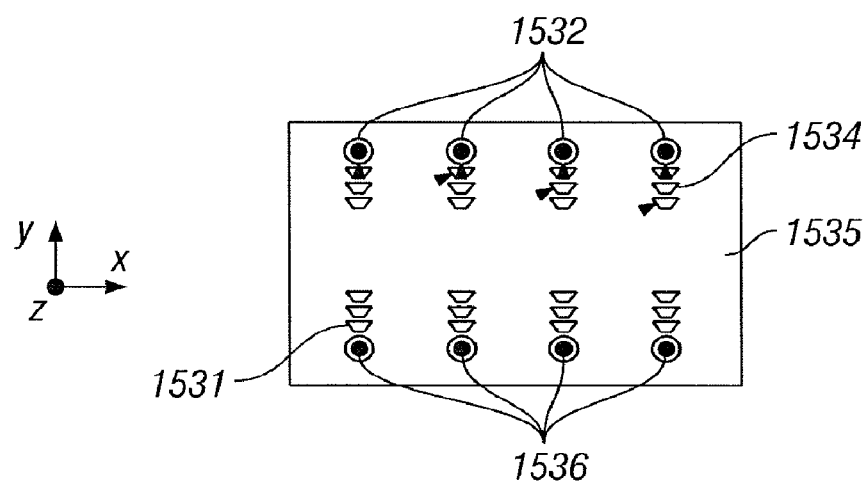

FIG. 15B schematically illustrates a combination of interferometric modulators acting as a N×N optical switch.

Figure 16:
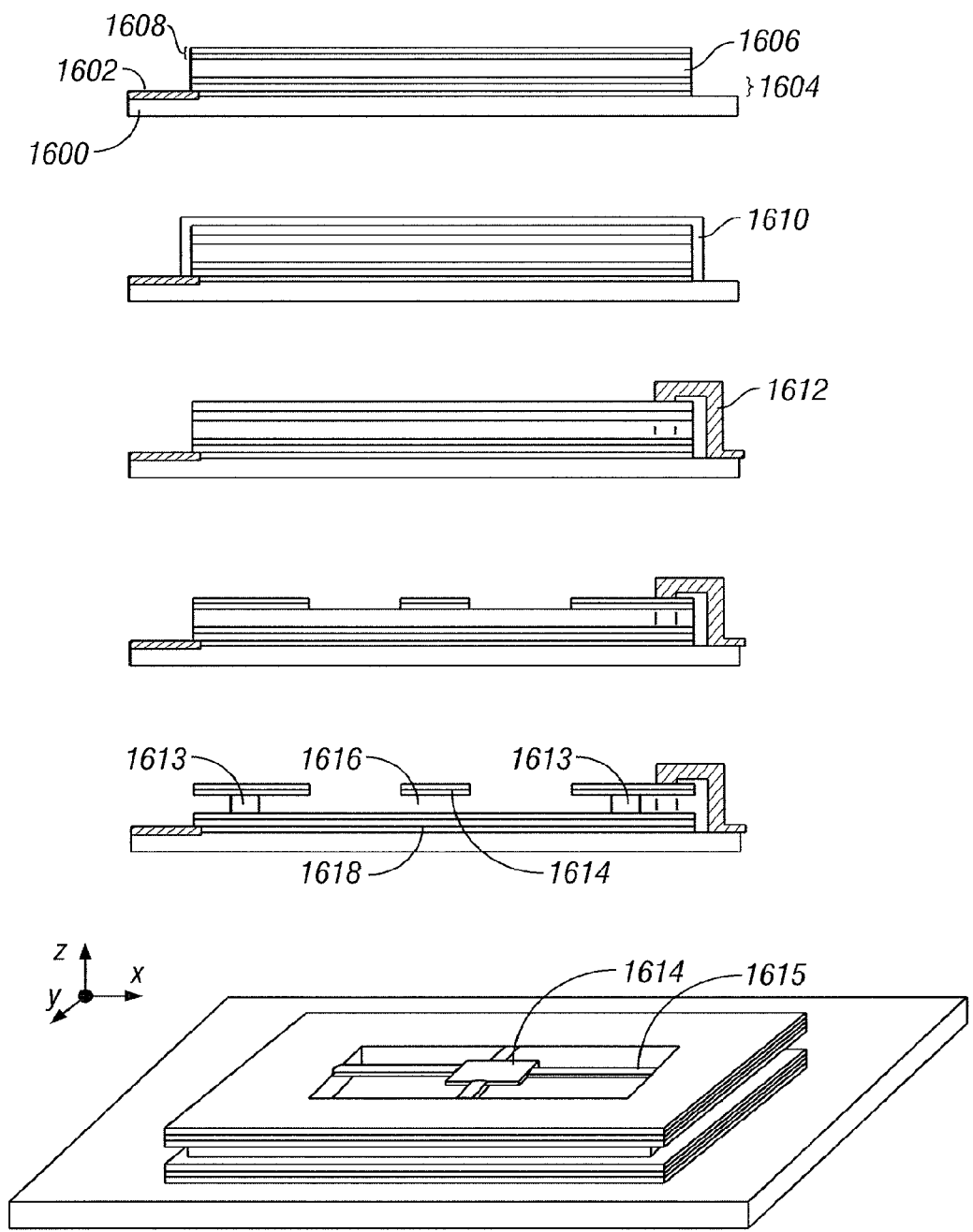

FIG. 16 schematically illustrates an exemplary fabrication sequence for a tunable interferometric modulator structure.

Figure 17A:
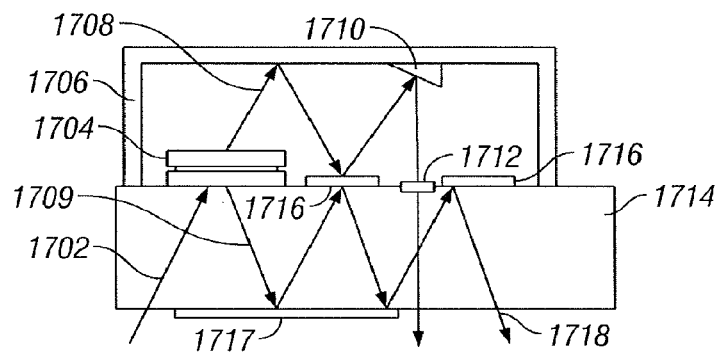

FIG. 17A schematically illustrates an exemplary tunable interferometric modulator structure incorporated into a wavelength selective switch.

Figure 17B:
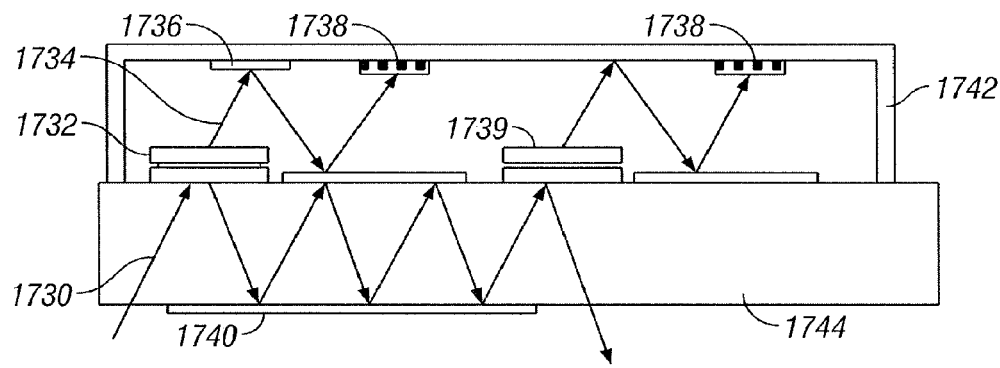

FIG. 17B schematically illustrates the wavelength selective switch of FIG. 17A further incorporating solid state devices.

Figure 17C:
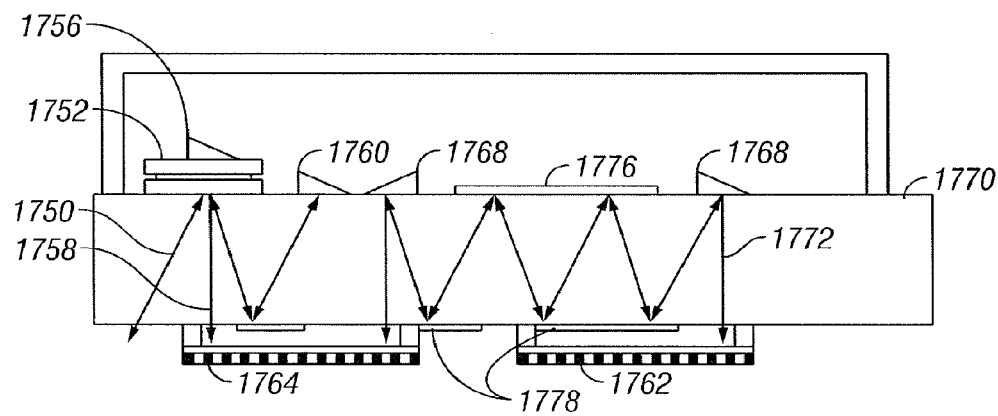

FIG. 17C schematically illustrates bump-bonded components integrated with the wavelength selective switch.

Figure 18A:
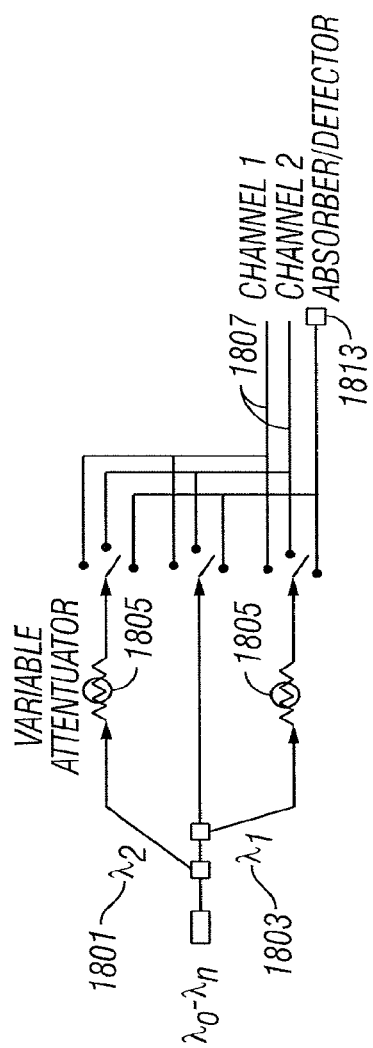

FIG. 18A is a schematic representation of an exemplary two-channel equalizer/mixer.

Figure 18B:
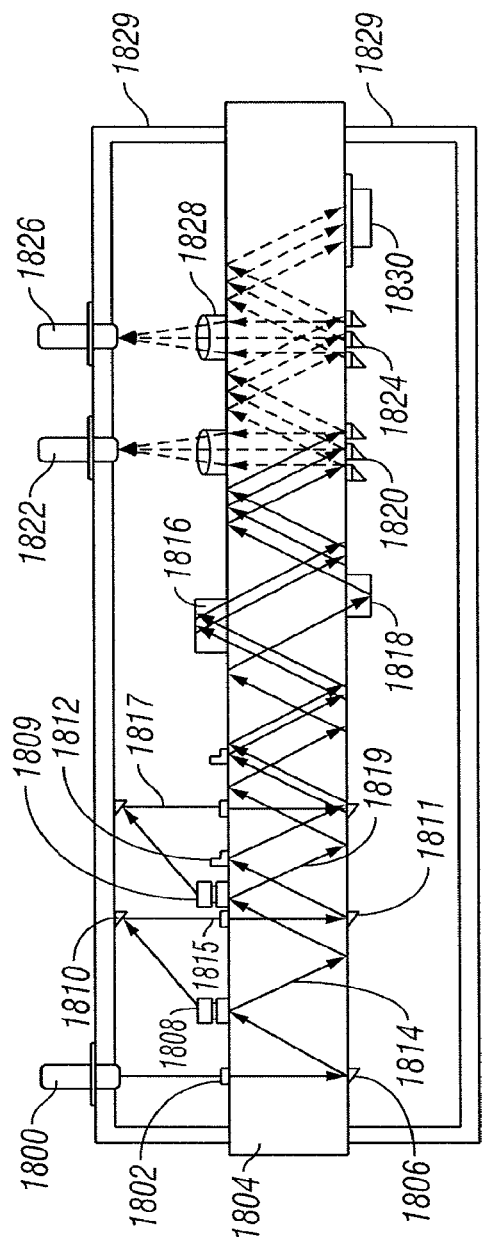

FIG. 18B schematically illustrates an exemplary implementation of the equalizer/mixer of FIG. 18B using interferometric modulator based components.

Figure 19:
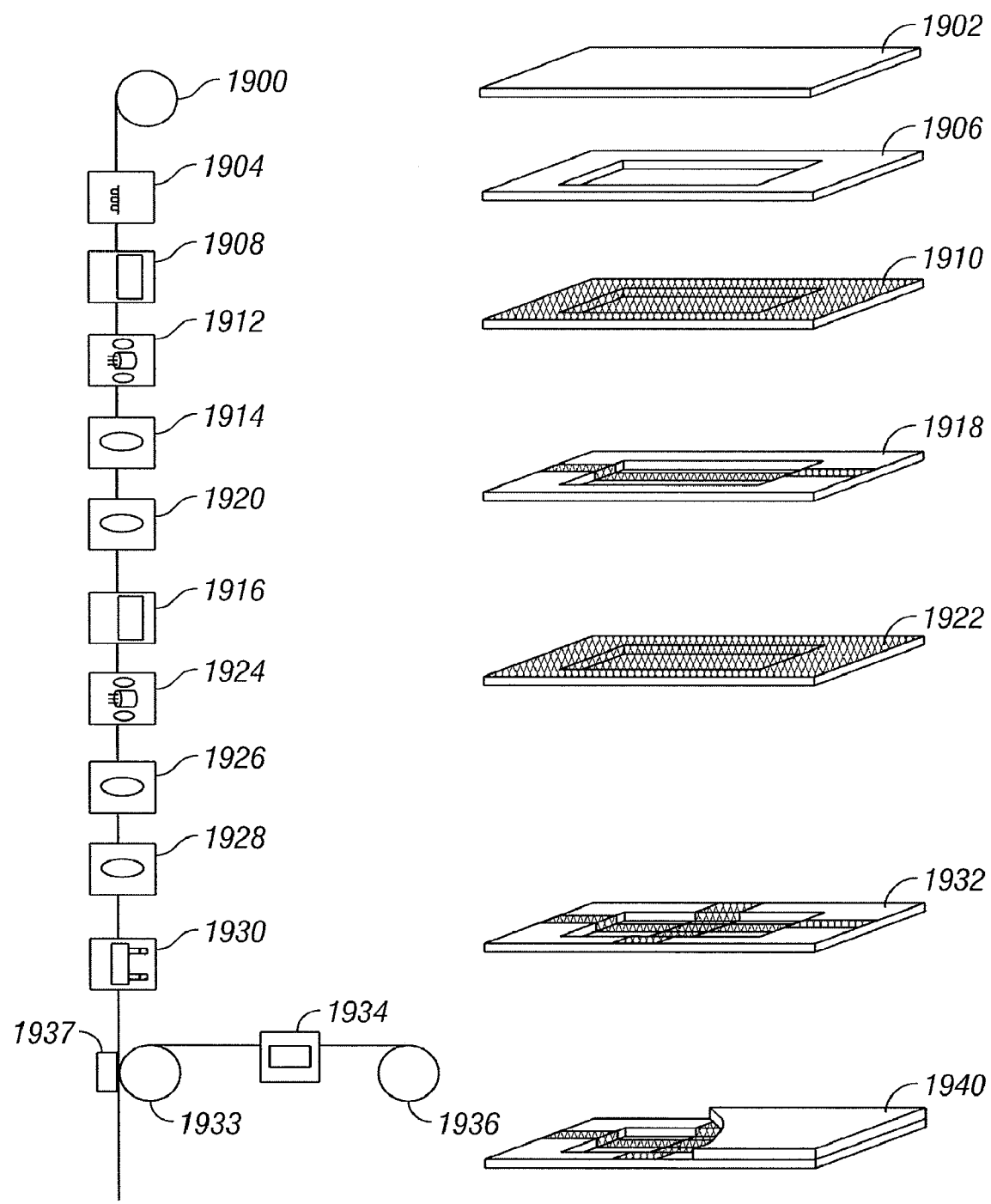

FIG. 19 schematically illustrates a continuous web-based fabrication process.

FIG. 20 schematically illustrates an exemplary interferometric modulator based test structure suitable for use as a tool for stress measurement. FIGS. 20A-20F schematically illustrate deformations in the membrane layer of an interferometric modulator leading to changes in the colors displayed by the interferometric modulator. FIG. 20G schematically illustrates an exemplary system that can be used to assess the residual stress state of a deposited film.

FIGS. 21A-21E schematically illustrate discontinuous films. FIG. 21A schematically illustrates an exemplary form of a discontinuous film that has unique antireflective properties. FIGS. 21B and 21C schematically illustrate an exemplary film in the early stages of formation. FIGS. 21D and 21E schematically illustrate an exemplary perforated discontinuous film.

Figure 22A:
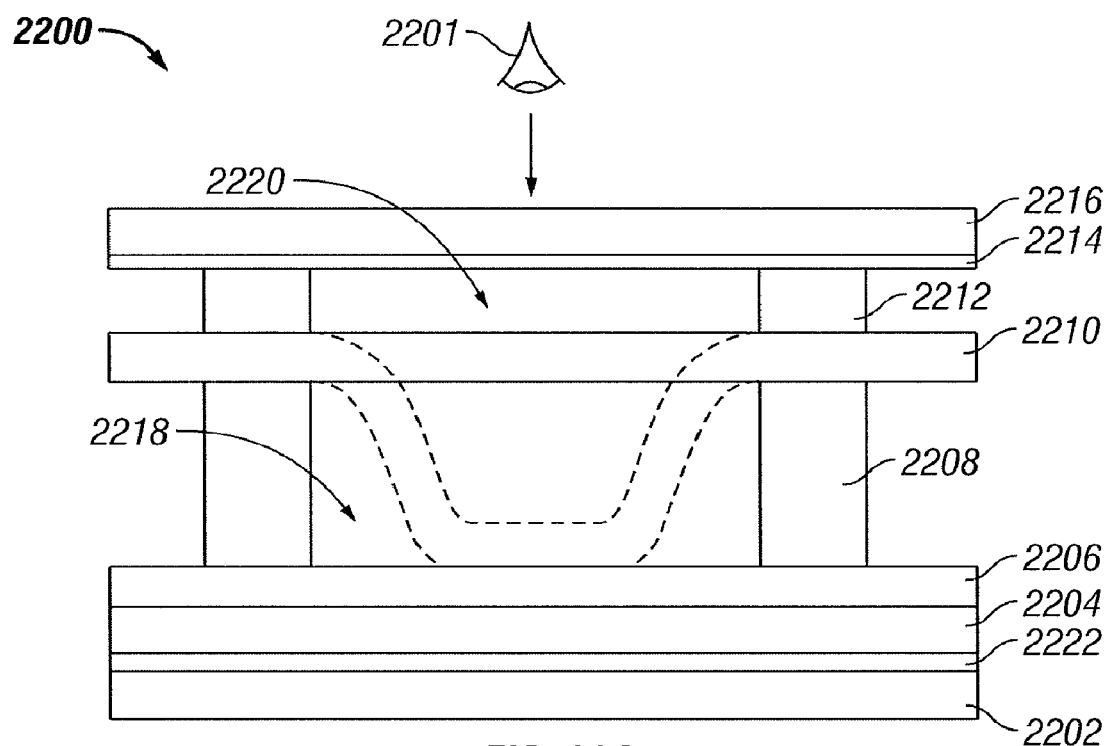

FIG. 22A schematically illustrates an example of an inverse-type interferometric modulator in which the configuration decouples the optical and electromechanical properties of the device.

Figure 22B:
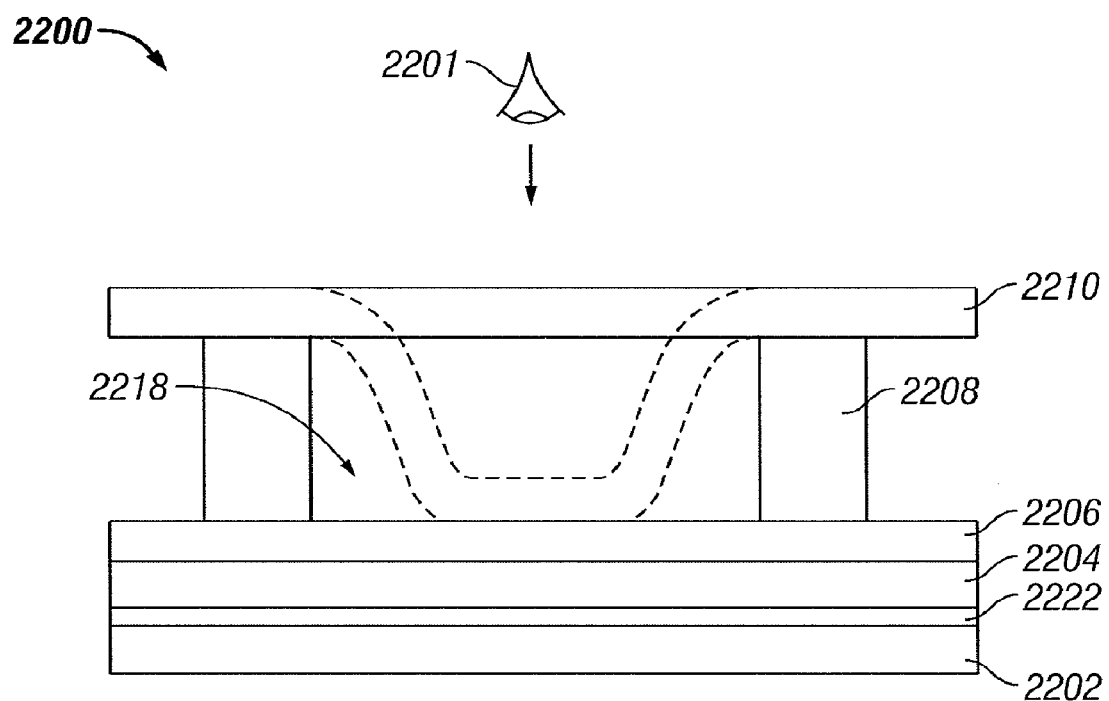

FIG. 22B schematically illustrates another exemplary inverse-type interferometric modulator in which the substrate is highly reflective.

Figure 23A:
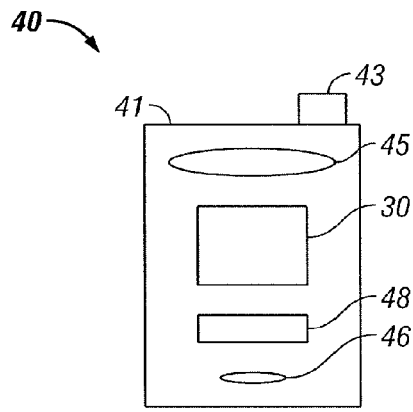
Figure 23B:
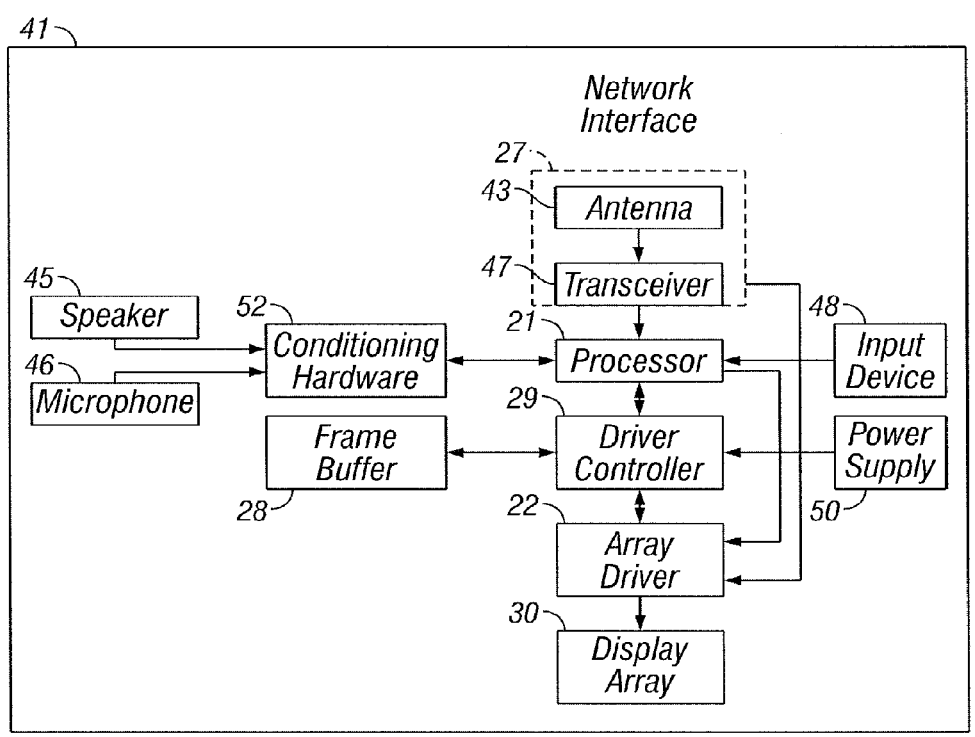

FIGS. 23A and 23B are system block diagrams illustrating an exemplary display device comprising interferometric modulators.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Anti-Reflective Coatings

An attribute of one previously described interferometric modulator design is the efficiency of its dark state, in which it can absorb as much as 99.7% of light which is incident upon it. This high dark state efficiency is useful in reflective displays. In the described design, the interferometric modulator reflects light of a certain color in the un-actuated state, and absorbs light in the actuated state.

Because the interferometric modulator array resides on a substrate, the potential for absorption is diminished by the inherent reflection of the substrate. In the case of a glass substrate, the amount of reflection is generally about 4% across the visible spectrum. Thus, despite the absorptive capability of the interferometric modulator structure, a dark state can only be as dark as the front surface reflection from the substrate will permit.

One way to improve the overall performance of an interferometric modulator based display is by the incorporation of anti-reflection coatings (AR coatings). These coatings can comprise one or more layers of dielectric films deposited on the surface of a substrate, and are designed to reduce the reflection from that surface. There are many different possible configurations for such films, and their design and fabrication is a well known art. One simple film design is a single coating of magnesium fluoride with a thickness of approximately one-quarter of the wavelength of light of interest. Another example utilizes a quarter wave film of lead fluoride deposited on the glass, followed by a quarter wave film of magnesium fluoride, with yet a third example interposing a film of zinc sulfide between the two.

Figure 1A:
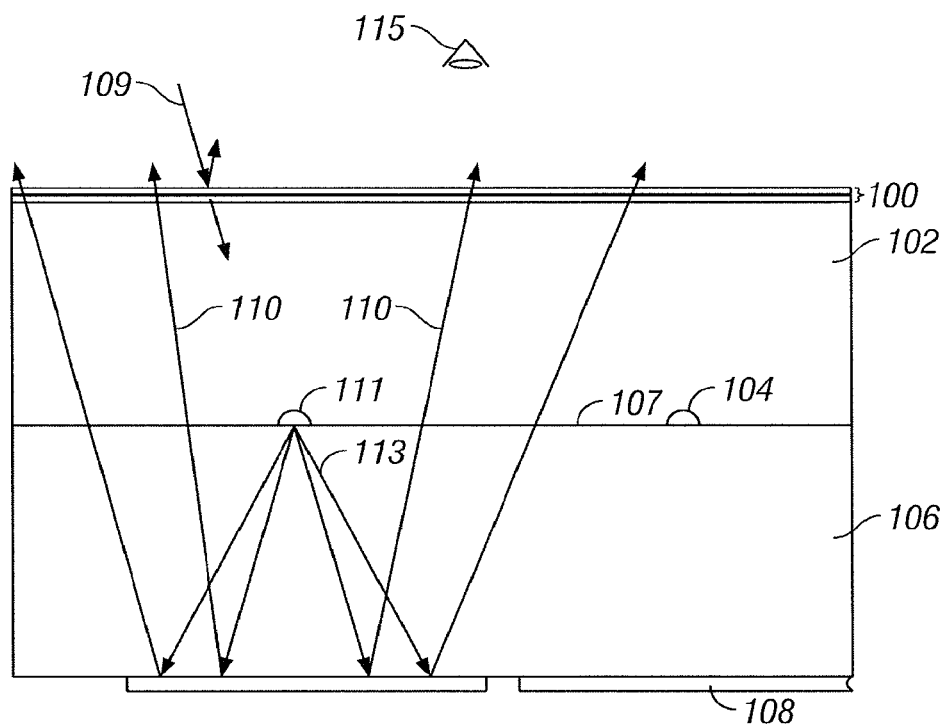

FIG. 1A illustrates an exemplary way in which an AR coating may be incorporated into an interferometric modulator display to improve the performance of the display system. In FIG. 1A, AR coating 100, which, as stated, could comprise one or more thin films, is deposited on the surface of glass layer 102 bonded to glass substrate 106, on the opposite side of which is fabricated interferometric modulator array 108. The presence of AR coating 100 in certain embodiments reduces the amount of incident light 109 reflected from the surface by coupling more of it into the glass layer 102. The result is that more of the incident light 109 is acted upon by the interferometric modulator array 108 and a darker display state can be obtained when the interferometric modulator is operating in the absorptive mode. The AR coating 100 in certain embodiments could also be deposited directly on the surface of glass substrate 106 on the side opposite that of the interferometric modulator array 108.

Integrated Lighting

FIG. 1A also shows how supplemental illumination sources may be supplied to such a display in certain embodiments. In the exemplary embodiment of FIG. 1A, an array of microscopic arc lamps 104, is fabricated into glass layer 102. Arc lamps are efficient suppliers of light. Historically, arc lamps have been fabricated using techniques relevant to the fabrication of ordinary light bulbs. A typical version of such a lamp is described in U.S. Pat. No. 4,987,496. A glass vessel is built, and electrodes, fabricated separately, are enclosed in the vessel. After filling with an appropriate gas, the vessel is sealed. Although such bulbs may be made sufficiently small, their method of manufacture may not be suited to the fabrication of large monolithic arrays of such bulbs.

Techniques used in the manufacture of micromechanical structures may be applied to the fabrication of microscopic discharge or arc lamps. Because of the microscopic size of these "micro-lamps," the voltages and currents to drive them in certain embodiments are significantly lower than those required to supply arc lamps fabricated using conventional means and sizes. In the example of FIG. 1A, the array is fabricated such that light 113 emitted by the lamps 104 is directed towards the interferometric modulator array 108 by an inherent reflector layer 111, which is described below.

Figure 2:
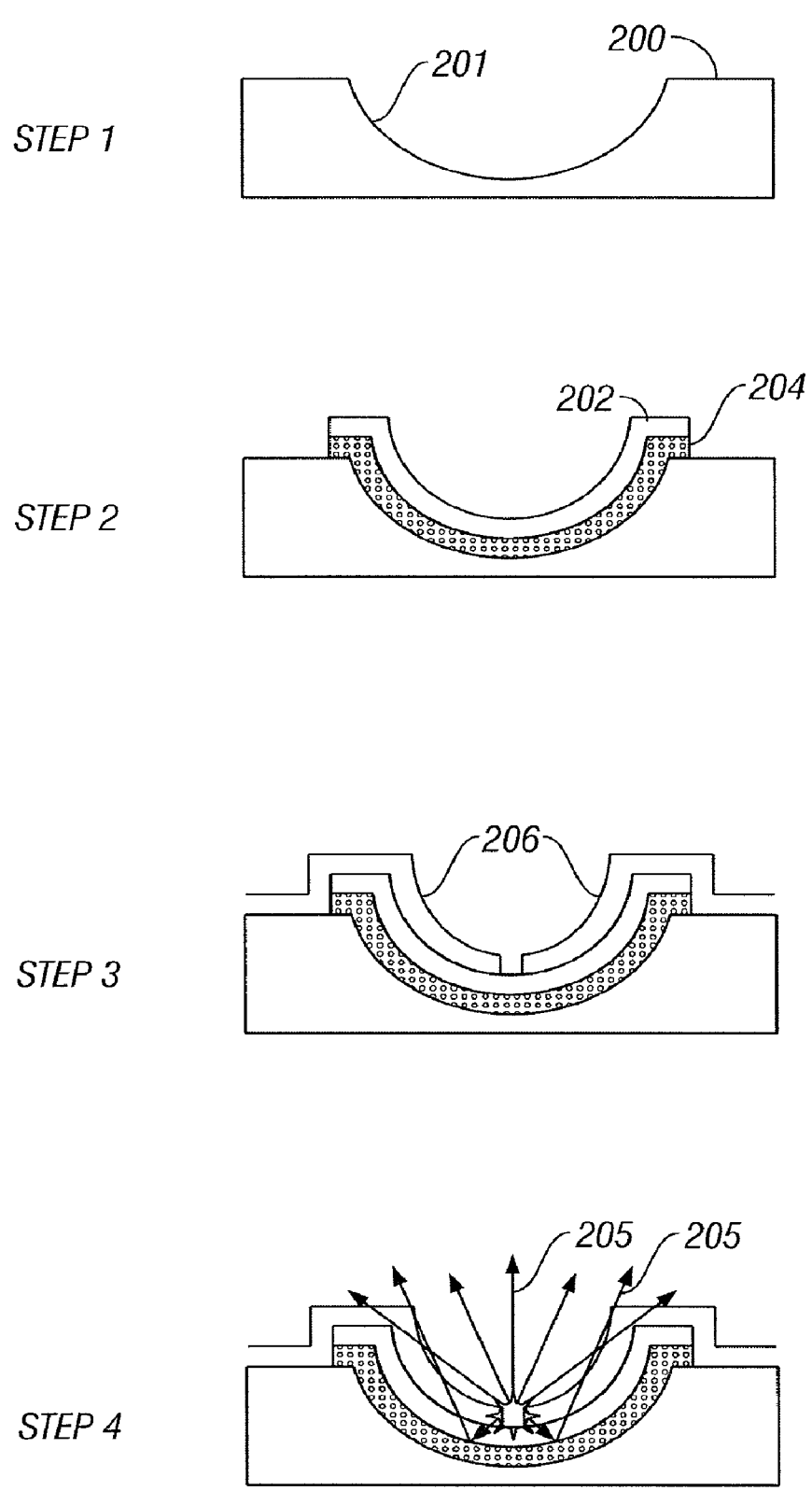

FIG. 2 provides details on how one such exemplary lamp, optimized for a flat panel display, could be fabricated. The sequence is described as follows. As seen in step 1, glass layer 200 is etched to form a reflector bowl 201 using wet or dry chemical etching. The depth and shape of the bowl are determined by the required area of illumination for each lamp. A shallow bowl would produce a broad reflected beam spread while a parabola would tend to collimate the reflected light. The diameter of the bowl could vary from 10 to several hundred microns. This dimension is determined in certain embodiments by the amount of display area that can be acceptably obscured from the viewer's perspective. It is also a function of the density of the array of micro-lamps. In step 2, a reflector/metal halide layer 204 and sacrificial layer 202 are deposited and patterned using standard deposition techniques, e.g., sputtering, and standard photolithographic techniques. The reflector/metal halide layer could be a film stack comprising aluminum (the reflector) and metal halides such as thallium iodide, potassium iodide, and indium iodide. The metal halide, while not essential, can enhance the properties of the light that is generated. The sacrificial layer could be a layer such as silicon, for example.

Next, in step 3, electrode layer 206 is deposited and patterned to form two separate electrodes. This material could be a refractory metal like tungsten and would have a thickness that is sufficient to provide mechanical support, on the order of several thousand angstroms. Then sacrificial layer 202 is removed using a dry release technique. The assembly (in the form of an array of such lamps) is sealed in certain embodiments by bonding to a glass plate-like substrate 106 (shown in FIG. 1A) such that the reflector faces the plate. A gas, such as xenon, is used to backfill the cavities, formed by the lamps during the sealing process, to a pressure of approximately one atmosphere. This could be accomplished by performing the sealing process in an airtight chamber that has been previously filled with xenon.

In step 4, the application of sufficient voltage to the electrodes of each lamp will result in an electrical discharge, in the gas between the ends of the electrodes, and the emission of light 205 in a direction away from the reflector 204. This voltage could be as low as several tens of volts if the gap spacing is on the order of several hundred microns or less. If the electrode material is deposited with minimal stress, the sacrificial layer 202 will determine the position of the electrodes within the bowl. In this case, the thickness is chosen in certain embodiments to position the discharge at the focal point of the bowl. Should there be residual stress, which would cause the electrodes to move when released, the thickness is chosen in certain embodiments to compensate for this movement. In general the thickness will be some fraction of the depth of the bowl, from several to tens of microns.

Referring again to FIG. 1A, the light is shown traveling along a path 113. Thus, light is emitted towards the interferometric modulator array, where it is acted on and subsequently reflected by the array along paths 110, towards interface 107 and the viewer 115.

The lamps may be fabricated without including the reflector layer so that they may emit light omnidirectionally.

Lamps fabricated with or without the reflector may be used in a variety of applications requiring microscopic light sources or light source arrays. These could include projection displays, backlights for emissive flat panel displays, or ordinary light sources for internal (homes, buildings) or external (automobiles, flashlights) use.

Figure 1B:
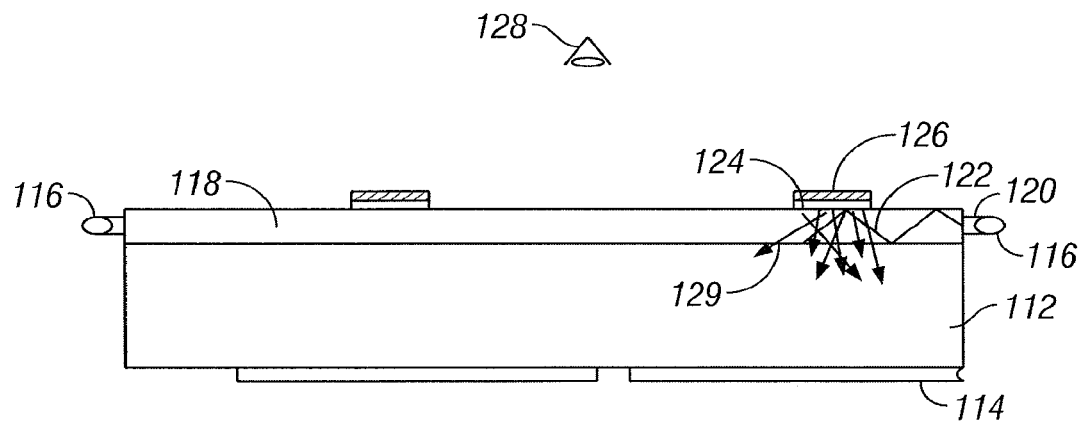

Referring to FIG. 1B, an alternative exemplary supplemental illumination source approach is shown. Light guide 118 comprises a glass or plastic layer that has been bonded to substrate 112. Light source 116, which could comprise any number of emissive sources such as fluorescent tubes, LED arrays, or the aforementioned micro-lamp arrays, is mounted on opposite sides of the light guide. The light 122 is coupled into the light guide using a collimator 120 such that most of the light is trapped within the guide via total internal reflection. Scatter pad 124 is an area of the light guide that has been roughened using wet or dry chemical means. The scatter pad is coated with a material or thin film stack 126 which presents a reflective surface towards substrate 112 and an absorbing surface towards the viewer 128.

When light trapped within the guide is incident upon the scatter pad, the conditions for total internal reflection are violated and some portion 129 of the light scatters in all directions. Scattered light which would normally escape into the surrounding medium towards the viewer 128 is reflected into substrate 112 due to the presence of the reflective side of coating 126. Like the aforementioned micro-lamps, the scatter pads of certain embodiments are fabricated in an array, with each pad dimensioned such that the portion of the display that it obscures from direct view is hardly noticeable. While these dimensions are small, on the order of tens of microns, they can provide sufficient supplemental lighting because of the inherent optical efficiency of the underlying interferometric modulator array 114. The shape of the scatter pad may be circular, rectangular, or of arbitrary shapes which may minimize their perception by the viewer.

Addressing Elements in an Array

In certain embodiments, in order to actuate arrays of interferometric modulators in a coordinated fashion for display purposes, a sequence of voltages is applied to the rows and columns of the array in what is generally known as a "line at a time" fashion. The basic concept is to apply a sufficient voltage to a particular row such that voltages applied to selected columns cause corresponding elements on the selected row to actuate or release depending on the column voltage. The thresholds and applied voltages of certain embodiments must be such that only the elements on the selected row are affected by the application of the column voltages. An entire array can be addressed over a period of time by sequentially selecting the set of rows comprising the display.

Figure 3:
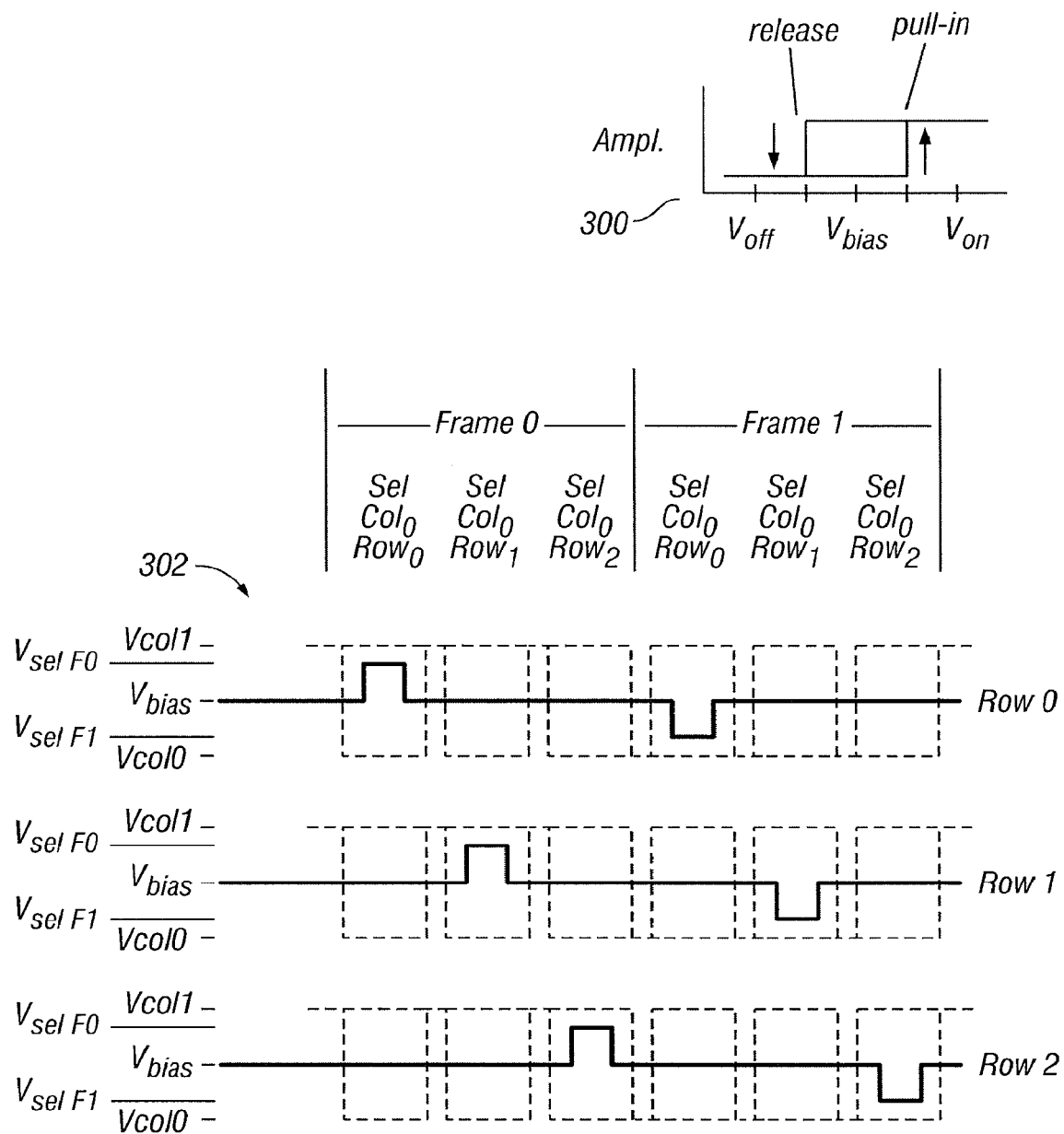
FIG. 3 illustrates an exemplary bias centered driving scheme for arrays of interferometric modulators in a display.

One exemplary simple way of accomplishing this is shown in FIG. 3. Hysteresis curve 300 is an idealized representation of the electro-optical response of a reflective interferometric modulator. The x-axis shows applied voltage, and the y-axis shows amplitude of reflected light. The interferometric modulator of certain embodiments exhibits hysteresis because, as the voltage is increased past the pull-in threshold, the interferometric modulator structure actuates and becomes highly absorbing. When the applied voltage is decreased, the applied voltage must be brought below the release threshold in order for the structure to move back into the un-actuated state. The difference between the pull-in and release thresholds produces the hysteresis window. The hysteresis effect, as well as an alternative addressing scheme, is discussed in U.S. Pat. No. 5,986,796. The hysteresis window can be exploited in certain embodiments by maintaining a bias voltage, Vbias, at all times to keep the interferometric modulator in whatever state it was driven or released into. Voltages Voff and Von correspond to voltages required to actuate or release the interferometric modulator structure. The array is driven in certain embodiments by applying voltages to the columns and rows using electronics known as column and row drivers. Interferometric modulators have been fabricated with a pull-in threshold of 6 volts, and a release threshold of 3 volts. For such a device, typical values for Vbias, Voff, and Von are 4.5 volts, 0 volts, and 9 volts respectively.

In FIG. 3, timing diagram 302 illustrates the kind of waveforms that may be applied to actuate an array of interferometric modulators that exhibit a hysteresis curve resembling curve 300. A total of five voltages, two column voltages and three row voltages, are used in certain embodiments. The voltages are selected in certain embodiments such that Vco11 is exactly twice the value of Vbias, and Vco10 is zero volts. The row voltages are selected in certain embodiments so that the difference between Vsel F0 and Vco10 equals Von, and the difference between Vsel F0 and Vco11 equals Voff. Conversely, in certain embodiments, the difference between Vsel F1 and Vco11 equals Von, and the difference between Vsel F1 and Vco10 equals Voff.

The addressing occurs in alternating frames 0 and 1. In an exemplary addressing sequence, data for row 0 is loaded into the column drivers during frame 0, resulting in either a voltage level of Vco11 or Vco10 being applied depending on whether the data is a binary one or zero, respectively. When the data has settled, row driver 0 applies a select pulse with the value of Vsel F0. This results in any interferometric modulators on columns with Vco10 present becoming actuated, and interferometric modulators on columns with Vco11 present releasing. The data for the next row is loaded into the columns and a select pulse is applied to that row, and so on sequentially until the end of the display is reached. Addressing is then begun again with row 0; however this time the addressing occurs within frame 1.

The difference between the frames is that the correspondence between data and column voltages is switched, a binary zero is now represented by Vco10, and the row select pulse is now at the level of Vsel F1. Using this technique, the overall polarity of the voltages applied to the display array is alternated with each frame in certain embodiments. This is useful, especially for MEMS based displays, because it allows for the compensation of any DC level charge buildup that can occur when only voltages of a single polarity are applied. The buildup of a charge within the structure can significantly offset the electro-optical curve of the interferometric modulator or other MEMS device.

Color Display Schemes

Because the interferometric modulator is a versatile device with a variety of potential optical responses, a number of different color display schemes are enabled having different attributes. One potential scheme exploits, the fact that there are binary interferometric modulator designs that are capable of achieving color states, dark or black states, and white states in the same interferometric modulator. This capability can be used to achieve a color scheme that can be described as "base+pigment." This terminology is used because the approach is analogous to the way in which paint colors are produced by adding pigments to a white base to achieve a desired color. Using this approach, a particular paint can attain any color in the spectrum and any level of saturation by controlling the content and amount of pigments that are added to the base. The same can be said for a display that incorporates colored and black and white pixels.

As shown in FIG. 4A, an exemplary pixel 400 comprises five subpixel elements, 402, 404, 406, and 408, with each subpixel capable of reflecting red, green, blue, and white respectively. All of the subpixels are capable of a dark state. Control over the brightness of each subpixel can be accomplished using pulse width modulation related techniques as discussed in U.S. Pat. No. 5,835,255. In conjunction with properly selected relative subpixel sizes, this results in a pixel over which a very large degree of control can be exercised of brightness and saturation. For example, by minimizing the overall brightness of the white subpixels, highly saturated colors may be achieved. Conversely, by minimizing the brightness of the color subpixels, or by maximizing them in conjunction with the white subpixels, a bright black and white mode may be achieved. All variations in between are obviously attainable as well.

User Control of Color Scheme

Certain embodiments of the previously described color scheme, as well as the inherent attributes of an interferometric modulator-based display in terms of resolution, gray scale depth, and refresh rate, provides flexibility in display performance. Given this range, it is useful to give the user of a product containing such a display control over its general characteristics. Alternatively, it may be advantageous for the display to automatically adapt to different viewing needs.

For example, a user may want to use a product in black and white mode if, in some context, only text were being viewed. In another situation, however, the user may want to view high quality color still images, or in yet another mode may want to view live video. Each of these modes, while potentially within the range of a given interferometric modulator display configuration, requires tradeoffs in particular attributes. Tradeoffs include the need for low refresh rates if high-resolution imagery is required, or the ability to achieve high gray scale depth if only black and white is requested.

To give the user this kind of on demand flexibility, the controller hardware of certain embodiments may be reconfigurable to some extent. Tradeoffs are a consequence of the fact that any display has only a certain amount of bandwidth, which is fundamentally limited by the response time of the pixel elements and thus determines the amount of information which can be displayed at a given time.

One exemplary display architecture that could provide such flexibility is illustrated in FIG. 4B. In this block diagram, controller logic 412 is implemented using one of a variety of IC (integrated circuit) technologies, including programmable logic devices (PLAs) and field programmable gate arrays (FPGAs), which allow for the functionality of the component to be altered or reconfigured after it leaves the factory. Such devices, which are traditionally used for specialized applications such as digital signal processing or image compression, can provide the high performance necessary for such processing, while supplying flexibility during the design stage of products incorporating such devices.

The controller 412 of certain embodiments provides signals and data to the driver electronics 414 and 416 for addressing the display 418. Conventional controllers are based on IC's or Application Specific Integrated Circuits (ASICs), which are effectively "programmed" by virtue of their design during manufacture. The controller 412 of certain embodiments comprises an internal chip layout comprising numerous basic and higher level logical components (logic gates and logic modules or assemblies of gates). By using field programmable devices, such as PLAs or FPGAs, different display configurations may be loaded into the display controller component in the form of hardware applications or "hardapps," from a component 410, which could be memory or a conventional microprocessor and memory. The memory could be in the form of EEPROMs (Electrically Erasable Programmable Read Only Memory) or other reprogrammable storage devices, and the microprocessor could take on the form of simple microcontroller whose function is to load the hardapp from memory into the FPGA, unless this were performed by whatever processor is associated with the general functioning of the product. This approach is advantageous because with relatively simple circuitry it is possible to achieve a wide variety of different display performance configurations and mixed display scan rates, along with the potential to combine them.

One portion of the screen, for example, might be operated as a low-resolution text entry area, while another provides high quality rendition of an incoming email. This could be accomplished, within the overall bandwidth limitations of the display, by varying the refresh rate and number of scans for different segments of the display. The low-resolution text area could be scanned rapidly and only once or twice corresponding to one or two bits of gray scale depth. The high rendition email area could be scanned rapidly and with three or four passes corresponding to three or four bits of grayscale.

Configurable Electronic Products

This idea may be generalized in certain embodiments to include not just the functionality of the display controller, but also the functionality of the overall product. FIG. 4C shows an exemplary configuration of a generic portable electronic product 418 that has a programmable logic device or equivalent at its core 420. In many display centric personal electronic products, such as PDAs (personal digital assistants) and electronic organizers, the central processor is a variant of a RISC (Reduced Instruction Set Computer) processor that uses a reduced instruction set. While RISC processors are more efficient versions of CPUs that power most personal computers, they are still general-purpose processors that expend a lot of energy performing repetitive tasks, such as retrieving instructions from memory.

In personal computers, power consumption is not an issue, and the user typically wants to run a large number of complicated software applications. The opposite is true of typical display centric/personal electronic products. They are required to consume low power and offer a relatively small number of relatively simple programs. Such a regime favors implementing the special purpose programs, which could include web browsers, calendar functions, drawing programs, telephone/address databases, and handwriting/speech recognition among others, as hardapps. Thus, whenever a particular mode of functionality, e.g., a program, is required by the user, the core processor is reconfigured with the appropriate hardapp and the user interacts with the product. Thus the hardapp processor, a variant of a Field Programmable Gate Array has the hardapp manifested in its internal logic and connections, which get re-arranged and re-wired every time a new hardapp is loaded. Numerous suppliers of these components also provide an application development system that allows a specialized programming language (a hardware description language) to be reduced into the logical representation that makes up the appropriate processor. Numerous efforts are also underway to simplify the process or reduce higher level programming languages into this form as well. One approach to realizing such a processor is detailed in the paper Kouichi Nagami, et al., "Plastic Cell Architecture: Towards Reconfigurable Computing for General-Purpose," Proc. IEEE Workshop on FPGA-based Custom Computing Machines, 1998.

Referring again to FIG. 4C, in certain embodiments, the hardapp processor 420 is at the center of a collection of I/O devices and peripherals that it will utilize, modify, or ignore based on the nature and function of the hardapp currently loaded. The hardapps can be loaded in certain embodiments from memory 422 resident in the product, or from an external source via RF or IR interface, 424, which could pull hardapps from the internet, cellular networks, or other electronic devices, along with content for a particular hardapp application. Other examples of hardapps include voice recognition or speech synthesis algorithms for the audio interface 432, handwriting recognition algorithms for pen input 426, and image compression and processing modes for display 428 and image input device 430. Such a product could perform a myriad of functions by virtue of its major components, the display as the primary user interface and the reconfigurable core processor. Total power consumption for such a device could be on the order of tens of milliwatts versus the several hundred milliwatts consumed by existing products.

Decoupling Electromechanical Aspects from Optical Aspects

U.S. Pat. No. 6,674,562 has previously described exemplary interferometric modulator designs that propose to decouple the electromechanical performance of an interferometric modulator from its optical performance. Certain embodiments described herein utilize an inverse-type interferometric modulator configuration, examples of which are illustrated in FIGS. 5A, 5B, 6A, 6B, 22A, and 22B, to at least partially decouple the electromechanical performance from the optical performance. Like many other interferometric modulator designs, the inverse-type interferometric modulator design uses electrostatic forces to alter the geometry of an interferometric cavity. Certain embodiments described herein decouple the interferometric modulator's electromechanical behavior from the interferometric modulator's optical behavior, thereby allowing the structural design and materials used for certain components of the interferometric modulator to be selected independently of their optical properties.

In the exemplary interferometric modulator shown in FIGS. 5A and 5B, electrode 502 is fabricated on substrate 500 and is electrically isolated from membrane/mirror 506 by insulating film 504. The electrode 502 is disposed opposite the viewing surface and functions only as an electrode, not also as a mirror. An optical cavity 505 is formed between membrane/mirror 506 and secondary mirror 508. Support for secondary mirror 508 is provided by a transparent superstructure 510, which can be a thick deposited organic, such as SU-8, polyimide, or an inorganic material.

In certain embodiments, with no voltage applied, the membrane/mirror 506 maintains a certain position shown in FIG. 5A relative to secondary mirror 508, as determined by the thickness of the sacrificial layers deposited during manufacture. For an actuation voltage of about four volts a thickness of several thousand angstroms might be appropriate. If the secondary mirror is made from a suitable material, say chromium, and the mirror/membrane made from a reflective material, such as aluminum, then the structure will reflect certain frequencies of light 511 which may be perceived by the viewer 512. In particular, if the chromium is thin enough to be semitransparent, about 40 angstroms, and the aluminum is sufficiently thick, at least 500 angstroms, as to be opaque, then the structure may have a wide variety of optical responses. FIGS. 5C and 5D show examples of black and white and color responses, respectively, for the exemplary interferometric modulator of FIGS. 5A and 5B. In certain such embodiments, the optical response is determined by the cavity length and the thickness of the constituent layers.

FIG. 5B shows the result of a voltage applied between primary electrode 502 and membrane/mirror 506 of the exemplary interferometric modulator of FIG. 5A. As shown in FIG. 5B, the membrane/mirror 506 is vertically displaced, thus changing the length of the optical cavity and therefore the optical properties of the interferometric modulator. FIG. 5C shows one exemplary reflective optical response which is possible with the two states, illustrating the dark state 521 when the device is fully actuated, and a white state 523 when the device is not fully actuated. FIG. 5D shows an exemplary optical response with color peaks 525, 527, and 529, corresponding to the colors blue, green, and red respectively. The electromechanical behavior of the device in certain embodiments may thus be controlled independently of the optical performance. In certain embodiments, the materials and configuration of the substrate 500, the primary electrode 502, or the insulating film 504 influence the electromechanics of the interferometric modulator but do not appreciably influence the optical performance of the interferometric modulator. In certain such embodiments, one or more of these elements may be selected independently of the materials comprising the secondary mirror.

In another example of an inverse-type interferometric modulator, shown in FIG. 22A, the modulator 2200 comprises an opaque substrate 2202, a protective passivation layer 2222, a conductor 2204, a dielectric 2206, first support posts 2208, a mechanical/mirror layer 2210, second support posts 2212, a metallic mirror 2214, and a transparent layer 2216. A first cavity 2218 is formed between the dielectric 2206 and the mechanical/mirror layer 2210, and a second cavity 2220 is formed between the mechanical/mirror layer 2210 and the metallic mirror 2214. The mechanical/mirror layer 2210 is supported by the first support posts 2208, and the transparent layer 2216 is supported by the second support posts 2212. In certain embodiments, the conductor 2204 is connected to a driving mechanism and is used for the electrostatic displacement of the mechanical/mirror layer 2210. The solid line of the mechanical/mirror layer 2210 in FIG. 22A shows an undriven or undisplaced condition, whereas the dotted line of the mechanical/mirror layer 2210 in FIG. 22A shows a driven or displaced condition. The mechanical/mirror layer 2210 is generally selected to produce a desired optical response to incident light when it is brought into contact with the dielectric 2206.

In certain embodiments, a viewer 2201 sees an image from a side opposite of the substrate 2202. When the mechanical/mirror layer 2210 is subjected to electrostatic displacement in certain embodiments, the first cavity 2218 is collapsed and the second cavity 2220 is expanded, so that the gap between the metallic mirror layer 2214 and the mechanical/mirror layer 2210 increases. Other exemplary simple interferometric modulator designs, like those described in U.S. Pat. No. 6,055,090, achieve a reflective colored state using interference and a dark state via absorption. The dark state is achieved in certain such exemplary interferometric modulators because the peak of the resulting standing wave is positioned optimally within the second cavity 2220 to maximize absorption. When the mechanical/mirror 2210 is moved into contact with, or much closer to, the dielectric 2206, the standing wave is moved out of position, reflecting blue, green, or red light, depending on the predetermined spacing between the dielectric 2206 and the mechanical/mirror layer 2210. By narrowing the spacing between the metallic mirror layer 2214 and the mechanical/mirror layer 2210, the modulator can reflect substantially all wavelengths in the visible spectrum, resulting in a reflective white state. As described above, in certain embodiments, a viewer 2201 of an inverse interferometric modulator sees an image from a side opposite of the substrate, not through the substrate.

In certain embodiments, the substrate comprises a portion of the inverse-type interferometric modulator which is located opposite to the display side of the movable mirror and which does not substantially interact with the light being modulated. As used herein, the term "display side" is used to refer to the side of the inverse-type interferometric modulator from which the viewer sees the modulated light. The substrate 2202, the conductor 2204, and the dielectric layer 2206 of FIG. 22A are each below the mechanical/mirror layer 2210, thereby located opposite to the display side of the mechanical/mirror layer 2210. In certain embodiments in which the mechanical/mirror layer 2210 is substantially non-transparent (e.g., fully reflective), light impinging on the modulator 2200 from the display side and being modulated by the modulator 2200 is not substantially affected by the optical properties of the substrate 2202, the conductor 2204, or the dielectric layer 2206. Therefore, in certain embodiments, at least one of the substrate 2202, the conductor 2204, and the dielectric layer 2206 can be chosen to be substantially non-transparent (e.g., opaque, highly reflective, or translucent) to light. In certain embodiments, the substrate 2202 comprises the conductor 2204, the dielectric layer 2206, or both the conductor 2204 and the dielectric layer 2206.

Certain embodiments in which at least one of the substrate, the conductor, and the dielectric layer of the inverse-type interferometric modulator are non-transparent provide advantages not found in other inverse-type interferometric modulators. For example, typical inverse-type interferometric modulators have conductive traces on or within the substrate and these conductive traces are electrically coupled to the conductor. If the substrate is substantially transparent, these conductive traces can appear from the display side to be "floating" without any visible supporting structure. When the inverse-type interferometric modulator is viewed from the display side, the combination of the conductive traces with the transparent substrate can produce a periphery between modulators which appears grey or has moire patterns. In addition, light entering the modulator from below (e.g., through a transparent portion of the substrate) can be viewed from the display side. Thus, displays utilizing inverse-type interferometric modulators having a transparent substrate can exhibit reduced contrast when viewed from the display side.

Optical masks or mattes can be used to try to avoid this reduced contrast, however, such masking requires additional structure and processing steps to be added to the inverse-type interferometric modulators. In certain embodiments, the substrate is selected to be non-transparent (e.g., opaque, highly reflective, or translucent) so that it matches the optical appearance of the conductive traces, thereby providing a uniform periphery when viewed from the display side. In certain other embodiments, the substrate is selected to be non-transparent and non-reflective (e.g., dark) so that it matches the color of the inverse-type interferometric modulator when the modulator is in the dark state. In certain other embodiments, the substrate is selected to avoid utilizing mask structures or processing steps.

In certain embodiments, having a non-transparent substrate advantageously avoids processing problems due to light scattering during photolithography. In certain embodiments, during the fabrication of the inverse-type interferometric modulator, photolithography techniques are used to form various features of the modulator. For photolithographic fabrication of structures on the substrate, if the substrate is substantially transparent to the light being used for the photolithography (e.g., ultraviolet light), then scattering of the light by features or surfaces underlying the substrate can result in a diffusion of the photolithography light. This light scattering can then affect (e.g., limit the sharpness, precision, or minimum sizes) the dimensions of the resulting photolithographically-formed structures. Similarly, a transparent conductor or a transparent dielectric layer can generate unwanted scattering of the photolithography light, thereby affecting the dimensions of overlaying photolithographically-formed structures. In certain embodiments described herein, such scattering is reduced or eliminated by using a substrate which is substantially non-transparent to the photolithography light.

In certain embodiments, having a non-transparent substrate advantageously shields underlying circuitry from stray light. In certain embodiments, the inverse-type interferometric modulator is fabricated on a semiconductor substrate (e.g., silicon) which comprises circuitry, including but not limited to, passive components (e.g., thin-film resistors, capacitors, inductors), and active components (e.g., diodes, transistors, integrated circuits). For example, a silicon substrate can be fabricated to have capacitive sensing circuitry which can be scaled to the size of the interferometric modulator array. In certain embodiments, such sensing circuitry can be used to monitor the state of each interferometric modulator in the array (e.g., to provide memory capabilities) or to sense external forces applied to the substrate (e.g., to provide touch-screen capabilities). In certain other embodiments, the substrate comprises control circuitry.

If the substrate is transparent, stray light can enter the circuitry of the substrate. The stray light could potentially damage the circuitry or could create charge carriers in the circuitry, thereby affecting the noise and accuracy of signals generated by the circuitry. By using a non-transparent substrate, the underlying circuitry of the substrate is substantially protected from stray light.

In certain embodiments, having a non-transparent substrate advantageously allows standard semiconductor processing equipment to be used to fabricate the interferometric modulators. For example, for flat-panel display manufacturing using silicon substrates, various fabrication steps are dependent on the orientation of the silicon wafer. The top surface of the silicon wafer typically has various structures formed thereon so that the optical properties of the treated top surface are different from those of the untreated bottom surface of the silicon wafer. Existing process equipment uses the different optical properties of the treated top surface from the untreated bottom surface to determine the orientation of the silicon wafer.

It is much more difficult to use this existing process equipment to fabricate interferometric modulators with a transparent glass substrate. The optical properties of the top surface looks substantially the same as that of the bottom surface since the structures formed on the top surface are visible from both surfaces. Therefore, glass substrates do not provide the different optical properties of the two surfaces which existing process equipment utilize to determine orientation of the wafer. To overcome this difficulty in using glass substrates, various techniques are required to differentiate between the two surfaces. However, these techniques can be cumbersome and difficult to integrate with other fabrication techniques. In certain embodiments, by using a non-transparent substrate (e.g., silicon), standard semiconductor processing equipment can be easily used to form the interferometric modulators over the substrate, since the structures formed on the top surface are no longer visible from the bottom surface.

In certain embodiments, having a non-transparent substrate advantageously allows integration of the interferometric modulator fabrication with underlying control circuitry fabrication. For example, standard semiconductor processing equipment can be used to form both the control circuitry in a semiconductor (e.g., silicon) substrate and the interferometric modulators on the substrate.

In certain embodiments, having a non-transparent substrate advantageously increases the area for control circuitry and advantageously reduces the constraints associated with integrating control circuitry within the interferometric modulators. For interferometric modulators with control circuitry therein, the control circuitry takes up area which could otherwise be used for modulating light, thereby limiting the area of the display which is optically active. It is therefore desirable to reduce the portion of the display area taken up by the control circuitry. By placing the control circuitry within or on the substrate below the optical components of the interferometric modulators, certain embodiments described herein advantageously remove the control circuitry from the display area and provide larger areas in which to form the control circuitry.

In certain embodiments, having a non-transparent substrate advantageously facilitates using illumination sources integrated in the interferometric modulator array. Incorporating illumination sources into an interferometric modulator array have previously been described. For example, for inverse-type interferometric modulators, the illumination source (e.g., organic light-emitting diodes) can be incorporated in the interferometric modulator to provide illumination from the display. However, a transparent substrate would provide a pathway for light from the illumination source to escape without contributing to the brightness of the display. In certain embodiments, at least a portion of the substrate is highly reflective to reduce the loss of light from the illumination source through the substrate.

In certain embodiments, an alternative inverse-type interferometric modulator structure can be formed using a reflective substrate. FIG. 22B schematically illustrates another exemplary inverse-type interferometric modulator 2200 in which the substrate 2202 is highly reflective. The mechanical/mirror layer 2210 of FIG. 22B is partially transparent and partially reflective. For example, in certain embodiments, the mechanical/mirror layer 2210 comprises a thin chromium layer for partially transmitting and reflecting light and a transparent ITO layer for application of an appropriate voltage to actuate the interferometric modulator 2200. The substrate 2202 of FIG. 22B is highly reflective and serves as a stationary reflector. In certain embodiments, the interferometric modulator 2200 further comprises a passivation layer 2222 on the substrate 2202, a conductor 2204 on the passivation layer 2222, and a dielectric layer 2206 on the conductor 2204. In certain embodiments, the conductor 2204 comprises a transparent ITO layer, while in certain other embodiments, the conductor 2204 comprises a metal with a passivation layer. Actuation of the interferometric modulator 2200 by applying appropriate voltages to the mechanical/mirror layer 2210 and to the conductor 2204 moves the mechanical/mirror layer 2210 relative to the substrate 2202, thereby changing the size of the optical cavity therebetween. In certain other embodiments, the conductor 2204 is highly reflective and serves as the stationary reflector.

As described above, by way of decoupling the interferometric modulator's optical and electromechanical performance, in certain embodiments, the inverse configuration places the substrate 2202, conductor 2204, and dielectric layer 2206 on the opposite side of the reflective mechanical mirror 2210 from the transparent viewing surface 2216, and thus outside of the optical path of light interacting with the interferometric modulator. Accordingly, unlike with other interferometric modulator designs, the materials used to manufacture the substrate 2202, conductor 2204, and dielectric layer 2206 need not have any particular optical characteristics, but rather may be comprised of any suitable material.

In certain embodiments, the freedom in the selection of materials used to make the substrate 2202, dielectric 2206 and conductor 2204 advantageously provide improvements in one or more attributes of the interferometric modulator, including but not limited to, size, physical durability, strength, weight, flexibility, cost, manufacturing time/resources, and electromechanical performance. For example, in certain embodiments, the substrate 2202, dielectric 2206 and/or conductor 2204 can comprise opaque materials that have superior structural properties relative to the transparent materials required by prior interferometric modulator configurations. For example, materials can be used for the substrate 2202, dielectric 2206 and/or conductor 2204 which have a greater density and/or Young's modulus than the transparent materials that were previously required, allowing the use of stronger and smaller components in the interferometric modulator. For example, by using a metal substrate, the thickness of the substrate, and hence the overall thickness of the interferometric modulator, can be advantageously reduced. In addition, a common reason for field returns of flat-screen displays is breakage of the glass substrates of these displays. By using stronger and more durable materials for the substrate, the lifetimes of the displays are advantageously increased. In some embodiments, substrate 2202, dielectric 2206 and/or conductor 2204 are comprised of materials having a density greater than 2.5 $g/cm^3$, 3.0 $g/cm^3$, 3.5 $g/cm^3$, 4.0 $g/cm^3$, 5.0 $g/cm^3$, 6.0 $g/cm^3$, or 7.0 $g/cm^3$, and/or having a Young's modulus of greater than 60 gigapascals, 70 gigapascals, 80 gigapascals, 90 gigapascals, 100 gigapascals, 150 gigapascals, 200 gigapascals or 300 gigapascals.

The substrate of inverse interferometric modulators may be comprised of any suitable material, including opaque and translucent materials. Suitable substrate materials include, but are not limited to, metals (e.g. stainless steel, aluminum), anodized metals, silicon (e.g. a silicon wafer), poly-silicon, plastics, ceramics, polymers (e.g. polyimide, MYLAR®), carbon (e.g. graphite), glass, and quartz, as well as alloys and composites of such materials. In certain embodiments in which the substrate comprises a flexible plastic or metal foil material, the substrate has sufficient flexibility to be used in "roll-to-roll" or "web" processing in which electronic circuitry (e.g., thin-film transistors, resistors, capacitors) are formed on the substrate (e.g., via deposition or photolithography techniques). In certain such embodiments, the circuitry can be fabricated across large areas (e.g. one meter or more in length) and are compatible for subsequent fabrication of large interferometric modulator displays. In one embodiment, the substrate is an opaque plastic substrate which includes a passivated printed circuit board. In certain such embodiments, the passivated printed circuit board can be fabricated to include the desired circuitry, and thin-film processing can be used to fabricate the interferometric modulators on the passivated printed circuit board. Certain such embodiments advantageously separate the circuitry fabrication from the interferometric modulator fabrication. The substrate may also comprise a laminate of a plurality of substrate materials. The substrate may be rigid or flexible. For example, a flexible substrate may comprise a thin metal or plastic foil. Although not limited to the thickness ranges recited herein, the substrate may have a thickness of about 0.1 millimeter to about 1.0 millimeter, and more preferably from about 0.3 millimeter to about 0.7 millimeter. A thin opaque substrate can be obtained by metal forming operations such as drawing (e.g., stretching a sheet of metal over or through at least one die to make it thinner).

The substrate is preferably impermeable to moisture and properly passivated. In various embodiments, a protective passivation layer is formed on a surface of an opaque substrate. In certain embodiments, forming the passivation layer prepares the substrate for subsequent processing (e.g., formation of the conductor or dielectric layer). In certain embodiments in which a metal substrate is used, the passivation layer provides electrical isolation to keep other structures from shorting to the metal substrate. The protective passivation layer need not be a separate layer, but can be formed on top of the opaque substrate by preliminary passivation treatment. The passivation treatment of certain embodiments includes, but is not limited to, removal of exogenous iron or iron compounds from a surface by means of a chemical dissolution, most typically by a treatment with an acid solution that will remove the surface contamination, but will not significantly affect the opaque substrate itself. Such treatments include chemical treatment of an opaque substrate with a mild oxidant, such as a nitric acid solution, for the purpose of enhancing the spontaneous formation of a protective passivation layer. In addition, the passivation step can include oxide deposition and spin coating of an organic planarization layer.

The dielectric layer of inverse interferometric modulators can comprise any suitable material known in the art, such as a metal oxide (e.g., aluminum oxide or silicon dioxide), silicon nitride, and the like. As described above, the dielectric layer of an inverse interferometric modulator need not have any particular optical characteristics, and thus the structural design and materials of the dielectric layer can be chosen to optimize its electrical properties. For example, the dielectric layer can be comprised of non-transparent (e.g., opaque, highly reflective, or translucent materials) that could not otherwise be utilized in other interferometric modulator designs. In addition, the dielectric layer in an inverse interferometric modulator can be substantially thicker than a dielectric layer of the same material in an interferometric modulator in which the dielectric layer effects the optical performance. A dielectric layer of increased thickness can improve various aspects of the dielectric layer and/or interferometric modulator, such as electrical properties and manufacturing costs. A thicker dielectric layer can also give improvements in the range of materials, configurations, and manufacturing methods that can be utilized for other layers of the interferometric modulator on the side of the dielectric layer opposite from the viewing surface, including the substrate and the conductor. For example, electrochemical plating techniques could be used to manufacture the conductor on the substrate, followed by deposition of a dielectric layer of enhanced thickness. In various embodiments, the dielectric layer of inverse interferometric modulators has a thickness of greater than about 200 angstroms, 300 angstroms, 400 angstroms, 500 angstroms, 600 angstroms, 700 angstroms, 800 angstroms, 900 angstroms, 1000 angstroms, 2000 angstroms, or several thousand angstroms.

Inverse type interferometric modulators can be manufactured in various ways, and can be applied to various architectures and configurations. For example, inverse-type interferometric modulators can be fabricated using semiconductor manufacturing techniques, such as photolithography, deposition (e.g., "dry" methods such as chemical vapor deposition (CVD) and wet methods such as spin coating), masking, shadow masking, lift-off processing, and etching (e.g., dry methods such as plasma etch and wet methods). Examples of suitable techniques compatible with embodiments described herein are described in U.S. Pat. No. 6,040,937.

In one embodiment, an inverse-type interferometric modulator, such as that shown in FIG. 22A, is made by forming a protective passivation layer 2222 on opaque substrate 2202, and then forming a conductor 2204 by deposition of electrode material and subsequent patterning and etching. The conductor material is conductive and may comprise any suitable material known in the art, such as a metal or a semiconductor (such as silicon) doped to have the desired conductivity (such as indium tin oxide). In some embodiments, the conductor and substrate comprise a printed circuit board. The dielectric 2206 is then formed on the conductor 2204 by deposition, preferably by chemical vapor deposition (CVD). Thereafter, a sacrificial layer (not shown), which is removed in a later etching step, is deposited. The sacrificial layer may be any suitable material known in the art including, but not limited to, molybdenum, silicon, tungsten, or titanium. An etch stop is preferably used on top of the sacrificial layer, which may be a material that is more resistant to a later etching step than is the sacrificial layer, and may be a metal (e.g., titanium, aluminum, silver, chromium), a dielectric material, preferably a metal oxide (e.g., an aluminum oxide), or any other suitable material known in the art. The sacrificial layer is patterned and etched using a mask to form the first support posts 2208, followed by optional planarization. The mechanical/mirror layer 2210 is then formed by deposition (followed by optional planarization). In some embodiments, the mechanical/mirror layer may comprise silicon nitride, silicon dioxide, magnesium fluoride, or calcium fluoride as a substrate on which a metallic film such as aluminum, silver, or any number of metals is formed on the order of several hundred angstroms. The materials can be selected based on spectral properties, resistive properties, etc., and can include any material known and used in the art. Optionally, an insulator and/or reflection enhancement film, such as metal oxide can be formed.

An etch stop may be formed on top of the mechanical/mirror layer 2210. Another sacrificial layer is deposited, patterned, and etched to form the second support posts 2212 (followed by optional planarization). The metallic mirror layer 2214, which may comprise Cr or any suitable material known in the art, is deposited and the transparent layer 2216 is deposited thereon. After the above fabrication, etching with, for example, $XeF_2$ is conducted to remove the sacrificial layers. $XeF_2$ is a convenient source of $F_2$ gas. Other etchants known in the art, such as $F_2$, may be used in place of or in addition to $XeF_2$.

Another example of an inverse-type interferometric modulator is shown in FIG. 6A. As with the embodiment shown in FIG. 5, electrode 602 fabricated on substrate 600 is electrically isolated from membrane/mirror 608 by insulating film 604. The electrode 602 is disposed opposite the viewing surface and functions only as an electrode, not also as a mirror. Unlike the embodiment shown in FIG. 5, support structure 606 supporting membrane/mirror 608 is positioned to be hidden by the membrane/mirror 608. In this way, the amount of inactive area is effectively reduced, because the viewer 614 sees only the area covered by the membrane/mirror 608 and the minimum space between adjoining interferometric modulators. This is unlike the structure in FIG. 5, where the membrane supports are visible and constitute, from a color standpoint, inactive and inaccurate area. FIG. 6A illustrates the structure in the un-actuated state, in which membrane/mirror 608 is in contact with secondary mirror 612, which is supported by transparent superstructure 610. FIG. 6B reveals the same structure in the actuated state, in which membrane/mirror 608 is translated towards insulating film 604, electrode 602, and substrate 600.

In FIG. 7A, another geometric configuration is illustrated for use in an interferometric modulator structure. This design is similar to one shown in U.S. Pat. No. 5,638,084. That design relied upon an opaque plastic membrane that is anisotropically stressed so that it naturally resides in a curled state. Application of a voltage flattens the membrane to provide a MEMS-based light shutter.

The device's functionality may be improved by making it interferometric. The interferometric modulator variation is shown in FIG. 7A, where thin film stack 704 is like the dielectric/conductor/insulator stack which is the basis for the induced absorber interferometric modulator design discussed in U.S. Pat. No. 6,040,937.

Application of a voltage between aluminum membrane 702 and stack 704 in certain embodiments causes the membrane 702 to lie flat against the stack. During fabrication in certain embodiments, aluminum membrane 702, which could also include other reflective metals (silver, copper, nickel), dielectrics, or organic materials which have been undercoated with a reflective metal, is deposited on a thin sacrificial layer (not shown) so that it may be released, using wet etch or gas phase release techniques. Aluminum membrane 702 is further mechanically secured to the substrate 700 by a support tab 716, which is deposited directly on optical stack 704. Because of this, light that is incident on the area where the tab and the stack overlap is absorbed making this mechanically inactive area optically inactive as well. This technique eliminates the need for a separate black mask in this and other interferometric modulator designs.

In certain embodiments, incident light 706 is either completely absorbed or a particular frequency of light 708 is reflected depending on the spacing of the layers of the stack. The optical behavior is like that of the induced absorber interferometric modulator described in U.S. Pat. No. 6,040,937.

FIG. 7B shows the device configuration when no voltage is applied. The residual stresses in the membrane 702 in certain embodiments induce it to curl up into a tightly wound coil. The residual stresses can be imparted by deposition of a thin layer of material 718 (shown in FIG. 7A) on top of the membrane 702, which has extremely high residual tensile stress. Chromium is one example in which high stresses may be achieved with a film thickness as low as several hundred angstroms. With the membrane 702 no longer obstructing its path, light beam 706 is allowed to pass through the stack 704 (shown in FIG. 7A). The light beam 712 then intersects with plate 710. Plate 710 can reside in a state of being either highly absorbing, in which case light beam 712 is absorbed, or highly reflective (of a particular color or white), in which case light beam 712 is reflected 714. For the modulator to be used in a reflective display, the optical stack 704 would be designed such that, when the device is actuated, it would either reflect a particular color (if plate 710 were absorbing) or be absorbing (if plate, 710 were reflective).

Rotational Actuation

As shown in FIG. 8A, another interferometric modulator geometry relies on rotational actuation. Using the exemplary processes discussed in U.S. Pat. No. 6,040,937, electrode 802, an aluminum film about 1000 angstroms thick, and insulator 806 are fabricated on substrate 800. Support post 808 and rotational hinge 810 support shutter 812, upon which a set of reflecting films 813 has been deposited. The support shutter may be an aluminum film which is several thousand angstroms thick. Its X-Y dimensions could be on the order of tens to several hundred microns. The films may be interferometric and designed to reflect particular colors. A fixed interferometric stack in the form of an induced absorber like that described in U.S. Pat. No. 6,040,937 would suffice. The films may also comprise polymers infused with color pigments, or they may be aluminum or silver to provide broadband reflection. The electrode 802 and the shutter 812 of certain embodiments are designed such that the application of a voltage (e.g., 10 volts) between the two causes the shutter 812 to experience partial or full rotation about the axis of the hinge 810. Only shutter 818 is shown in a rotated state although typically all of the shutters for a given pixel would be driven in unison by a signal on the common bus electrode 804. Such a shutter would experience a form of electromechanical hysteresis if the hinges and electrode distances were designed such that the electrostatic attraction of the electrodes overcomes the spring tension of the hinge at some point during the rotation. The shutters would thus have two electromechanically stable states.

In a transmissive mode of operation, the shutter would either block incident light or allow it to pass through. FIG. 8A illustrates the reflective mode where incident light 822 is reflected back to the viewer 820. In this mode, and in one state, the shutter 812 either reflects a white light if the shutter 812 is metallized, or reflects a particular color or set of colors if it is coated with interferometric films or pigments. Representative thicknesses and resulting colors for an interferometric stack are also described in U.S. Pat. No. 6,040,937. In the other state, light is allowed to pass through the shutter 812, where it can be absorbed in substrate 800 if a surface of the substrate 800 is coated with an absorbing film or films (not shown). These films could comprise another pigment infused organic film, or an induced absorber stack designed to be absorbing. Conversely, the shutters 812 may be highly absorbing (e.g., black), and a surface of the substrate 800 may be coated with highly reflective films 824, or selectively coated with pigment or interferometric films to reflect colors, along the lines of the color reflecting films described above.

Operation of the device may be further enhanced in certain embodiments by the addition of supplementary electrode 814, which provides additional torque to the shutter when charged to a potential that induces electrostatic attraction between supplementary electrode 814 and shutter 812. Supplementary electrode 814 comprises a combination of a conductor 814 and support structure 816. The electrode may comprise a transparent conductor such as ITO (indium tin oxide) that could be about one thousand angstroms thick. All of the structures and associated electrodes are preferably machined from materials that are monolithically deposited on the surface of a single substrate, and therefore are easily fabricated and reliably actuated due to good control over electrode gap spaces. For example, if such an electrode were mounted on an opposing substrate, variations in the surface of both the device substrate and opposing substrate could combine to produce deviations as much as several microns or more. Thus, the voltage required to affect a particular change in behavior could vary by as much as several tens of volts or more. Structures that are monolithic follow substrate surface variations exactly and suffer little such variation.

FIG. 8B, steps 1-7, shows an exemplary fabrication sequence for the rotational modulator. In step 1, substrate 830 has been coated with electrode 834 and insulator 832. Typical electrode and insulator materials are aluminum and silicon dioxide, each of a thickness of one thousand angstroms each. These are patterned in step 2. Sacrificial spacer 836, a material such as silicon several microns in thickness, has been deposited and patterned in step 3 and coated with post/hinge/shutter material 838 in step 4. This could be an aluminum alloy or titanium/tungsten alloy about 1000 angstroms thick. In step 5, material 838 has been patterned to form bus electrode 844, support post 840, and shutter 842. Shutter reflector 846 has been deposited and patterned in step 6. In step 7, the sacrificial spacer has been etched away yielding the completed structure. Step 7 also reveals a top view of the structure showing detail of the hinge comprising support posts 848, torsion arm 850, and shutter 852.

Switching Elements

For certain embodiments comprising interferometric modulators that are binary devices, only a small number of voltage levels is required to address a display. The driver electronics need not generate analog signals that would be required to achieve gray scale operation.

Thus, the electronics may be implemented using other means. In particular the drive electronics and logic functions can be implemented using switch elements based on MEMS.

FIGS. 9A through 9E illustrate the concept of certain embodiments. FIG. 9A is a diagram of a basic switch building block with an input 900 making a connection to output 904 by application of a control signal 902. FIG. 9B illustrates how a row driver could be implemented. The row driver for the addressing scheme described above requires the output of three voltage levels. Application of the appropriate control signals to the row driver allows one of the input voltage levels to be selected for output 912. The input voltages are Vco1, Vco10, and Vbias corresponding to 906, 908, and 910 in FIG. 9B. Similarly, for the column driver shown in FIG. 9C, the appropriate control signals result in the selection of one or the other input voltage levels for delivery to the output 920. The input voltages are Vsel F1, Vsel F0, and ground, corresponding to 914, 916, and 918 in FIG. 9C. FIG. 9D illustrates how a logic device 932, may be implemented, in this case a NAND gate, using basic switch building blocks 934, 936, 938, and 940. All of these components can be configured and combined in a way that allows for the fabrication of the display subsystem shown in FIG. 9E. The subsystem comprises controller logic 926, row driver 924, column driver 928, and display array 930, and uses the addressing scheme described above in FIG. 3.

Fabrication of the switch elements as MEMS devices makes it possible to fabricate an entire display system using a single process. The switch fabrication process becomes a subprocess of the interferometric modulator fabrication process and is illustrated in FIGS. 10A-10H.

Step 1 is shown in FIGS. 10A and 10B, which show a side view and top view, respectively, of the initial stage. Arrow 1004 indicates the direction of the perspective of the side view. Substrate 1000 has had sacrificial spacer 1002, a silicon layer approximately 2000 angstroms thick, deposited and patterned on its surface. In step 2, shown in FIGS. 10C and 10D (viewed from the same perspective as FIGS. 10A and 10B), a structural material, an aluminum alloy several microns thick, has been deposited and patterned to form source beam 1010, drain structure 1008, and gate structure 1006. Several hundred angstroms of a non-corroding metal such as gold, iridium or platinum may be plated onto the structural material at this point to maintain low contact resistance through the life of the switch. Notch 1012 has been etched in source beam 1010 to facilitate the movement of the beam in a plane parallel to that of the substrate. Step 3 is illustrated in FIGS. 10E-10H. FIGS. 10E and 10G depict front views, with arrows 1016 indicating the direction of the perspectives, while FIGS. 10F and 10H depict top views. In step 3, the sacrificial material has been etched away leaving the source beam 1010 intact and free to move.

FIG. 10F shows the switch in an un-actuated state 1014. In the actuated state 1018, shown in FIG. 10H, voltage source 1017 applies a voltage between the source beam 1010 and the gate structure 1006 (shown in FIG. 10D), and the source beam 1010 is deflected towards gate 1006 until it comes into contact with the drain 1008, thereby establishing electrical contact between the source beam 1010 and the drain 1008. The mode of actuation is parallel to the surface of the substrate, thus permitting a fabrication process that is compatible with the main interferometric modulator fabrication processes. In certain embodiments, this process also requires fewer steps than processes used to fabricate switches that actuate in a direction normal the substrate surface.

FIGS. 10I and 10J illustrates two alternative designs for planar MEMS switches. The switch in FIG. 10I differs in that, upon application of a voltage between switch beam 1028 and gate structure 1022, switch beam 1028 serves to provide contact between drain 1024 and source 1026. In the switch of FIGS. 10A-10H, currents that must pass through the source beam to the drain may effect switching thresholds, complicating the design of circuits. This is not the case with switch shown in FIG. 10I. The switch in FIG. 10J reveals a further enhancement. In this case, insulator 1040 electrically isolates switch beam 1042 from contact beam 1038, which provides contact between drain 1034 and source 1036 upon application of a voltage between gate structure 1032 and switch beam 1042. The insulator 1040 may be a material such as SiO2 that can be deposited and patterned using conventional techniques. Use of such a switch eliminates the need to electrically isolate switch drive voltages from logic signals in circuits comprising these switches.

Multidimensional Photonic Structures

In general, interferometric modulators feature elements that have useful optical properties and are movable by actuation means with respect to themselves or other electrical, mechanical or optical elements.

Assemblies of thin films to produce interferometric stacks are a subset of a larger class of structures that we shall refer to as multidimensional photonic structures. Broadly, we define a photonic structure as one that has the ability to modify the propagation of electromagnetic waves due to the geometry and associated changes in the refractive index of the structure. Such structures have a dimensional aspect because they interact with light primarily along one or more axes. Structures that are multidimensional have also been referred to as photonic bandgap structures (PBG's) or photonic crystals. The text "Photonic Crystals" by John D. Joannopoulos, et al. describes photonic structures that are periodic.

A one-dimensional PBG can occur in the form of a thin film stack. By way of example, FIG. 16 shows the fabrication and end product of an interferometric modulator in the form of a dielectric Fabry-Perot filter. Thin film stacks 1614 and 1618, which could be alternating layers of silicon and silicon dioxide each a quarter wave thick, have been fabricated on a substrate 1600 to form an interferometric modulator structure that incorporates central cavity 1616. In general, the stack is continuous in the X and Y direction, but has a periodicity in the optical sense in the Z direction due to variations in the refractive index of the materials, as they are comprised of alternating layers with high and low indices. This structure can be considered one-dimensional because the effect of the periodicity is maximized for waves propagating along one axis, in this case the Z-axis.

FIGS. 11A and 11B illustrate two manifestations of a two-dimensional photonic structure. In FIG. 11A, a microring resonator 1102 can be fabricated from one of a large number of well known materials, an alloy of tantalum pentoxide and silicon dioxide for example, using well known techniques. For a device optimized for wavelengths in the 1.55 µm range, typical dimensions are w=1.5 µm, h=1.0 µm, and r=10 µm.

Fabricated on a substrate 1100 (glass is one possibility though there are many others), the structure is essentially a circular waveguide for which the refractive index and dimensions w, r, and h determine the frequencies and modes of light which will propagate within it. Such a resonator, if designed correctly, can act as a frequency selective filter for broadband radiation that is coupled into it. In this case, the radiation is generally propagating in the XY plane as indicated by orientation symbol 1101. The one-dimensional analog of this device would be a Fabry-Perot filter made using single layer mirrors. Neither device exhibits a high order optical periodicity, due to the single layer "boundaries" formed by the mirrors; however, they can be considered photonic structures in the broad sense.

A more traditional PBG is shown in FIG. 1B. Columnar array 1106, fabricated on substrate 1104, presents a periodic variation in refractive index in both the X and Y directions. Electromagnetic radiation propagating through this medium is most significantly affected if it is propagating within the XY plane, indicated by orientation symbol 1103.

Because of its periodic nature, the array of FIG. 11B shares attributes with a one-dimensional thin film stack, except for its higher-order dimensionality. The array is periodic in the sense that along some axis through the array, within the XY plane, the index of refraction varies between that of the column material and that of the surrounding material, which is usually air. Appropriate design of this array, utilizing variations on the same principles applied to the design of thin film stacks, allows for the fabrication of a wide variety of optical responses (mirrors, bandpass filters, edge filters, etc.) acting on radiation traveling in the XY plane. Array 1106 in FIG. 11B includes a singularity of defect 1108 in the form of a column that differs in its dimension and/or refractive index. For example, the diameter of this column might be fractionally larger or smaller than the remaining columns (which could be on the order of a quarter wavelength in diameter), or it may be of a different material (perhaps air vs. silicon dioxide). The overall size of the array is determined by the size of the optical system or component that needs to be manipulated. The defect may also occur in the form of the absence of a column or columns (a row), depending on the desired behavior. This structure is analogous to the dielectric Fabry-Perot filter of FIG. 16, but it functions in only two dimensions. In this case, the defect is analogous to the cavity 1616 (shown in FIG. 16). The remaining columns are analogous to the adjacent two-dimensional stacks.

The relevant dimensions of the structure of FIG. 11B are denoted by column x spacing sx, column y spacing sy, (either of which could be considered the lattice constant), column diameter d, and array height, h. Like the quarter wave stack, the one-dimensional equivalent, column diameters and spacings can be on the order of a quarter wave. The height, h, is determined by the desired propagation modes, with little more than one half wavelength used for single mode propagation. The equations for relating the size of the structures to their effect on light are well known and documented in the text "Photonic Crystals" by John D. Joannopoulos, et al.

This kind of structure may also be fabricated using the same materials and techniques used to fabricate the resonator 1102 (shown in FIG. 11A). For example, a single film of silicon may be deposited on a glass substrate and patterned using conventional techniques, and etched using reactive ion etching to produce the high aspect ratio columns. For a wavelength of 1.55 µm, the diameter and spacing of the columns could be on the order of 0.5 µm and 0.1 µm, respectively.

Photonic structures also make it possible to direct radiation under restrictive geometric constraints. Thus, they are quite useful in applications where it is desirable to redirect and/or select certain frequencies or bands of frequencies of light when dimensional constraints are very tight. Waveguides channeling light propagating in the XY plane may be fabricated which can force light to make 90 degree turns in a space less than the wavelength of the light. This can be accomplished, for example, by creating the column defect in the form of a linear row which can act as the waveguide.

A three-dimensional structure is illustrated in FIG. 12. Three-dimensional periodic structure 1202 fabricated on substrate 1200 acts on radiation propagating in the XY, YZ, and XZ planes. A variety of optical responses may be attained by appropriate design of the structure and selection of its constituent materials. The same design rules apply, however they are applied three-dimensionally here. Defects occur in the form of points, lines, or regions, vs. points and lines, which differ in size and/or refractive index from the surrounding medium. In FIG. 12, the defect 1204 is a single point element, but may also be linear or a combination of linear and point elements or regions. For example, a "linear" or "serpentine" array of point defects may be fabricated such that it follows an arbitrary three-dimensional path through the PBG, and acts as a tightly constrained waveguide for light propagating within it. The defect would generally be located internally but is shown on the surface for purposes of illustration. The relevant dimensions of this structure are illustrated in the figure. The diameter, spacing, and materials of the PBG are completely application dependent, however the aforementioned design rules and equations also apply.

Three-dimensional PBGs are more complicated to make. Conventional means for fabricating one-dimensional or two-dimensional features, if applied in three dimensions, would involve multiple applications of deposition, pattern, and etch cycles to achieve the third dimension in the structure. Fabrication techniques for building periodic three-dimensional structures include: holographic techniques, where a photosensitive material is exposed to a standing wave and replicates the wave in the form of index variations in the material itself; use of self-organizing organic or self-assembling materials that rely on innate adhesion and orientation properties of certain co-polymeric materials to create arrays of columnar or spherical structures during the deposition of the material; ceramic approaches that can involve the incorporation of a supply of spherical structures of controlled dimensions into a liquid suspension that, once solidified, organizes the structures, and can be removed by dissolution or high temperature; combinations of these approaches; and other techniques known in the art.

Co-polymeric self-assembly techniques are especially interesting because they are both low temperature and require minimal or no photolithography. In general, this technique involves the dissolution of a polymer, polyphenylquinoine-block-polystyrene (PPQmPSn) is one example, into a solvent such as carbon disulfide. After spreading the solution onto a substrate and allowing the solvent to evaporate, a close packed hexagonal arrangement of air filled polymeric spheres results. The process can be repeated multiple times to produce multilayers, and the period of the array may be controlled by manipulating the number of repeat units of the components (m and n) of the polymer. Introduction of a nanometer sized colloid comprising metals, oxides, or semiconductors can have the effect of reducing the period of the array further, as well as increasing the refractive index of the polymer.

Defects may be introduced via direct manipulation of the material on a submicron scale using such tools as focused ion beams or atomic force microscopes. The former may be used to remove or add material in very small selected areas or to alter the optical properties of the material. Material removal occurs when the energetic particle beam, such as that used by a Focused Ion Beam tool, sputters away material in its path. Material addition occurs when the focused ion beam is passed through a volatile metal containing gas, such as tungsten hexafluoride (for tungsten conductor) or silicon tetrafluoride (for insulating silicon dioxide). The gas breaks down, and the constituents are deposited where the beam contacts the substrate. Atomic force microscopy may be used to move materials around on a molecular scale.

Another approach involves the use of a technique that can be called micro-electrodeposition, which is described in detail in U.S. Pat. No. 5,641,391. In this approach a single microscopic electrode can be used to define three-dimensional features of submicron resolution using a variety of materials and substrates. Metal "defects" deposited in this way could be subsequently oxidized to form a dielectric defect around which the PBG array could be fabricated using the techniques described above.

The existence of surface features, in the form of patterns of other materials, on the substrate upon which the PBG is fabricated may also serve as a template for the generation of defects within the PBG during its formation. This is particularly relevant to PBG processes that are sensitive to substrate conditions, primarily self-assembly approaches. These features may encourage or inhibit the "growth" of the PBG in a highly localized region around the seed depending on the specific nature of the process. In this way, a pattern of defect "seeds" may be produced and the PBG formed afterwards with the defects created within during the PBG formation process.

Thus, the class of devices known as interferometric modulators may be further broadened by incorporating the larger family of multidimensional photonic structures into the modulator itself. Any kind of photonic structure, which is inherently a static device, may now be made dynamic by altering its geometry and/or altering its proximity to other structures. Similarly, the micromechanical Fabry-Perot filter (shown in FIG. 16), comprising two mirrors which are each one-dimensional photonic structures, may be tuned by altering the cavity width electrostatically.

FIG. 13 shows two examples of interferometric modulator designs incorporating two-dimensional PBGs. In FIG. 13A, a cutaway diagram 1300 reveals a self-supporting membrane 1304, which has been fabricated with a microring resonator 1306 mounted on the side facing the substrate 1303. Waveguides 1301 and 1302 lying within the bulk of the substrate 1303 are planar and parallel, and can be fabricated using known techniques. In FIG. 13A, the interferometric modulator is shown in the un-driven state with a finite airgap (number) between the microring and the substrate. The microring is fabricated so that its position overlaps and aligns with the paired waveguides in the substrate below. Dimensions of the microring are identical to the example described above in FIG. 11A. Cross-section 1305 shows the dimensions of the waveguides, which could be w=1 µm, h=0.5 µm, and t=100 nm. In the un-driven state, light 1308 propagates undisturbed in waveguide 1302, and the output beam 1310 is spectrally identical to input 1308.

Driving the interferometric modulator to force the microring into intimate contact with the substrate and waveguides alters the optical behavior of the device. Light propagating in waveguide 1302 may now couple into the microring by the phenomenon of evanescence. The microring, if sized appropriately, acts as an optical resonator coupling a selected frequency from waveguide 1302 and injecting it into waveguide 1301. This is shown in FIG. 13B, where light beam 1312 is shown propagating in a direction opposite the direction of input beam 1308 and output beam 1310. Such a device may be used as a frequency selective switch that picks particular wavelengths out of a waveguide by the application of a voltage or other driving means required to bring the structure into intimate contact with the underlying waveguides. A static version of this geometry is described in the paper B. E. Little, et al., "Vertically Coupled Microring Resonator Channel Dropping Filter," IEEE Photonics Technology Letters, vol. 11, no. 2, 1999.

Another example is illustrated in FIG. 13C. In this case, a pair of waveguides 1332 and 1330 and resonator 1314 are fabricated on the substrate in the form of a columnar PBG. The PBG is a uniform array of columns, with the waveguides defined by removing two rows (one for each waveguide), and the resonator defined by removing two columns. Top view 1333 provides more detail of the construction of waveguides 1330 and 1332, and the resonator 1314. Dimensions are dependent on the wavelength of interest as well as materials used. For a wavelength of 1.55 µm, the diameter and spacing of the columns could be on the order of 0.5 µm and 1 µm respectively. The height, h, determines the propagation modes which will be supported and should be slightly more than half the wavelength if only single modes are to be propagated.

On the inner surface of the membrane 1315 are fabricated two isolated columns 1311, which are directed downwards, and have the same dimensions and are of the same material (or an optically equivalent material) as the columns on the substrate. The resonator and columns are designed to complement each other; there is a corresponding absence of a column in the resonator where the column on the membrane is positioned.

When the interferometric modulator is in an undriven state, there is a finite vertical airgap 1312, of at least several hundred nanometers between the PBG and the membrane columns, and therefore no optical interaction occurs. The absence of columns in the resonator acts like defects, causing coupling between waveguides 1330 and 1332. In this state the device acts as does the one shown in FIG. 13B, and selected frequencies of light 1328 propagating along waveguide 1330 are injected into waveguide 1332, and propagate in the opposite direction 1329 of input beam 1328 and output beam 1326.

Driving the interferometric modulator into contact with the PBG, however, places the columns into the resonator, altering its behavior. The defects of the resonator are eliminated by the placement of the membrane columns. The device in this state acts as does the one shown in FIG. 13A, with light 1328 propagating without interference.

A static version of this geometry is described in the paper H. A. Haus "Channel drop filters in photonic crystals," Optics Express, vol. 3, no. 1, 1998.

Optical Switches

In FIG. 14A, a device based on the induced absorber includes a self-supporting aluminum membrane 1400, on the order of tens to hundreds of microns square, which is suspended over a stack of materials 1402, comprising a combination of metals and oxides patterned on transparent substrate 1404. The films utilized in the induced absorber modulator, described in U.S. Pat. No. 6,040,937, could serve this purpose. The films on the substrate may also comprise a transparent conductor, such as ITO (indium tin oxide). The structure may incorporate on its underside a glossy metal film, such as molybdenum or tungsten, of several hundred angstroms in thickness.

The materials of certain embodiments are configured so that in the undriven state the device reflects in a particular wavelength region, but becomes very absorbing when the membrane is driven into contact. Side view 1410 shows a view of the device looking into the side of the substrate 1412. Light beam 1408 propagates at some arbitrary angle through the substrate 1412 and is incident on interferometric modulator 1406, shown in the un-driven state. Assuming the frequency of the light corresponds with the reflective region of the interferometric modulator in the un-driven state, the light is reflected at a complementary angle 1411 and propagates away. Side view, 1414, shows the same interferometric modulator in the driven state. Because the device is now very absorbing, the light which is incident upon it is no longer reflected but absorbed by the materials in the interferometric modulator's stack.

Thus, in this configuration, the interferometric modulator may act as an optical switch for light that is propagating within the substrate upon which it is fabricated. The substrate is machined to form surfaces that are highly polished, highly parallel (to within 1/10 of a wavelength of the light of interest), and many times thicker (at least hundreds of microns) than the wavelength of light. This allows the substrate to act as a substrate/waveguide in that light beams propagate in a direction which is, on average, parallel to the substrate but undergo multiple reflections from one surface to another. Light waves in such a structure are often referred to as substrate guided waves.

FIG. 14B shows a variation on this theme. Membrane 1422 is patterned on substrate 1426 over optical stack 1424 such that the membrane 1422 is no longer rectangular but is tapered towards one end 1420. While the mechanical spring constant of the structure remains constant along its length, the electrode area decreases. Thus, the amount of force which can be applied electrostatically is lower at the narrower end 1420 of the taper. If a gradually increasing voltage is applied, the membrane 1422 will begin to actuate at the wider end first and actuation will progress along arrow 1428 as the voltage increases.

To incident light, the interferometric modulator operates as an absorbing region with an area that depends on the value of the applied voltage. Side view 1434 shows the effect on a substrate propagating beam when no voltage is applied. The corresponding reflective area 1429 in view 1435, which shows the interferometric modulator from the perspective of the incident beam, shows "footprint" 1431 of the beam superimposed on the reflective area 1429. Since the entire reflective area 1429 is non-absorbing, beam 1430 is reflected from interferometric modulator 1428 (with minimal losses) in the form of beam 1432.

In side view 1436, an interim voltage value is applied and the reflected beam 1440 has been attenuated to some extent because the reflective area 1429 shown in view 1437 is now partially absorbing. Views 1438 and 1439 reveal the result of full actuation and the complete attenuation of the beam because the reflective area 1429 is completely absorbing.

Thus, by using a tapered geometry, a variable optical attenuator may be created, the response of which is directly related to the value of the applied voltage.

Another kind of optical switch is illustrated in FIG. 15A. Support frame 1500 is fabricated from a metal, such as aluminum several thousand angstroms in thickness, in such a way that it is electrically connected to mirror 1502. Mirror 1502 resides on transparent optical standoff 1501, which is bonded to support 1500. Mirror 1502 may comprise a single metal film or combinations of metals, oxides, and semiconducting films.

The standoff 1501 is fabricated from a material that has the same or higher index of refraction than that of the substrate 1504. This could be SiO2 (same index) or a polymer with a variable index. The standoff 1501 is machined so that the mirror 1502 is supported at an angle of 45 degrees. Machining of the standoff 1501 can be accomplished using a technique known as analog lithography that relies on a photomask with features that are continuously variable in terms of their optical density. By appropriate variation of this density on a particular feature, three-dimensional shapes can be formed in a photoresist that is exposed using this mask. The shape can then be transferred into other materials via reactive ion etching. The entire assembly is suspended over conductor 1503 which has been patterned to provide an unobstructed "window" 1505 into the underlying substrate 1504. That is to say, the bulk of conductor 1503 has been etched away so that window 1505, comprising bare glass, is exposed. The switch, like other interferometric modulators, can be actuated to drive the whole assembly into contact with the substrate/waveguide. Side view, 1512, shows the optical behavior. Beam 1510 is propagating within the substrate at an angle 45 degrees from normal that prevents it from propagating beyond the boundaries of the substrate. This is because 45 degrees is above the angle, known as the critical angle, which allows the beam to be reflected 1508 with minimal or no losses at the interface 1519 between the substrate and the outside medium by the principle of total internal reflection (TIR).

The principle of TIR depends on Snell's law, but a basic requirement is that the medium outside the substrate must have an index of refraction that is lower than that of the substrate. In side view 1512, the device is shown with the switch 1506 in the un-driven state, and beam 1510 propagating in an unimpeded fashion. When, as shown in side view 1514, switch 1506 is actuated into contact with the substrate 1516, the beam's path 1518 is altered. Because the standoff has a refractive index greater than or equal to that of the substrate 1516, the beam no longer undergoes TIR at the interface. The beam propagates out of the substrate 1516 into the optical standoff, where it is reflected by the mirror. The mirror is angled at 45 degrees, such that the reflected beam 1518 is now traveling at an angle which is normal to the plane of the substrate. The result is that the light may propagate through the substrate interface because it no longer meets the criteria for TIR, and can be captured by a fiber coupler 1520, which has been mounted on the opposite side of the substrate/waveguide. A similar concept is described in the paper, X. Zhou, et al., "Waveguide Panel Display Using Electromechanical Spatial Modulators," SID Digest, vol. XXIX, 1998. This particular device was designed for emissive display applications. The mirror may also be implemented in the form of a reflecting grating, which may be etched into the surface of the standoff using conventional patterning techniques. This approach, however, exhibits wavelength dependence and losses due to multiple diffraction orders that are not an issue with thin film mirrors. Additionally, alternative optical structures may be substituted for the mirror, with their respective attributes and shortcomings. These can be categorized as refractive, reflective, and diffractive, and can include microlenses (both transmissive and reflective), concave or convex mirrors, diffractive optical elements, holographic optical elements, prisms, and any other form of optical element which can be created using micro-fabrication techniques. In the case where an alternative optical element is used, the standoff and the angle it imparts to the optic may not be necessary, depending on the nature of the micro-optic.

This variation on the interferometric modulator acts as a de-coupling switch for light. Broadband radiation, or specific frequencies if the mirror is designed correctly, can be coupled out of the substrate/waveguide at will. Side view 1526 shows a more elaborate implementation in which an additional fixed mirror 1528, angled at 45 degrees, has been fabricated on the side of the substrate 1524 opposite that of the de-coupling switch 1506. This mirror differs from the switch in that it cannot be actuated. By careful selection of the angles of the mirrors on both structures, light 1522 that has been effectively decoupled out of the substrate 1524 by switch 1506 may be recoupled back into the substrate (dashed lines) by re-coupling mirror 1528. However, by fabricating the recoupling mirror 1528 with different orientations in the XY plane, the mirror combination may be used to redirect light in any new direction within the substrate/waveguide. The combination of these two structures will be referred to as a directional switch.

Re-coupling mirrors can also be used to couple any light that is propagating into the substrate in a direction normal to the surface.

FIG. 15B shows one implementation of an array of directional switches. Looking down onto the substrate 1535, linear array 1536 is an array of fiber couplers which directs light into the substrate 1535 at an angle normal to the XY plane. An array of re-coupling mirrors (not visible) is positioned directly opposite the fiber coupler array to couple light into the substrate 1535. On the surfaces of the substrate 1535 are fabricated an array of directional switches, of which 1531 is a representative example. The switches are positioned in a way such that light coupled into the substrate from any one of the input fiber couplers 1536 may be directed to any one of the output fiber couplers 1532. In this way, the device may act as an N×N optical switch that can switch any one of any number of different inputs to any one of any number of different outputs.

Tunable Filter

Returning to FIG. 16, an interferometric modulator in the form of a tunable Fabry-Perot filter is shown. In this case, conducting contact pad 1602 has been deposited and patterned on substrate 1600, along with dielectric mirrors 1604 and 1608 and sacrificial layer 1606. This may consist of a silicon film with a thickness of some multiple of one-half a wavelength. The mirrors may comprise stacks of materials, TiO2 (high index) and SiO2 (low index) being two examples, with alternating high and low indices. One of the layers may also be air. Insulating layer 1610 is deposited and patterned such that second contact pad 1612 only contacts mirror 1608. Mirror 1608 is subsequently patterned leaving a mirror "island" 1614 connected by supports 1615. The lateral dimensions of the island are primarily determined by the size of the light beam with which it will interact. This is usually on the order of tens to several hundred microns. Sacrificial layer 1606 is partially etched chemically, but in a manner leaving standoffs 1613 of sufficient size to provide mechanical stability, probably on the order of tens of microns square. If the top layer of mirror 1608 and the bottom layer of mirror 1604 are lightly doped to be conducting, then application of a voltage between contact pads 1602 and 1612 will cause the mirror island to be displaced. Thus, the structure's optical response may be tuned.

FIG. 17A shows an application of this tunable filter. On the top surface of substrate 1714 has been fabricated tunable filter 1704, mirrors 1716, and anti-reflection coating 1712. A mirror 1717 has also been fabricated on the bottom surface of the substrate, e.g., from a metal such as gold of at least 100 nm thick. Mounted on the top surface of the substrate is an optical superstructure, 1706, whose inner surface is at least 95% reflective, e.g., by the addition of a reflecting gold film, and which also supports an angled mirror 1710. In this device, light beam 1702 propagates within the substrate at some angle that is larger than the critical angle, which is approximately 41 degrees for a substrate of glass and a medium of air. Therefore, the mirrors 1716 are required to keep the beam 1702 bounded within the confines of the substrate/waveguide. This configuration allows greater flexibility in the selection of angles at which the light propagates.

Beam 1702 is incident upon Fabry-Perot filter 1704, which transmits a particular frequency of light 1708 while reflecting the rest 1709. The transmitted frequency 1708 is incident onto and reflected from the reflective superstructure 1706, and reflected again by mirror 1716 onto angled mirror 1710. Mirror 1710 is tilted such that the light transmitted by filter 1704 is directed towards antireflection coating 1712 at a normal angle with respect to the substrate 1714, and passes through the substrate 1714 and into the external medium. The reflected frequency 1709 is reflected within the substrate 1714 between mirrors 1717 and 1716, and finally reflected 1718 through the substrate 1714 and into the external medium. The device as a whole thus acts as a wavelength selective filter.

The superstructure may be fabricated using a number of techniques. One would include the bulk micromachining of a slab of silicon to form a cavity of precise depth, e.g., on the order of the thickness of the substrate and at least several hundred microns. The angled mirror is fabricated after etching of the cavity, and the entire assembly is bonded to the substrate, glass for example, using any one of many silicon/glass bonding techniques.

FIG. 17B is a more elaborate version. In this example, a second tunable filter 1739 has been added to provide an additional frequency selection channel, which allows two separate frequencies to be selected independently. Beam 1730 passes through substrate 1744 and is incident upon a first Fabry-Perot filter 1732, which transmits a particular frequency of light 1734 while reflecting the rest. The transmitted frequency 1734 is incident onto and reflected from mirror 1736, and reflected again by a second mirror onto one of two detectors 1738. The reflected frequency is reflected within the substrate 1744, between mirror 1740 and an additional mirror onto a second Fabry-Perot filter 1739, which transmits a particular frequency of light and reflects the rest through the substrate 1744 and into the external medium. The frequency transmitted by the second filter 1739 is reflected between reflective superstructure 1742 and an additional mirror onto detector 1738. Detectors 1738 allow for a higher degree of integrated functionality.

FIG. 17C incorporates integrated circuits. Light beam 1750 has been coupled into substrate 1770 and is incident upon tunable filter 1752. This filter is different than those of FIGS. 17A and 17B in that it includes recoupling mirror 1756 that has been fabricated on the surface of the movable mirror of the filter. The angle of the mirror is such that the frequency selected by filter 1752 is now coupled directly back into the substrate at a normal angle in the form of light beam 1758. The remaining frequencies contained in light beam 1750 propagate until they encounter recoupling mirror 1760 which is angled so that it presents a surface which is perpendicular to the propagating beam. The beam thus retraces its path back out of the device where it may be used by other devices that are connected optically. Light beam 1758 is incident on IC 1764 that can detect and decode the information within the beam. The IC 1764 may be in the form of an FPGA or other silicon, silicon/germanium, or gallium arsenide-based integrated circuit that could benefit from being directly coupled to information carrying light. For example, a high bandwidth optical interconnect may be formed between ICs 1764 and 1762 by virtue of the bidirectional light path 1772. This is formed by a combination of mirrors 1776 and 1778, and recoupling mirrors 1768. Light can be emitted by either ICs if they incorporate components such as vertical cavity surface emitting lasers (VCSELS) or light emitting diodes (LEDs). Light can be detected by any number of optically sensitive components, with the nature of the component depending on the semiconductor technology used to fabricate the IC. Light that is incident on the IC may also be modulated by interferometric modulators that have been fabricated on the surface of the IC that is exposed to the substrate propagating light.

Optical Mixer Using Substrate Waveguide

FIGS. 18A and 18B are an illustration of a two-channel optical mixer implemented using a TIR version of a substrate/waveguide. FIG. 18A shows a schematic of the device. Light containing multiple wavelengths has two particular wavelengths, 1801 and 1803, split off and directed towards two independent variable attenuators 1805. They are then output to several possible channels 1807 or into an optical stop 1813.

FIG. 18B reveals an implementation. The input light is directed into the device through fiber coupler 1800, through anti-reflection coating 1802, and coupled into substrate 1804 using re-coupling mirror 1806. The recoupling mirror directs the light onto tunable filter 1808, splitting off frequency $\lambda 1$ and directing all non-selected frequencies 1814 toward a second tunable filter 1809, which splits off frequency $\lambda 2$, with the remaining frequencies (beam 1819) propagating further downstream via TIR. Following the path of frequency $\lambda 1$, which was transmitted by tunable filter 1808, the light is redirected (beam 1815) back into the substrate waveguide via mirror 1810, through an AR coating, and re-coupled back into substrate 1804 by re-coupling mirror 1811, which directs beam 1815 towards attenuator 1812. Frequency $\lambda 2$, which was transmitted by the second tunable filter 1809, is redirected (beam 1817) into substrate 1804 by a mirror positioned similarly to mirror 1810, where it follows a path parallel to beam 1815. Beams 1815 and 1817 propagate within substrate 1804 by TIR, and are positionally shifted by virtue of beam repositioner 1816.

Beam repositioner 1816 produces the same result as a recoupling mirror, except that the mirror is parallel to the surface of the substrate. Because the mirror is suspended a fixed distance beyond the substrate surface, the position of the point of incidence on the opposite substrate interface is shifted towards the right. This shift is directly determined by the height of the repositioner. The beam 1819, containing wavelengths unselected by the second tunable filter 1809, is also shifted by virtue of repositioner 1818. The result is that all three beams (1815, 1817, and 1819) are equally separated when they are incident on an array of decoupling switches 1820 and 1824. These serve to selectively redirect the beams into one of two optical combiners, 1828 being one of them, or into detector/absorber 1830. The optical combiners direct light from decoupling switches 1820 and 1824 into output fiber couplers 1822 and 1826, respectively. The optical combiners may be fabricated using a variety of techniques. A polymeric film patterned into the form of a pillar with its top formed into a lens using reactive ion etching is one approach. The absorber/detector, comprising a semiconductor device that has been bonded to the substrate, serves to allow the measurement of the output power of the mixer. Optical superstructures 1829 support external optical components and provide a hermetic package for the mixer.

The combination of planar interferometric modulators and a substrate waveguide provide a family of optical devices that are easily fabricated, configured, and coupled to the outside world because the devices reside on the waveguide and/or on the superstructure and are capable of operating on light which is propagating within the waveguide, and between the waveguide and the superstructure. Because all of the components are fabricated in a planar fashion, economies of scale can be achieved by bulk fabrication over large areas, and the different pieces may be aligned and bonded easily and precisely. In addition, because all of the active components exhibit actuation in a direction normal to the substrate, they are relatively simple to fabricate and drive compared to more elaborate non-planar mirrors and beams. Active electronic components may be bonded to either the superstructure or the substrate/waveguide to increase functionality. Alternatively, active devices may be fabricated as a part of the superstructure, particularly if it is a semiconductor such as silicon or gallium arsenide.

Printing Style Fabrication Processes

Because they are planar and because many of the layers do not require semiconducting electrical characteristics that require specialized substrates, interferometric modulators, as well as many other MEMS structures, may take advantage of manufacturing techniques which are akin to those of the printing industry. These kinds of processes typically involve a "substrate" which is flexible and in the form of a continuous sheet, for example of paper or plastic. Referred to as web fed processes, they usually involve a continuous roll of the substrate material which is fed into a series of tools, each of which selectively coats the substrate with ink in order to sequentially build up a full color graphical image. Such processes are of interest due to the high speeds with which products can be produced.

FIG. 19 is a representation of such a sequence applied to the fabrication of a single interferometric modulator and, by extension, to the fabrication of arrays of interferometric modulators or other microelectromechanical structures. Web source 1900 is a roll of the substrate material, such as transparent plastic. A representative area 1902 on a section of material from the roll contains, for the purposes of this description, only a single device. Embossing tool 1904 impresses a pattern of depressions into the plastic sheet. This can be accomplished by a metal master which has the appropriate pattern of protrusions etched on it.

The metal master is mounted on a drum that is pressed against the sheet with enough pressure to deform the plastic to form the depressions. View 1906 illustrates this. Coater 1908 deposits thin layers of material using well known thin film deposition processes, such as sputtering or evaporation. The result is a stack 1910 of four films comprising an oxide, a metal, an oxide, and a sacrificial film. These materials correspond to the induced absorber interferometric modulator design. A tool 1912 dispenses, cures, and exposes photoresist for patterning these layers. Once the pattern has been defined, the film etching occurs in tool 1914. Alternatively, patterning may be accomplished using a process known as laser ablation. In this case, a laser is scanned over the material in a manner that allows it to be synchronized with the moving substrate. The frequency and power of the laser is such that it can evaporate the materials of interest to feature sizes that are on the order of microns. The frequency of the laser is tuned so that it only interacts with the materials on the substrate and not the substrate itself. Because the evaporation occurs so quickly, the substrate is heated only minimally.

In this device example, all of the films are etched using the same pattern. This is seen in 1918 where the photoresist has been stripped away after the application of tool 1916. Tool 1920 is another deposition tool that deposits what will become the structural layer of the interferometric modulator. Aluminum is one candidate for this layer 1922. This material may also include organic materials which exhibit minimal residual stress and which may be deposited using a variety of PVD and PECVD techniques. This layer is subsequently patterned, etched, and stripped of photoresist using tools 1924, 1926, and 1928 respectively. Tool 1930 is used to etch away the sacrificial layer. If the layer is silicon, this can be accomplished using XeF2, a gas phase etchant used for such purposes. The result is the self-supporting membrane structure 1932 that forms the interferometric modulator.

Packaging of the resulting devices is accomplished by bonding flexible sheet 1933 to the top surface of the substrate sheet. This is also supplied by a continuous roll 1936 that has been coated with a hermetic film, such as a metal, using coating tool 1934. The two sheets are joined using bonding tool 1937, to produce the resulting packaged device 1940.

Stress Measurement

Residual stress is a factor in the design and fabrication of MEMS structures. In interferometric modulators, and other structures in which structural members have been mechanically released during the fabrication process, the residual stress determines the resulting geometry of the member.

The interferometric modulator, as an interferometric device, is sensitive to variations in the resulting geometry of the movable membrane. The reflected, or in other design cases transmitted, color is a direct function of the airgap spacing of the cavity. Consequently, variations in this distance along the length of a cavity can result in unacceptable variations in color. On the other hand, this property is a useful tool in determining—the residual stress of the structure itself, because variations in color can be used to determine the variations and degree of deformation in the membrane. Knowing the deformed state of any material allows for a determination of the residual stresses in the material. Computer modeling programs and algorithms can use two-dimensional data on the deformation state to determine this. Thus, the interferometric modulator structure can provide a tool for making this assessment.

FIGS. 20A-20F show examples of how an interferometric modulator may be used in this fashion. Interferometric modulators 2000 and 2002 in FIG. 20A, 2004 and 2006 in FIG. 20C, and 2008 and 2010 in FIG. 20E are shown from a side perspective, while the same interferometric modulators are shown from a bottom perspective viewed through the substrate in FIGS. 20B, 20D, and 20F, respectively. The interferometric modulators on the left are of a double cantilever form and the interferometric modulators on the right are of single cantilever form. In the case of FIG. 20A, the structural materials have no residual stresses, and both membranes exhibit no deformation. As shown in FIG. 20B, the devices, as viewed through the substrate, exhibit a uniform color that is determined by the thickness of the spacer layer upon which they were formed. Interferometric modulators 2004 and 2006 in FIG. 20C are shown with a stress gradient that is more compressive on the top than it is on the bottom. The structural membranes exhibit a deformation as a result, and the nature of the color change is revealed in the bottom view in FIG. 20D. Color region 2018, corresponding to the middle region of the membrane of interferometric modulator 2004, might be red because it is farther away from the substrate than the regions of the membrane flanking region 2018. Conversely, if color region 2016, corresponding to the portion of membrane of the left side of interferometric modulator 2006, were green, then color region 2014, corresponding to the portion of membrane of the right side of interferometric modulator 2006, might be blue, because it is closer to the substrate.

Interferometric modulators 2008 and 2010 in FIG. 20E are shown in a state where the stress gradient exhibits higher tensile stress on the top than on the bottom. The structural members are deformed accordingly, resulting in a color change as shown in the bottom view of FIG. 20F. In this case, region 2024, corresponding to the middle portion of the membrane of interferometric modulator 2008, may be blue, while the portions of the membrane flanking region 2024, corresponding to the outer portions of the membrane of interferometric modulator 2008, may be green, since they are further away from the substrate. Likewise, if region 2020, corresponding to the left side of the membrane of interferometric modulator 2010, is red, region 2022, corresponding to the right side of the membrane of interferometric modulator 2010, might be blue, as it is farther away from the substrate.

In FIG. 20G, a system is shown which can be used to quickly and accurately assess the residual stress state of a deposited film. Wafer 2030 comprises an array of interferometric modulator structures consisting of both single and double cantilevered membranes with varying lengths and widths. The structural membranes are fabricated from a material whose mechanical and residual stress properties are well characterized. Many materials are possible, subject to the limitations of the requisite reflectivity that can be quite low given that the interferometric modulators in this case are not to be used for display purposes. Good candidates would include materials in crystalline form (e.g., silicon, aluminum, germanium), which are or can be made compatible from a fabrication standpoint, exhibit some degree of reflectivity, and have mechanical properties that are or can be characterized to a high degree of accuracy. These "test structures" are fabricated and released so that they are freestanding. If the materials are without stress, then the structures should exhibit no color variations. Should this not be the case, however, then the color states or color maps may be recorded by use of a high resolution imaging device 2034, which can obtain images of high magnification via optical system 2032.

The imaging device is connected to a computer system 2036, upon which resides hardware capable of recording and processing the image data. The hardware could comprise readily available high speed processing boards to perform numerical calculations at high rates of speed. The software may consist of collection routines to collect color information and calculate surface deformations. The core routine would use the deformation data to determine the optimal combination of uniform stress and stress gradient across the thickness of the membrane, which is capable of producing the overall shape.

One mode of use could generate a collection of "virgin" test wafers with detailed records of their non-deposited stress states, to be put away for later use. When the need arises to determine the residual stress of a deposited film, a test wafer is selected and the film is deposited on top of it. The deposited film alters the geometry of the structures, and consequently their color maps. Using software resident on the computer system, the color maps of the test wafer both before and after may be compared, and an accurate assessment of the residual stress in the deposited film made. The test structures may also be designed to be actuated after deposition. Observation of their behavior during actuation with the newly deposited films can provide even more information about the residual stress states, as well as the change in the film properties over many actuation cycles.

This technique may also be used to determine the stress of films as they are being deposited. With appropriate modification of the deposition system, an optical path may be created allowing the imaging system to view the structures and track the change of their color maps in real time. This would facilitate real-time feedback systems for controlling deposition parameters in an attempt to control residual stress in this manner. The software and hardware may "interrogate" the test wafer on a periodic basis and allow the deposition tool operator to alter conditions as the film grows. Overall, this system is superior to other techniques for measuring residual stress, which either rely on electromechanical actuation alone, or utilize expensive and complex interferometric systems to measure the deformation of fabricated structures. The former suffers from a need to provide drive electronics to a large array of devices, and inaccuracies in measuring displacement electronically. The latter is subject to the optical properties of the films under observation, and the complexity of the required external optics and hardware.

Discontinuous Films

Another class of materials with interesting properties are films whose structure is not homogeneous. These films can occur in several forms and we shall refer to them collectively as discontinuous films. FIG. 21A illustrates one form of a discontinuous film. Substrate 2000 could be a metal, dielectric, or semiconductor, which has had contours 2104, 2106, and 2108 etched into its surface. The contours, comprising individual structural profiles which should have a height 2110 that is some fraction of the wavelength of light of interest, are etched using photolithographic and chemical etching techniques to achieve profiles which are similar to those illustrated by, 2104 (triangular), 2106, (cylindrical) and 2108 (klopfenstein taper). The effective diameter of the base 2102 of any of the individual profiles is also on the order of the height of the pattern. While each contour is slightly different, they all share in common the property that as one traverses from the incident into the substrate, the effective index of refraction goes gradually from that of the incident medium to that of the film substrate 2000 itself. Structures of this type act as superior antireflection coatings, compared to those made from combinations of thin films, because they do not suffer as much from angular dependencies. Thus, they remain highly antireflective from a broader range of incident angles.

FIG. 21B reveals a coating 2120 that has been deposited on substrate 2122 and could also be of a metal, dielectric, or semiconductor. The film, in this case, is still in the early stages of formation, somewhere below 1000 angstroms in thickness. During most deposition processes, films undergo a gradual nucleation process, forming material localities that grow larger and larger until they begin to join together and, at some point, form a continuous film. FIG. 21C shows a top view of film 2124. The optical properties of films in the early stage differ from that of continuous films. For metals, a discontinuous film tends to exhibit higher losses than its continuous equivalent.

FIG. 21D illustrates a third form of discontinuous film. In this case, film 2130 has been deposited on substrate 2132 to a thickness, at least a thousand angstroms, such that it is considered continuous. A pattern of "subwavelength" (having a diameter smaller than the wavelength of interest) holes 2134 is produced in the material using techniques which are similar to the self-assembly approach described earlier. In this case, the polymer can act as a mask for transferring the etch pattern into the underlying material, and the holes can be etched using reactive ion etch techniques. Because the material is continuous, but perforated, it does not act like the early stage film of FIG. 21B. Instead, its optical properties differ from the un-etched film in that incident radiation experiences lower losses and may exhibit transmission peaks based on surface plasmons. Additionally, the geometry of the holes, as well as the angle of incidence and refractive index of the incident medium, may be manipulated to control the spectral characteristics of the light that is transmitted. FIG. 21E shows a top view of the perforated film 2136. Films such as these are described in the paper "Control of optical transmission through metals perforated with subwavelength hole arrays" by Tae Jin Kim. While they are regular in structure, they differ from PBGs.

All three of these types of discontinuous films are candidates for inclusion into an interferometric modulator structure. That is to say they could act as one or more of the material films in the static and/or movable portions of an interferometric modulator structure. All three exhibit unique optical properties which can be manipulated in ways that rely primarily on the structure and geometry of the individual film instead of a combination of films with varying thickness. They can be used in conjunction with other electronic, optical, and mechanical elements of an interferometric modulator that they could comprise. In very simple cases, the optical properties of each of these films may be changed by bringing them into direct contact or close proximity to other films via surface conduction or optical interference. This can occur by directly altering the conductivity of the film, and/or by altering the effective refractive index of its surrounding medium. Thus more complex optical responses in an individual interferometric modulator may be obtained with simpler structures that have less complex fabrication processes.

Visual Display Devices

Additional embodiments of the instant invention include visual display devices comprising a plurality of interferometric modulator devices fabricated in a large array so as to form pixels within a reflective display. FIGS. 23A and 23B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 23B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 44 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUE-TOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 44, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

What is claimed is:

1. An inverse interferometric modulator display device, comprising:
    a substrate;
    a stationary reflector disposed on the substrate;
    a deformable movable layer at least partially reflective to light and at least partially transmissive to light, the movable layer including an absorber layer, the movable layer spaced from the stationary reflector to form a cavity therebetween, wherein the movable layer is movable through the cavity between a relaxed position at a first distance from the stationary reflector and an actuated position at a second distance from the stationary reflector, the first distance being greater than the second distance such that when the movable layer is actuated it moves towards the stationary reflector,
    wherein the device is configured to achieve a reflective colored state using interference when the movable layer is at the relaxed position at the first distance from the stationary reflector and achieve a dark state via absorption by the absorber layer when the movable layer is at the actuated position at the second distance from the stationary reflector.

2. The device of claim 1, wherein the absorber layer includes Chromium (Cr).

3. The device of claim 1, wherein the device further comprises a first electrode disposed over the substrate between the substrate and the movable layer, and wherein the movable layer includes a second electrode and the movable layer moves between the relaxed position and the actuated position in response to a voltage applied across the first and second electrodes.

4. The device of claim 3, further comprising a passivation layer disposed on the substrate between the first electrode and the substrate.

5. The device of claim 3, wherein at least one of the first electrode and the second electrode includes Indium Tin Oxide (ITO).

6. The device of claim 3, wherein the substrate includes a plastic, and wherein the first electrode includes the stationary reflector.

7. The device of claim 3, wherein the device further comprises a passivation layer disposed between the substrate and the first electrode.

8. The device of claim 3, further comprising a dielectric layer disposed between the first electrode and the movable layer.

9. The device of claim 1, wherein the substrate includes a metal.

10. The device of claim 1, wherein the substrate includes at least one of aluminum, steel, a metal foil, plastic, a ceramic material, and silicon.

11. The device of claim 1, wherein the stationary reflector includes a surface of the substrate on a side of the substrate proximate to the movable layer.

12. The device of claim 1, wherein the substrate is flexible.

13. The device of claim 1, wherein the substrate includes circuitry.

14. The device of claim 13, wherein the substrate is sufficiently non-transparent to shield the circuitry from light.

15. The device of claim 1, further comprising a dielectric layer disposed over the substrate between the substrate and the movable layer.

16. The device of claim 1, wherein the substrate has a thickness between about 0.1 millimeter and about 1.0 millimeter.

17. The device of claim 1, further comprising
a display including the substrate, the stationary reflector, and the deformable movable layer;
a processor that is in electrical communication with the display, the processor being configured to process image data; and
a memory device in electrical communication with the processor.

18. The device of claim 17, further comprising:
a first controller configured to send at least one signal to the display; and
a second controller configured to send at least a portion of the image data to the first controller.

19. The device of claim 17, further comprising an image source module configured to send the image data to the processor.

20. The device of claim 19, wherein the image source module comprises at least one of a receiver, transceiver, and transmitter.

21. The device of claim 17, further comprising an input device configured to receive input data and to communicate the input data to the processor.

22. An inverse interferometric modulator display device comprising:
means for supporting;
a stationary means for reflecting light disposed on the supporting means;
a movable means at least partially reflective and partially transmissive to light, the movable means including an absorber layer and being deformable and spaced from the stationary light reflecting means to form a cavity therebetween, wherein the movable means is movable through the cavity between a relaxed position at a first distance from the stationary light reflecting means and an actuated position at a second distance from the stationary light reflecting means, the first distance being greater than the second distance such that when the movable layer is actuated it moves towards the stationary light reflecting means,
wherein the device is configured to reflect light of a certain color when the movable means is at the relaxed position at the first distance from the stationary light reflecting means and achieve a dark state via absorption by the absorber layer when the movable means is at the actuated position at the second distance from the stationary light reflecting means.

23. The device of claim 22, wherein the supporting means includes a substrate.

24. The device of claim 22, wherein the stationary light reflecting means includes a stationary reflector.

25. The device of claim 22, wherein the movable means includes a mechanical layer configured to be movable to the actuated and unactuated positions.

26. A method of manufacturing an inverse interferometric modulator display device comprising:
providing a substrate;
forming a stationary reflector on the substrate; and
forming a deformable movable layer over the stationary reflector, the movable layer including an absorber layer and at least partially reflective to light and at least partially transmissive to light, the movable layer spaced from the stationary reflector such that there is cavity formed therebetween, wherein the movable layer is configured to be movable through the cavity between a relaxed position at a first distance from the stationary reflector and an actuated position at a second distance from the stationary reflector, the first distance being greater than the second distance such that when the movable layer is actuated it moves towards the stationary reflector,
wherein the device is configured achieve a reflective colored state using interference when the movable layer is at the relaxed position at the first distance from the stationary reflector and achieve a dark state via absorption by the absorber layer when the movable layer is at the actuated position at the second distance from the stationary reflector.

27. The method of claim 26, further comprising:
forming a first electrode over the substrate between the substrate and the movable layer; and
forming a dielectric layer on the first electrode between the first electrode and the movable layer,
wherein forming the deformable movable layer includes forming a second electrode, wherein the device is configured such that the movable layer moves between the relaxed position and the actuated position in response to a voltage applied across the first and second electrodes.

28. The method of claim 26, wherein the substrate includes a metal.

29. The method of claim 26, further comprising forming a passivation layer between the substrate and the first electrode.

30. The method of claim 26, wherein the substrate includes plastic.

31. A method of modulating light, the method comprising:
providing an inverse interferometric display device comprising
a substrate;
a stationary reflector disposed on the substrate; and
a deformable movable layer including an absorber layer, the deformable movable layer at least partially reflective to light and at least partially transmissive to light, the movable layer spaced from the stationary reflector to form a cavity therebetween, wherein the movable layer is movable through the cavity between a relaxed position at a first distance from the stationary reflector and an actuated position at a second distance from the stationary reflector, the first distance being greater than the second distance such that when the movable layer is actuated it moves towards the stationary reflector, wherein the device is configured to reflect light of a certain color when the movable layer is at the relaxed position at the first distance from the stationary reflector and achieve a dark state via absorption by the absorber layer when the movable layer is at the actuated position at the second distance from the stationary reflector; and moving the deformable movable layer between the relaxed position at the first distance from the reflective layer and the actuated position at the second distance from the stationary reflector while the device has light incident thereon.

32. The method of claim 31, wherein the device further comprises a first electrode disposed over the substrate between the substrate and the movable layer, and wherein the movable layer includes a second electrode and the movable layer moves between the relaxed position and the actuated position in response to a voltage applied across the first and second electrodes.

33. The method of claim 32, wherein the device further comprises a passivation layer disposed between the first electrode and the substrate.

34. The method of claim 32, wherein the device further comprises a dielectric layer disposed on the first electrode between the first electrode and the movable layer.

* * * * *